(12) United States Patent
Parpara et al.

(10) Patent No.: US 10,650,517 B2
(45) Date of Patent: May 12, 2020

(54) ALIGNER IMAGE BASED QUALITY CONTROL SYSTEM

(71) Applicant: Align Technology, Inc., San Jose, CA (US)

(72) Inventors: Anatoliy Parpara, Moscow (RU); Ivan Kharpalev, Tver (RU); Stephan Albert Alexandre Dumothier, Houston, TX (US); Andrey Cherkas, Krasnoznamensk (RU); Alexey Kalinichenko, Cary, NC (US); Jack Shaw, Durham, NC (US); Israel Velazquez, Juarez (MX)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 16/435,322

(22) Filed: Jun. 7, 2019

(65) Prior Publication Data

US 2019/0295254 A1    Sep. 26, 2019

Related U.S. Application Data

(63) Continuation of application No. 16/145,016, filed on Sep. 27, 2018.

(Continued)

(51) Int. Cl.
*G06K 9/00* (2006.01)
*G06T 7/00* (2017.01)
(Continued)

(52) U.S. Cl.
CPC ............ *G06T 7/0012* (2013.01); *A61C 7/002* (2013.01); *A61C 13/0004* (2013.01);
(Continued)

(58) Field of Classification Search
None
See application file for complete search history.

(56) References Cited

U.S. PATENT DOCUMENTS

| 6,749,414 B1 | 6/2004 | Hanson et al. |
| 7,892,474 B2 | 2/2011 | Shkolnik et al. |

(Continued)

OTHER PUBLICATIONS

International Search Report and Written Opinion of the International Searching Authority for International Patent Application No. PCT/US2018/053564 dated Jan. 3, 2019, 15 pages.

*Primary Examiner* — Sean M Conner
(74) *Attorney, Agent, or Firm* — Lowenstein Sandler LLP

(57) ABSTRACT

A method and system for inspecting a customized orthodontic aligner for manufacturing defects are described. The method includes obtaining images of the customized orthodontic aligner, determining a digital file associated with the aligner, the digital file including a digital model of a mold used during manufacture of the customized orthodontic aligner, determining an inspection recipe for the aligner, determining an intended property for the customized orthodontic aligner by digitally manipulating the digital model of the mold, determining an actual property of the customized orthodontic aligner from the images, determining whether there is a manufacturing defect in the customized orthodontic aligner by comparing the intended property with the actual property, and outputting an output associated with the determination of whether there is a manufacturing defect.

17 Claims, 33 Drawing Sheets

Related U.S. Application Data

(60) Provisional application No. 62/609,723, filed on Dec. 22, 2017, provisional application No. 62/566,188, filed on Sep. 29, 2017.

(51) Int. Cl.
*A61C 7/00* (2006.01)
*A61C 13/00* (2006.01)
*G01N 21/956* (2006.01)
*G06T 7/521* (2017.01)
*G06T 17/10* (2006.01)

(52) U.S. Cl.
CPC ....... *G01N 21/95607* (2013.01); *G06T 7/001* (2013.01); *G06T 7/0004* (2013.01); *G06T 7/0014* (2013.01); *G06T 7/521* (2017.01); *G06T 17/10* (2013.01); *G06T 2207/10116* (2013.01); *G06T 2207/30036* (2013.01)

(56) References Cited

U.S. PATENT DOCUMENTS

| | | |
|---|---|---|
| 2004/0120570 A1 | 6/2004 | Levi et al. |
| 2007/0238064 A1 | 10/2007 | Stark et al. |
| 2010/0322506 A1* | 12/2010 | Muramatsu ............ G06T 7/001 382/149 |
| 2014/0061974 A1 | 3/2014 | Tyler |
| 2014/0265034 A1 | 9/2014 | Dudley |
| 2015/0060667 A1* | 3/2015 | Yamaguchi ............ H01L 22/20 250/310 |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2016/0110859 A1* | 4/2016 | Luoh ...................... G06T 7/001 382/149 |
| 2016/0128803 A1 | 5/2016 | Webber et al. |
| 2016/0300338 A1* | 10/2016 | Zafar ..................... G06T 7/001 |

\* cited by examiner

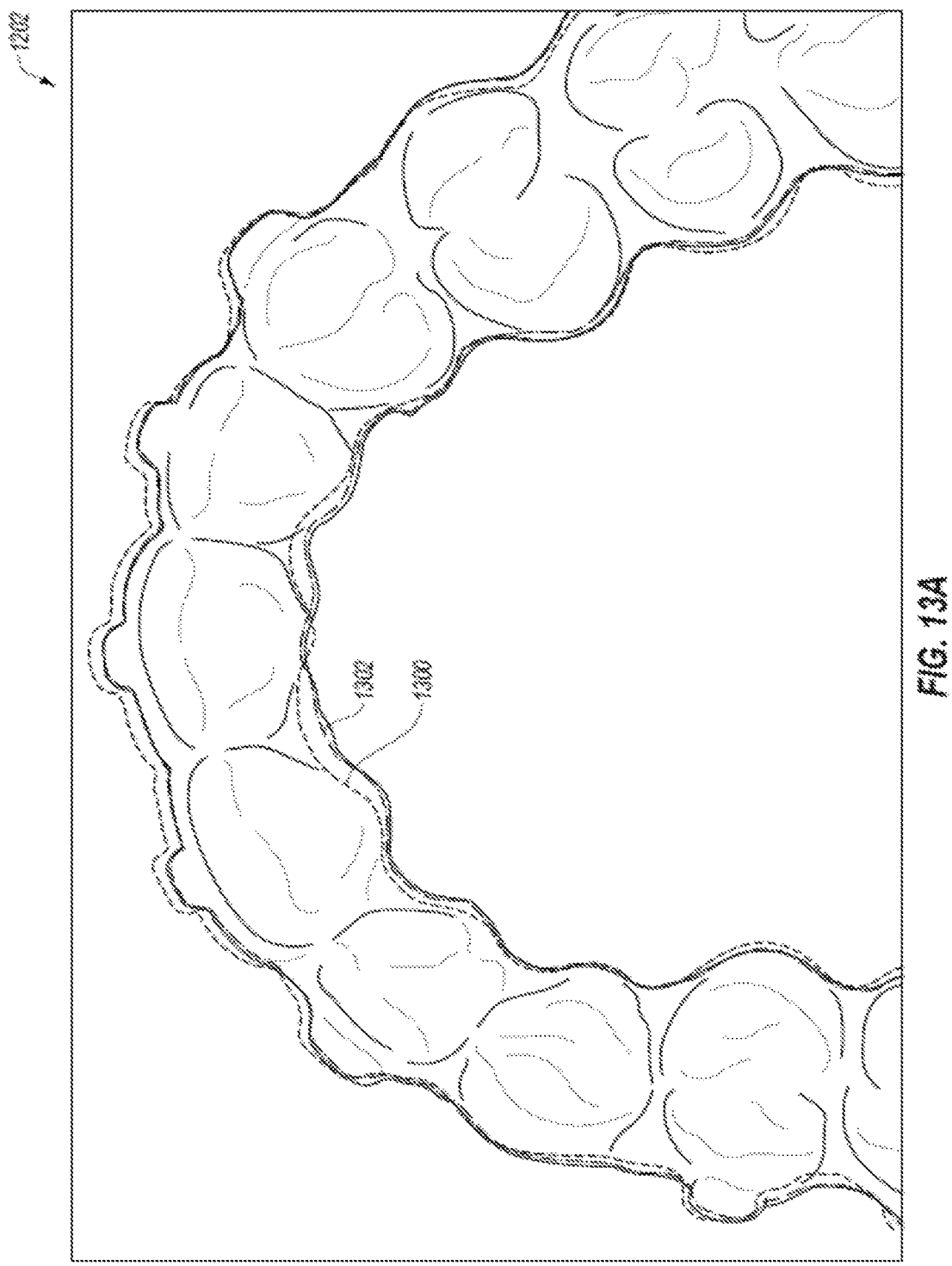

ALIGNER IMAGE BASED QUALITY CONTROL SYSTEM

RELATED APPLICATIONS

This patent application is a continuation application of U.S. application Ser. No. 16/145,016, filed Sep. 27, 2018, which claims the benefit under 35 U.S.C. § 119(e) of U.S. Provisional Application No. 62/609,723, filed Dec. 22, 2017, and of U.S. Provisional Application No. 62/566,188, filed Sep. 29, 2017, all of which are herein incorporated by reference in their entirety.

TECHNICAL FIELD

Embodiments of the present invention relate to the field of manufacturing custom products and, in particular, to image based quality control systems and methods for custom manufactured products.

BACKGROUND

For some applications, shells are formed around molds to achieve a negative of the mold. The shells are then removed from the molds to be further used for various applications. One example application in which a shell is formed around a mold and then later used is corrective dentistry or orthodontic treatment. In such an application, the mold may be a positive mold of a dental arch for a patient and the shell may be an aligner to be used for aligning one or more teeth of the patient. When attachments are used, the mold may also include features associated with planned orthodontic attachments and virtual fillers.

Molds may be formed using casting or rapid prototyping equipment. For example, 3D printers may manufacture the molds using additive manufacturing techniques (e.g., stereolithography) or subtractive manufacturing techniques (e.g., milling). The aligners may then be formed over the molds using thermoforming equipment. Once the aligner is formed, it may be manually or automatically trimmed. In some instances, a computer controlled 4-axis or 5-axis trimming machine (e.g., a laser trimming machine or a mill) is used to trim the aligner along a cutline. The trimming machine uses electronic data that identifies the cutline to trim the aligner. Thereafter, the aligner may be removed from the mold and delivered to the patient. While much of this process has been automated, further improvements may be had.

SUMMARY

A first aspect of the disclosure may include a method including receiving a digital file associated with a plastic shell that is customized for a dental arch of a patient, generating a first image of the plastic shell using one or more imaging devices, determining an inspection recipe for the plastic shell based on at least one of first information associated with the first image of the plastic shell or second information associated with the digital file. The inspection recipe specifies one or more additional images of the plastic shell to be generated. The method may also include performing the inspection recipe to capture the one or more additional images of the plastic shell, determining whether one or more defects are included in the plastic shell based at least in part on the one or more additional images, and performing quality control for the plastic shell responsive to determining that one or more defects are included in the plastic shell.

A second aspect of the disclosure may further extend the first aspect of the disclosure. In the second aspect of the disclosure, the first image is a top view image of the plastic shell, and determining the inspection recipe includes determining one or more features of the plastic shell using at least one of the first information or the second information and determining the one or more additional images to be generated based on the one or more features. The one or more features include at least one of a precision cutline of the plastic aligner, a cavity of the plastic aligner associated with an attachment, an angle of a cutline of the plastic aligner, a distance between cavities of the plastic aligner associated with teeth, or a distance between cavities of the plastic aligner associated with attachments. Determining the inspection recipe may also include determining a size of the plastic shell from at least one of the first information or the second information and determining settings to generate the one or more additional images based on at least one of the one or more features or the size of the plastic shell. The settings may include at least one of an orientation of the one or more imaging devices, a zoom of the one or more imaging devices, or a focus of the one or more imaging devices. Performing the inspection recipe may include capturing the one or more additional images using the settings.

A third aspect of the disclosure may further extend the first and/or second aspects of the disclosure. The third aspect of the disclosure may include applying the digital file to a model as an input, generating, by the model, an output identifying one or more locations of the plastic shell that are identified as high risk areas for the one or more defects, and determining the one or more additional images based on the one or more locations identified as the high risk areas by the output.

A fourth aspect of the disclosure may further extend the first through third aspects of the disclosure. The fourth aspect of the disclosure may include applying the digital file to a trained machine learning model as an input. The trained machine learning model is trained to identify one or more high risk areas for the one or more defects at one or more locations of the plastic shell. The fourth aspect may also include generating, by the trained machine learning model, an output identifying the one or more locations of the plastic shell that are identified as the high risk areas for the one or more defects, and determining the one or more additional images based on the one or more locations identified as the high risk areas by the output.

A fifth aspect of the disclosure may further extend the first through fourth aspects of the disclosure. The fifth aspect of the disclosure may include applying the digital file to a predictive model as an input. The predictive model performs finite element analysis using a geometry of the plastic shell to calculate one or more values of one or more strains of the plastic shell and to identify one or more high risk areas for the one or more defects at one or more locations of the plastic shell based on the one or more values of the one or more strains exceeding a threshold at the one or more locations. The fifth aspect may also include generating, by the predictive model, an output identifying the one or more locations of the plastic shell that are identified as the high risk areas for the one or more defects, and determining the one or more additional images based on the one or more locations identified as the high risk areas by the output.

A sixth aspect of the disclosure may further extend the first through fifth aspects of the disclosure. The sixth aspect of the disclosure may include determining the inspection recipe including applying the digital file to a rules engine that uses one or more rules that specify generating the one or more additional images of the plastic shell when one or more features are included in the plastic shell at a location of the plastic shell, and performing the inspection recipe includes capturing the one or more additional images.

A seventh aspect of the disclosure may further extend the sixth aspect of the disclosure. The seventh aspect of the disclosure may include generating the one or more rules based on at least one of a) historical data including reported defects of a first set of plastic shells and locations of the reported defects on the first set of plastic shells, b) digital files of a second set of plastic shells with labels indicating whether or not each of the second set of plastic shells experienced a defect, or c) digital files of a third set of plastic shells with labels indicating whether or not each of the third set of plastic shells include a probability that a defect is present in the plastic shell.

An eighth aspect of the disclosure may further extend the first through seventh aspects of the disclosure. In the eighth aspect of the disclosure, determining the inspection recipe includes retrieving the inspection recipe from a memory location. Settings for the one or more imaging devices to generate the one or more additional images are preset in the inspection recipe retrieved from the memory location. The settings include at least one of one or more locations for the one or more imaging devices to generate the one or more additional images, one or more orientations for the one or more imaging devices to capture the one or more additional images, one or more depths of focus for the one or more imaging devices to capture the one or more additional images, or a number of the one or more additional images for the one or more imaging devices.

A ninth aspect of the disclosure may further extend the first through eighth aspects of the disclosure. In the ninth aspect of the disclosure, performing the inspection recipe to capture the one or more additional images further includes tracing, using a first imaging device of the one or more imaging devices, an edge of the plastic shell using data from the design file of the plastic shell to capture a subset of images of the one or more additional images that represent a outline of the plastic shell.

A tenth aspect of the disclosure may further extend the first through ninth aspects of the disclosure. In the tenth aspect of the disclosure, determining whether the one or more defects are included in the plastic shell based at least in part on the one or more additional images further includes obtaining a digital model of the plastic shell from the digital file associated with the plastic shell, determining an approximated first property for the plastic shell from the digital model of the plastic shell, determining a second property of the plastic shell from the first image, and comparing the approximated first property to the second property.

An eleventh aspect of the disclosure may further extend the first through tenth aspects of the disclosure. The eleventh aspect of the disclosure may include performing the inspection recipe to capture the one or more additional images of the plastic shell including configuring settings of the one or more imaging devices to capture the one or more images based at least on one of the first information or the second information. The settings include at least one of an orientation of the one or more imaging devices, a location of the one or more imaging devices, a zoom of the one or more imaging devices, or a depth of focus of the one or more imaging devices.

A twelfth aspect of the disclosure may further extend the first through eleventh aspects of the disclosure. In the twelfth aspect of the disclosure, the first image of the plastic shell includes at least one of a photographic image, an X-ray image, or a digital image, and the one or more imaging devices includes at least one of a camera, a blue laser scanner, a confocal microscope, a stereo image sensor, an X-ray device, or an ultrasonic device.

A thirteenth aspect of the disclosure may include a method including obtaining one or more images of a first shell that is customized for a dental arch of a patient, identifying an identifier on the first shell using the one or more images, and determining, from a set of digital files, a first digital file associated with the first shell based on the identifier, determining an approximated first property for the first shell from the first digital file. The approximated first property is based on a manipulation of a digital model of a mold used to create the first shell. The method also includes determining a second property of the first shell from the one or more images, comparing the approximated first property to the second property, and performing quality control for the first shell based on the comparing.

A fourteenth aspect of the disclosure may extend the thirteenth aspect of the disclosure. In the fourteenth aspect of the disclosure, the digital file includes a digital model of the first shell. Additionally, the method also includes generating the digital model of the first shell by performing the following including: simulating a process of thermoforming a film over a digital model of the mold by enlarging the digital model of the mold into an enlarged digital model, computing a projection of a cutline onto the enlarged digital model, virtually cutting the enlarged digital model along the cutline to create a cut enlarged digital model, and selecting an outer surface of the cut enlarged digital model.

A fifteenth aspect of the disclosure may extend the thirteenth and/or fourteenth aspects of the disclosure. In the fifteenth aspect of the disclosure, the digital file includes the digital model of the mold used to create the first shell. Additionally, the method also includes manipulating the digital model of the mold to determine the approximated first property.

A sixteenth aspect of the disclosure may extend the thirteenth through fifteenth aspects of the disclosure. In the sixteenth aspect of the disclosure, the approximated first property includes an approximated outer surface of the first shell, and the second property includes a first shape of the first shell.

A seventeenth aspect of the disclosure may extend the sixteenth aspect of the disclosure. In the seventeenth aspect of the disclosure, the one or more images include a top view image. Additionally, the method also includes determining a first plane associated with the top view image, computing a first projection of the approximated outer surface of the first shell into the first plane, identifying, based on the comparing, one or more differences between a second shape of the first projection and the first shape, and determining whether the one or more differences exceed a first threshold.

An eighteenth aspect of the disclosure may extend the seventeenth aspect of the disclosure. In the eighteenth aspect of the disclosure the method also includes determining whether the first shell is deformed based on whether the difference exceeds the first threshold.

A nineteenth aspect of the disclosure may extend the seventeenth through eighteenth aspects of the disclosure. In the nineteenth aspect of the disclosure, identifying the one or more differences includes determining one or more regions where the first shape and the second shape do not match, and determining at least one of a thickness of the one or more regions or an area of the one or more regions.

A twentieth aspect of the disclosure may extend the seventeenth through nineteenth aspects of the disclosure. In the twentieth aspect of the disclosure, the digital file includes a first digital model of the first shell that includes the approximated first property, the first digital model of the first shell having been generated based on the manipulation of the digital model of the mold. The method also includes determining a resting position of the first digital model for the first shell on a flat surface, and computing a projection of the first digital model having the resting position onto the first plane of the top view image.

A $21^{st}$ aspect of the disclosure may extend the $20^{th}$ aspect of the disclosure. In the $21^{st}$ aspect of the disclosure, determining the resting position of the first digital model on the flat surface includes determining a center of mass of the first digital model of the first shell, determining a convex hull of the first digital model that includes a set of vertices linking outer most points of the first digital model, for at least one vertex of the set of vertices, and performing the following including: computing a line containing the at least one vertex, computing a projection of the center of mass onto a point on the line, determining whether the point on the line lies outside of the at least one vertex, and responsive to determining that the point does not lay outside the at least one vertex, determining that the at least one vertex is the resting position for the first digital model.

A $22^{nd}$ aspect of the disclosure may extend the $20^{th}$ through $21^{st}$ aspects of the disclosure. In the $22^{nd}$ aspect of the disclosure, determining the resting position of the first digital model on the flat surface includes determining a center of mass of the first digital model of the first shell, determining a convex hull of the first digital model that includes a set of faces linking outer most points of the first digital model, and for at least one face of the set of faces, performing the following including: computing a plane containing the at least one face, computing a projection of the center of mass onto a point on the plane, determining whether the point on the plane lies outside of the at least one face, and responsive to determining that the point does not lay outside the at least one face, determining that the at least one face is the resting position for the first shell.

A $23^{rd}$ aspect of the disclosure may extend the $17^{th}$ through $22^{nd}$ aspects of the disclosure. In the $23^{rd}$ aspect of the disclosure, the method includes determining that the one or more differences do not exceed the first threshold, generating a modified projection of the approximated outer surface of the first shell by deforming the second shape of the first projection to cause a first curvature of a deformed second shape to approximately match a second curvature of the first shape, identifying one or more additional differences between the first curvature of the deformed second shape and the second curvature of the first shape, and determining whether the one or more additional differences exceed a second threshold.

A $24^{th}$ aspect of the disclosure may extend the $23^{rd}$ aspect of the disclosure. In the $24^{th}$ aspect of the disclosure, the method includes identifying one or more regions where the second curvature and the first curvature do not match. The one or more regions correspond to a cutline of the first shell. The method also includes determining whether the cutline of the first shell will interfere with a fit of the first shell on the dental arch of the patient.

A $25^{th}$ aspect of the disclosure may extend the $23^{rd}$ or $24^{th}$ aspects of the disclosure. In the $25^{th}$ aspect of the disclosure, deforming the first shape of the first projection includes identifying a middle line of the first projection, computing a projection of a set of lines that perpendicularly intersect the middle line, identifying points on the set of lines at an intersection between each respective line of the set of lines and the middle line, and moving the points along the set of lines to cause the first curvature of the deformed second shape to approximately match the second curvature of the first shape.

A $26^{th}$ aspect of the disclosure may extend the $17^{th}$ through $25^{th}$ aspects of the disclosure. In the $26^{th}$ aspect of the disclosure, the one or more images further include a side view image. Additionally, the method also includes generating a modified projection of the approximated outer surface of the first shell by deforming the second shape of the first projection to cause a first curvature of a deformed second shape to approximately match a second curvature of the first shape, determining a second plane associated with the side view image, deforming the approximated outer surface of the first shell in accordance with the deforming of the second shape of the first projection, computing a second projection of the deformed approximated outer surface of the first shell onto the second plane, determining one or more additional differences between a third shape of the first shell as represented in the side view image and a fourth shape as represented in the second projection, and determining whether the one or more additional differences exceed a second threshold.

A $27^{th}$ aspect of the disclosure may include a non-transitory, computer-readable medium storing instructions that, when executed by a processing device, cause the processing device to obtain one or more images of a first shell that is customized for a dental arch of a patient, identify an identifier on the first shell using the one or more images, determine, from a set of digital files, a first digital file associated with the first shell based on the identifier, determine an approximated first property for the first shell from the first digital file, wherein the approximated first property is based on a manipulation of a digital model of a mold used to create the first shell, determine a second property of the first shell from the one or more images, compare the approximated first property to the second property, and perform quality control for the first shell based on the comparing.

A $28^{th}$ aspect of the disclosure may further extend the $27^{th}$ aspect of the disclosure. In the $28^{th}$ aspect of the disclosure, the digital file includes a digital model of the first shell. Additionally, the processing device is further to generate the digital model of the first shell by performing the following including: simulate a process of thermoforming a film over a digital model of the mold by enlarging the digital model of the mold into an enlarged digital model, compute a projection of a cutline onto the enlarged digital model, virtually cut the enlarged digital model along the cutline to create a cut enlarged digital model, and select an outer surface of the cut enlarged digital model.

A $29^{th}$ aspect of the disclosure may further extend the $28^{th}$ aspect of the disclosure. In the $29^{th}$ aspect of the disclosure, the approximated first property includes an approximated outer surface of the first shell, and the second property includes a shape of the first shell.

A $30^{th}$ aspect of the disclosure may include a system, including a memory storing instructions, and a processing device coupled to the memory. Executing the instructions causes the processing device to obtain one or more images of a first shell that is customized for a dental arch of a patient, identify an identifier on the first shell using the one or more images, determine, from a set of digital files, a first digital file associated with the first shell based on the identifier, determine an approximated first property for the first shell from the first digital file, wherein the approximated first property is based on a manipulation of a digital model of a mold used to create the first shell, determine a second property of the first shell from the one or more images, compare the approximated first property to the second property, and perform quality control for the first shell based on the comparing.

A $31^{st}$ aspect of the disclosure may further extend the $30^{th}$ aspect of the disclosure. In the $31^{st}$ aspect of the disclosure, the one or more images include a top view image, the approximated first property includes an approximated outer surface of the first shell and the second property includes a first shape of the first shell. Additionally, the processing device is further to determine a first plane associated with the top view image, compute a first projection of the approximated outer surface of the first shell into the first plane, identify, based on the comparing, one or more differences between the second shape of the first projection and the first shape of the first shell, and determine whether the one or more differences exceed a first threshold.

A $32^{nd}$ aspect of the disclosure may further extend the $31^{st}$ aspect of the disclosure. In the $32^{nd}$ aspect of the disclosure, the processing device is further to determine that the one or more differences do not exceed the first threshold, generate a modified projection of the approximated outer surface of the first shell by deforming the second shape of the first projection to cause a first curvature of a deformed second shape to approximately match a second curvature of the first shape, identify one or more additional differences between the first curvature of the deformed second shape and the second curvature of the first shape, and determine whether the one or more additional differences exceed a second threshold.

A $33^{rd}$ aspect of the disclosure may include a method for inspecting a dental appliance for manufacturing defects. The method includes obtaining one or more images of the dental appliance, identifying an identifier of the dental appliance, determining, from a set of digital files, a digital file associated with the dental appliance based on the identified identifier, the digital file associated with the dental appliance including a digital model of an intermediate component used during manufacture of the dental appliance, determining a intended property for the dental appliance by digitally manipulating the digital model of the intermediate component used during manufacture of the dental appliance, determining an actual property of the dental appliance from the one or more images of the dental appliance, determining whether there is a manufacturing defect in the dental appliance by comparing the intended property for the dental appliance with the actual property of the dental appliance, and outputting an output associated with the determination of whether there is a manufacturing defect.

A $34^{th}$ aspect of the disclosure may further extend the $33^{rd}$ aspect of the disclosure. In the $34^{th}$ aspect of the disclosure, the dental appliance includes a customized orthodontic aligner customized for a specific arch of a specific patient and a specific stage of orthodontic treatment, and the intermediate component includes a positive mold associated with the specific arch of the patient and the specific stage of orthodontic treatment.

A $35^{th}$ aspect of the disclosure may further extend the $33^{rd}$ or $34^{th}$ aspects of the disclosure. In the $36^{th}$ aspect of the disclosure, the intended property for the customized orthodontic aligner includes an intended silhouette of the customized orthodontic aligner in a plane and the actual property of the customized orthodontic aligner including the actual silhouette of the customized orthodontic aligner in the plane as captured by one or more images of the customized orthodontic aligner.

A $36^{th}$ aspect of the disclosure may further extend the $35^{th}$ aspects of the disclosure. The $36^{th}$ aspect of the disclosure may include comparing the intended property with the actual property of the customized orthodontic aligner including comparing the intended silhouette with the actual silhouette and determining whether differences exceed a threshold value.

A $37^{th}$ aspect of the disclosure may further extend the $34^{th}$ through $36^{th}$ aspects of the disclosure. In the $37^{th}$ aspect of the disclosure, the intended property for the customized orthodontic aligner includes an intended cutline for the customized orthodontic aligner. The actual property of the customized orthodontic aligner includes the actual cutline of the customized orthodontic aligner as determined from the one or more images.

A $38^{th}$ aspect of the disclosure may further extend the $34^{th}$ through $37^{th}$ aspects of the disclosure. In the $38^{th}$ aspect of the disclosure, the identifier of the customized orthodontic aligner is printed on the customized orthodontic aligner and the identifier of the customized orthodontic aligner is identified by analyzing the one or more images of the customized orthodontic aligner.

A $39^{th}$ aspect of the disclosure may further extend the $34^{th}$ through $38^{th}$ aspects of the disclosure. In the $39^{th}$ aspect of the disclosure, identifying the identifier of the customized orthodontic aligner includes receiving user input of the identifier.

A $40^{th}$ aspect of the disclosure may further extend the $34^{th}$ through $39^{th}$ aspects of the disclosure. In the $40^{th}$ aspect of the disclosure, the method also includes determining an inspection recipe for the customized orthodontic aligner based on the obtained one or more images of the customized orthodontic aligner or the digital file associated with the customized orthodontic aligner.

A $41^{st}$ aspect of the disclosure may further extend the $40^{th}$ aspect of the disclosure. In the $41^{st}$ aspect of the disclosure, the inspection recipe specifies one or more additional images of the customized orthodontic aligner to be captured.

A $42^{nd}$ aspect of the disclosure may further extend the $40^{th}$ through $41^{st}$ aspects of the disclosure. In the $42^{nd}$ aspect of the disclosure, the inspection recipe is based on the digital file associated with the customized orthodontic aligner, and the inspection recipe is determined by a predictive model that identifies locations of the customized orthodontic aligner that are at higher risk for one or more defects.

A $43^{rd}$ aspect of the disclosure may further extend the $34^{th}$ through $42^{nd}$ aspects of the disclosure. In the $43^{rd}$ aspect of the disclosure, the intended property for the customized orthodontic aligner is determined by digitally manipulating a portion of a surface of the digital model of the mold to approximate a surface of the customized orthodontic aligner.

A $44^{th}$ aspect of the disclosure may further extend the $43^{rd}$ aspect of the disclosure. In the $44^{th}$ aspect of the disclosure, the surface of the customized orthodontic aligner is approximated by offsetting the portion of the surface of the digital model of the mold by a distance.

A $45^{th}$ aspect of the disclosure may further extend the $43^{rd}$ through $44^{th}$ aspects of the disclosure. In the $45^{th}$ aspect of the disclosure, the intended property for the customized orthodontic aligner is determined by virtually projecting a cut line associated with the customized orthodontic aligner to the approximated surface of the customized orthodontic aligner.

A 46th aspect of the disclosure may further extend the 43rd through 45th aspects of the disclosure. In the 46th aspect of the disclosure, the intended property for the customized orthodontic aligner includes an intended silhouette of the customized orthodontic aligner in a plane and the intended silhouette of the customized orthodontic aligner is determined by computing a silhouette of the approximated surface of the customized orthodontic aligner in the plane.

A 47th aspect of the disclosure may further extend the 34th through 46th aspects of the disclosure. In the 47th aspect of the disclosure, the intended property for the customized orthodontic aligner is determined by computing a silhouette of the digital model of the mold in a plane.

A 48th aspect of the disclosure may further extend the 47th aspect of the disclosure. In the 48th aspect of the disclosure, the intended property of the customized orthodontic aligner includes an intended silhouette of the customized orthodontic aligner in the plane, and the intended silhouette of the customized orthodontic aligner is computed by offsetting a perimeter of the computed silhouette of the digital model of the mold in the plane.

A 49th aspect of the disclosure may further extend the 33rd through 48th aspects of the disclosure. In the 49th aspect of the disclosure, the dental appliance includes a mandibular advancement feature.

A 50th aspect of the disclosure may further extend the 33rd through 49th aspects of the disclosure. In the 50th aspect of the disclosure, the output includes a determination that a defect is present, and the output includes proposed digital modifications to the digital model of the intermediate component used during manufacture of the dental appliance to limit future defects.

A 51st aspect of the disclosure may further extend the 50th aspect of the disclosure. In the 51st aspect of the disclosure, the proposed digital modifications to the digital model of the intermediate component include at least one of added virtual filler material, revisions to a outline, and modifications to one or more attachments of the intermediate component.

A 52nd aspect of the disclosure may include a method for inspecting a dental appliance for manufacturing defects, the dental appliance configured for application to a dental arch of a patient, the method including obtaining one or more images of the dental appliance, identifying an identifier of the dental appliance, determining, from a set of digital files, a digital file associated with the dental appliance based on the identified identifier, the digital file associated with the dental appliance including a digital model of the dental appliance, the digital model of the dental appliance produced by digitally manipulating a digital model of a dental arch of the patient, determining a intended property for the dental appliance from the digital model of the dental appliance, determining an actual property of the dental appliance from the one or more images, determining whether there is a manufacturing defect in the dental appliance by comparing the intended property for the dental appliance with the actual property of the dental appliance, and outputting an output associated with the determination of whether there is a manufacturing defect.

A 53rd aspect of the disclosure may further extend the 52nd aspect of the disclosure. In the 53rd aspect of the disclosure, the dental appliance includes a customized orthodontic aligner customized for a specific arch of a specific patient and a specific stage of orthodontic treatment, and the digital model of the customized orthodontic aligner is produced by manipulating a digital model of a staged dental arch of the patient that is associated with the specific stage of orthodontic treatment.

A 54th aspect of the disclosure may further extend the 53rd aspect of the disclosure. In the 54th aspect of the disclosure, the intended property for the customized orthodontic aligner includes an intended silhouette of the customized orthodontic aligner in a plane and the actual property of the customized orthodontic aligner includes the actual silhouette of the customized orthodontic aligner in the plane as captured by one or more images of the customized orthodontic aligner.

A 55th aspect of the disclosure may further extend the 53rd and/or 54th aspect of the disclosure. In the 55th aspect of the disclosure, the intended property for the customized orthodontic aligner includes an intended cutline for the customized orthodontic aligner, wherein the actual property of the customized orthodontic aligner includes the actual cutline of the customized orthodontic aligner as determined from the one or more images.

A 56th aspect of the disclosure may further extend the 53rd through 55th aspects of the disclosure. In the 56th aspect of the disclosure, the method also includes determining an inspection recipe for the customized orthodontic aligner based on the obtained one or more images of the customized orthodontic aligner or the digital file associated with the customized orthodontic aligner.

A 57th aspect of the disclosure may further extend the 53rd through 56th aspects of the disclosure. In the 57th aspect of the disclosure, the identifier of the customized orthodontic aligner is printed on the customized orthodontic aligner and wherein the identifier of the customized orthodontic aligner is identified by analyzing the one or more images of the customized orthodontic aligner or by receiving user input of the identifier.

A 58th aspect of the disclosure may further extend the 52nd through 57th aspects of the disclosure. In the 58th aspect of the disclosure, the dental appliance includes a removable palatal expander.

A 59th aspect of the disclosure may further extend the 52nd through 58th aspects of the disclosure. In the 59th aspect of the disclosure, the dental appliance includes a removable surgical fixation device.

A 60th aspect of the disclosure may further extend the 52nd through 59th aspects of the disclosure. In the 60th aspect of the disclosure, the dental appliance includes a removable mandibular advancement feature.

A 61st aspect of the disclosure may include a method for inspecting a customized orthodontic aligner for manufacturing defects, the customized orthodontic aligner customized for a specific arch of a specific patient and a specific stage of orthodontic treatment, the method including obtaining one or more images of the customized orthodontic aligner, identifying an identifier of the customized orthodontic aligner, determining, based on the identifier of the customized orthodontic aligner, a intended property for the customized orthodontic aligner, the intended property for the customized orthodontic aligner determined by digitally manipulating a digital model of a mold used during manufacture of the customized orthodontic aligner, determining an actual property of the customized orthodontic aligner from the one or more images, determining whether there is a manufacturing defect in the customized orthodontic aligner by comparing the intended property for the customized orthodontic aligner with the actual property of the customized orthodontic aligner, and outputting an output associated with the determination of whether there is a manufacturing defect.

A 62nd aspect of the disclosure may further extend the 61st aspect of the disclosure. In the 62nd aspect of the disclosure, the intended property for the customized orthodontic aligner includes an intended silhouette of the customized orthodontic aligner in a plane and the actual property of the customized orthodontic aligner includes the actual silhouette of the customized orthodontic aligner in the plane as captured by one or more images of the customized orthodontic aligner.

A $63^{rd}$ aspect of the disclosure may further extend the $61^{st}$ through $62^{nd}$ aspects of the disclosure. In the $63^{rd}$ aspect of the disclosure, the intended property for the customized orthodontic aligner includes an intended cutline for the customized orthodontic aligner, wherein the actual property of the customized orthodontic aligner includes the actual cutline of the customized orthodontic aligner as determined from the one or more images.

A $64^{th}$ aspect of the disclosure may further extend the $61^{st}$ through $63^{rd}$ aspects of the disclosure. In the $64^{th}$ aspect of the disclosure, the method also includes determining an inspection recipe for the customized orthodontic aligner based on the obtained one or more images of the customized orthodontic aligner or the digital file associated with the customized orthodontic aligner.

A $64^{th}$ aspect of the disclosure may further extend the $61^{st}$ through $64^{th}$ aspects of the disclosure. In the $64^{th}$ aspect of the disclosure, the identifier of the customized orthodontic aligner is printed on the customized orthodontic aligner and wherein the identifier of the customized orthodontic aligner is identified by analyzing the one or more images of the customized orthodontic aligner or by receiving user input of the identifier.

BRIEF DESCRIPTION OF THE DRAWINGS

The present invention is illustrated by way of example, and not by way of limitation, in the figures of the accompanying drawings.

FIGS. 13A-13B illustrate example comparisons of a contour of a digital model of an aligner with a contour of an image of the aligner to detect deformation, in accordance with one embodiment.

DETAILED DESCRIPTION

Figure 1A:
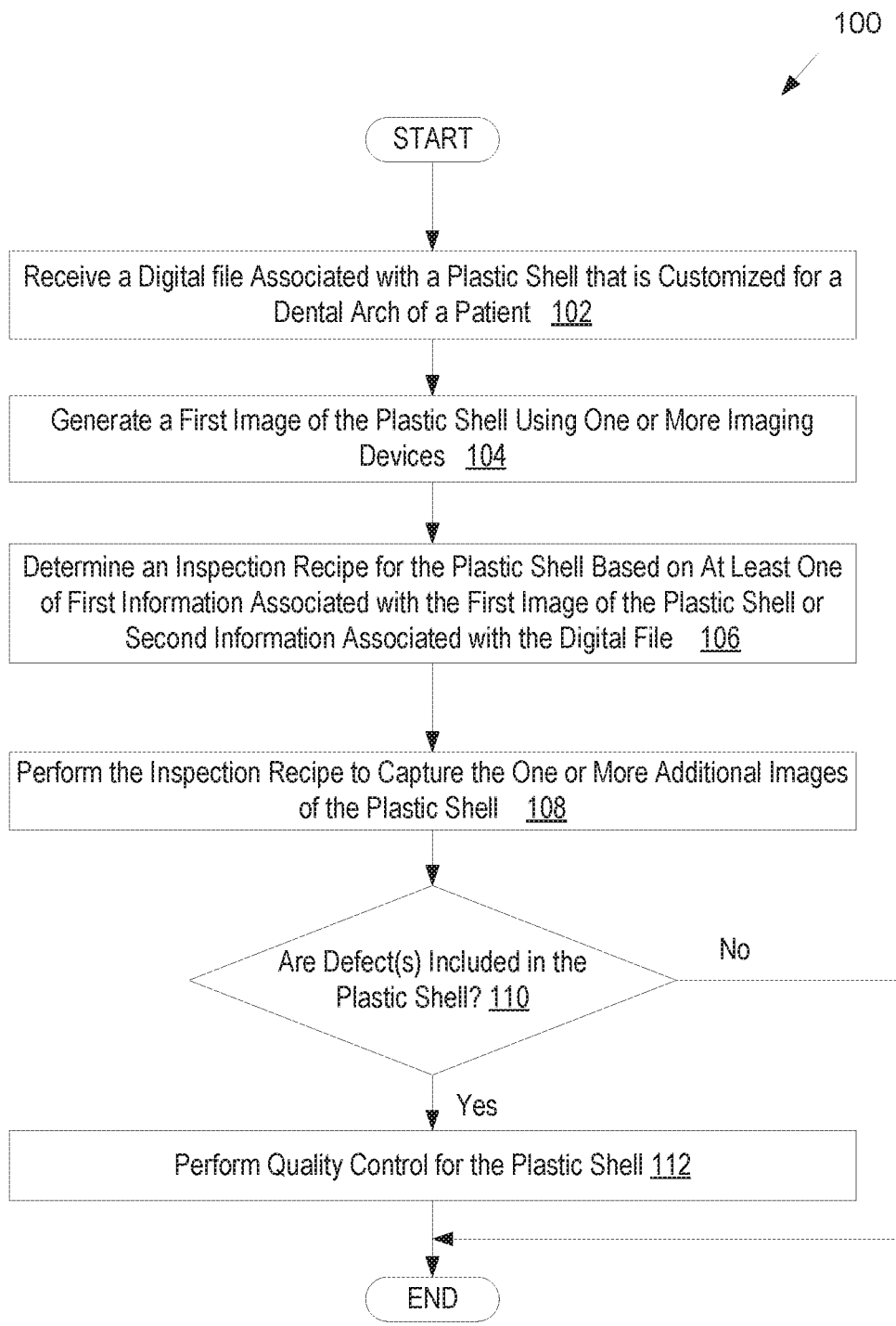
FIGS. 1A-1B illustrate flow diagrams for methods of performing image based quality control for a shell using an inspection recipe, in accordance with embodiments.

Described herein are embodiments covering systems, methods, and/or computer-readable media suitable for image based quality control (IBQC) of custom manufactured products. The custom manufactured products may be customized medical devices. For example, in some embodiments, the image based quality control systems and methods may be implemented in the inspection of orthodontic aligners after manufacturing. Quality control of custom manufactured products is particularly difficult, especially in orthodontic aligner manufacturing where orthodontic aligners must be individually customized for every single patient. Additionally, each aligner in the series of aligners used to treat a single patient is unique compared to other aligners in the same series because each aligner is specific to different stages of treatment. Further compounding the issue is that each patient receives a pair of aligners for each stage of treatment, one unique aligner for treating the upper arch and one unique aligner for treating the lower arch. In some instances, a single treatment can include 50-60 stages for treating a complex case, meaning 100-120 uniquely manufactured aligners for a single patient. When manufacturing aligners for patients worldwide, the manufacturing of several hundred thousand completely unique and customized aligners per day may be needed. As such, quality control of the custom manufactured products can be a particularly daunting task. Quality control of manufactured aligners may be performed to ensure that the aligners are defect free or that defects are within tolerable thresholds. The quality control process may be aimed at detecting one or more of the following quality issues: arch variation, bend, cutline variation, debris, webbing, trimmed attachment, missing attachment, and so forth. Typically, a technician manually performs a quality control process to inspect the aligners. However, this manual quality control process may be very time consuming and prone to error due to the inherent subjectivity of the technician. As such, embodiments of the present invention may provide a more scalable, automated, and/or objective aligner quality control process.

It should be noted that "aligner" and "shell" may be used interchangeably herein. As mentioned above, the embodiments may detect various quality issues for a given set of aligners. The quality issues may include one or more of arch variation, deformation, bend (compressed or expanded) of aligners, cutline variations, debris, webbing, trimmed attachments, missing attachments, burr, flaring, power ridge issues, material break, short hooks, bubbles, and so forth. Detecting the quality issues may enable fixing the aligner to remove the quality issue, preventing the shipment of a malformed or subpar aligner, and/or remanufacture of the malformed aligner prior to shipment. In some embodiments, the identification of aligner quality issues may be based on an image of an aligner compared with a digitally generated model of each of the aligner. In some embodiments, the digital model for each aligner may be included in a digital file associated with the aligner. Optionally, the digital file associated with the manufactured aligner may provide a digitally approximated property (e.g., an outer surface of the aligner, a two-dimensional projection of the outer surface onto a plane, etc.) of the manufactured aligner. The digitally generated model of the aligner and/or the digitally approximated property of the aligner may be based on a manipulation of a digital model of a mold used to create the aligner. In some embodiments, the identification of the aligner quality issues may be based on comparison of an approximated first property of the aligner (as determined based on manipulation of a digital model of a mold used to manufacture the aligner) and a determined second property of the aligner (as determined from one or more image of the aligner). Some advantages of the disclosed embodiments may include automated detection of various aligner quality issues and automated collection of data for statistical analysis. The embodiments may also improve detection results by eliminating human errors (e.g., false positives and false negatives). Further, the embodiments may reduce the amount of time it takes to perform quality control, thereby decreasing lead-time of aligners that may enable distributing the aligners to customers as scheduled.

Various software and/or hardware components may be used to implement the disclosed embodiments. For example, software components may include computer instructions stored in a tangible, non-transitory computer-readable media that are executed by one or more processing devices to perform image based quality control on customized manufactured shells (e.g., aligners). The software may setup and calibrate cameras included in the hardware components, capture images of aligners from various angles using the cameras, generate a digital model for the aligners, perform analysis that compares the digital model of an aligner with the image of the aligner to detect one or more quality issues (e.g., deformation, outline variation, etc.), and classify aligners based on results of the analysis.

In some implementations, a digital file associated with a shell that is customized for a dental arch of patient and undergoing inspection may be received. In some embodiments, the dental appliance includes identifying information, such as a custom barcode or part identification number. A first image (e.g., photographic image, X-ray image, digital image) of the plastic shell may be generated using one or more imaging devices (e.g., a camera, a blue laser scanner, a confocal microscope, a stereo image sensor, an X-ray device, an ultrasonic device, etc.). The dental appliance identification information may be captured in the first image and interpreted by the inspection system. Optionally, a technician may also manually input this information at an inspection station so that the inspection system can retrieve the digital file. In still further embodiments, a dental appliance sorting system may sort a series of dental appliances in a known order. The inspection system may retrieve the dental appliance order from the dental appliance sorting system in order to know which of the dental appliances are currently being inspected and the order in which they arrive at the station. Optionally, the dental appliance may arrive at the inspection system in a tray carrying the dental appliance identifying information (e.g., RFID tag, barcode, serial numbers, etc.), which is read by the inspection system. Thereafter, the inspection system may retrieve the digital file associated with the dental appliance based on the dental appliance identification information.

An inspection recipe for the plastic shell may be determined based on at least one of first information associated with the first image of the plastic shell or second information associated with the digital file. An inspection recipe may specify one or more additional images of the plastic shell, if any, to be generated and may specify settings (e.g., zoom, orientation, focus, etc.) for the one or more imaging devices. The first information and/or the second information may indicate one or more of: a shape of the aligner, a size of the aligner, one or more features of the aligners, areas of higher risk for defects, one or more defects (e.g., deformation of the aligners, crack, etc.), and the like, which may be used to determine the additional images to capture for the inspection recipe. Various defects of the plastic shell may be determined based on the first image and/or the one or more additional images. For example, when the first image is a top view image of the plastic aligner, deformation of the plastic shell may be detected, as discussed further below. If an additional image is a side view of the plastic shell, bubbles that are present on a surface of the plastic shell may be detected and/or an inaccurate cutline may be detected.

The inspection recipe may be dynamically determined based on the first information and/or the second information, or the inspection recipe may be predetermined for the plastic shell and retrieved from a memory location. For example, determining the inspection recipe may include determining one or more features (e.g., precision cutline, presence of attachment wells, angle of a cutline, crowding between teeth, crowding between attachment wells, etc.) of the plastic shell using at least one of the first information or the second information, and determining the one or more additional images to be generated based on the one or more features. Further, the size and/or shape of the plastic shell may be determined from the first information and/or the second information, and settings (e.g., orientation, zoom, focus) for the imaging devices to generate the additional images may be determined based on at least the one or more features, the size, and/or the shape of the plastic shell.

In some implementations, to determine the inspection recipe, the digital file of the plastic shell may be applied to a model (e.g., predictive model, machine learning model, etc.) or to a rules engine as an input. The model or the rules engine may generate an output identifying one or more locations of the plastic shell that are identified as high risk areas for one or more defects. In one example, the model may be a predictive model that performs a numerical simulation on the digital file of the plastic aligner by applying one or more forces on the plastic aligner to simulate a removal process of the plastic aligner from a dental arch of a patient. The predictive model may calculate a strain value and a force value that is applied to cause the strain value. If either the strain value or the force value exceed a threshold value at a location on the plastic aligner, then that location may be determined to be a high risk area for a defect. In another example, the model may be a machine learning model that is trained to identify the locations of high risk areas. The machine learning model may be applied to a first image of the aligner and/or a digital file of the aligner and may generate an output indicating one or more high risk areas for defects at locations on the aligner. The rules engine may use one or more rules that specify one or more locations are high risk areas for one or more defects when one or more features are included at the one or more locations. The one or more additional images may be determined for the inspection recipe based on the one or more locations identified as the high risk areas by the output. Additional details for methods and systems for identifying particular aligner areas for inspection may be found in U.S. provisional application 62/737,458 filed Sep. 27, 2018, which is incorporated herein by reference in its entirety.

Further determining the inspection recipe may include determining settings for the one or more imaging devices to capture the one or more additional images based at least on one of the first information associated with the first image or the second information associated with the digital file. In one example, the first information and/or the second information may include a size and/or shape of the plastic shell, which may be used to determine a zoom setting and/or a focus setting for the one or more imaging devices. In another example, the first information and/or the second information may include a feature (e.g., an angle of a outline) of the plastic shell, which may be used to determine an orientation (e.g., an angle at which to generate an image of the feature) of one or more imaging devices. Further, if a side view image is determined to be generated, the settings may include a number of images determined to be generated to be composited together to form a composite two-dimensional (2D) image that is a panoramic view of the side of the plastic aligner, or an image of the side of the plastic shell that is three-dimensional (3D). The settings of the one or more imaging devices may differ to allow the imaging devices to capture different images, which may enable detecting different defects. For example, to detect bubbles in the plastic shell, the zoom setting may be configured to a certain micron setting (e.g., 10 microns to 30 microns), whereas another zoom setting may enable detecting another type of defect (e.g., a burr).

The inspection recipe may be performed to capture the one or more additional images of the plastic shell using the determined settings. A determination may be made whether the one or more defects are included in the plastic shell based at least on one of the first image and/or the one or more additional images. Quality control may be performed for the plastic shell in response to determining that the one or more defects are included in the plastic shell.

In some implementations, detecting the defects may include comparing aspects of the digital file of the mold associated with the aligner with aspects of the first image and/or additional images of the aligner. For example, an approximated first property (e.g., an approximated outer surface of the aligner) for an aligner may be determined from the digital file of the mold associated with the aligner. The approximated first property may be determined based on a manipulation of a digital model of a mold used to create the aligner. Also, a second property (e.g., a shape of the aligner in the captured image(s)) of the aligner may be determined from the captured image(s). The approximated first property and the second property may be compared. The comparison may include computing a projection of the approximated outer surface (e.g., digital model) of the aligner into the same plane as the shape of the aligner and a region between contours of the approximated outer surface and the shape of the aligner in the image is identified. If a dimension (e.g., thickness or area) of the region exceeds a threshold, it may be determined that the aligner is deformed. If the dimension is within a threshold, then another comparison may be performed that deforms a curvature of a dental arch in the digital model or approximated projection towards a curvature of the dental arch of the manufactured aligner in the aligner image. Once deformed, other contours of the digital model or other approximated properties may be compared to the aligner image or other images of the manufactured aligner to determine whether the cutline or other property of the imaged aligner matches within a threshold. If not, the cutline or other property may be determined to be flawed. Other aligner properties that may be analyzed may include debris, webbing, trimmed attachments, and missing attachments, etc. The software may also determine how the manufactured aligner may rest on a two-dimensional plane and adjust the projection of the digital model or approximated property and the image of the manufactured aligner accordingly for the comparison analysis.

In some implementations, the digital models of the aligners may be generated as part of the manufacturing process of the aligners and the digital models may be received as inputs. Further, a user interface may be provided that displays the image based quality control process (e.g., digital models of aligners, images of the aligners, comparison of the digital models with the images) and the results (e.g., measurements, classification).

The hardware components may include a platform with a fixed or rotating table for aligner positioning and image capture, camera setups (e.g., positioning), and/or lighting system for uniform exposure and image capture with uniform ambient parameters. Further, the hardware components may also enable automatic feeding of parts (e.g., aligners) into the station in which image based quality control is being performed and sorting at the exit of the station. The images of the aligner may be obtained from one or several projections. As such, the hardware components may include a fixed or rotating table and one or more cameras with adjustable positioning. Adjusting the configuration of the hardware components may enable obtaining aligner images from different angles (e.g., top view, side view, diagonal view, etc.). In one implementation, a first camera may be positioned at an angle that enables capturing a top view image of an aligner being analyzed and a second camera may be configured to capture one or more side view or diagonal view images based on settings. The hardware components may also include a blue laser scanner that includes a camera, a background screen, and lighting to obtain an image of the shell. Certain information (e.g., second property) may be extracted from the image. The blue laser may be exercised at a certain angle at the surface of the aligner and may generate a blue light beam (e.g., with a wavelength of about 440-490 nm) that is received by the camera to generate an image of the plastic shell. Depth information from the image may be extracted to obtain desired information (e.g., a second property). The hardware may also include robot-guided cameras that use a design file to guide the cameras to generate an image about the aligner being analyzed. The image may be of the edge/cutline of the aligner. The hardware may also include an ultrasonic device that emits soundwaves to measure aligner thickness. Measuring aligner thickness may enable forming of a quality trending analysis and detection of thickness related defects. The hardware may also include a stereo image sensor to obtain a three-dimensional (3D) image of the plastic shell. The hardware may also include a confocal microscope for obtaining an image of the aligner at various focal depths. The hardware may also include an X-ray device to scan the clear plastic aligner at various cross-sections and obtain an image of the clear plastic aligner. Certain current and voltage settings may be used to scan cross-sections of the clear plastic aligner and obtain the image of the clear plastic aligner.

Some embodiments are discussed herein with reference to orthodontic aligners (also referred to simply as aligners). However, embodiments also extend to other types of shells formed over molds, such as orthodontic retainers, orthodontic splints, sleep appliances for mouth insertion (e.g., for minimizing snoring, sleep apnea, etc.) and/or shells for non-dental applications. Other applications may be found when inspecting 3D printed palatal expanders, removable mandibular repositioning devices, and removable surgical fixation devices. Accordingly, it should be understood that embodiments herein that refer to aligners also apply to other types of dental appliances. For example, the principles, features and methods discussed may be applied to any application or process in which it is useful to perform image based quality control for any suitable type of customized devices, such as eye glass frames, contact or glass lenses, hearing aids or plugs, artificial knee caps, prosthetic limbs and devices, orthopedic inserts, as well as protective equipment such as knee guards, athletic cups, or elbow, chin, and shin guards and other like athletic/protective devices.

In some embodiments, a mold of a patient's dental arch may be fabricated and a shell may be formed over the mold. The fabrication of the mold may be performed by processing logic of a computing device, such as the computing device in FIG. 21. The processing logic may include hardware (e.g., circuitry, dedicated logic, programmable logic, microcode, etc.), software (e.g., instructions executed by a processing device), firmware, or a combination thereof. For example, one or more operations may be performed by a processing device executing a computer aided drafting (CAD) program or module.

To manufacture the molds, a shape of a dental arch for a patient at a treatment stage is determined based on a treatment plan. In the example of orthodontics, the treatment plan may be generated based on an intraoral scan of a dental arch to be modeled. The intraoral scan of the patient's dental arch may be performed to generate a three dimensional (3D) virtual model of the patient's dental arch (mold). For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled (e.g., a dental impression or the like). The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

Accordingly, multiple different virtual 3D models may be generated for a single patient. A first virtual 3D model may be a unique model of a patient's dental arch and/or teeth as they presently exist, and a final virtual 3D model may be a model of the patient's dental arch and/or teeth after correction of one or more teeth and/or a jaw. Multiple intermediate virtual 3D models may be modeled, each of which may be incrementally different from previous virtual 3D models.

Each virtual 3D model of a patient's dental arch may be used to generate a unique customized physical mold of the dental arch at a particular stage of treatment. The shape of the mold may be at least in part based on the shape of the virtual 3D model for that treatment stage. The virtual 3D model may be represented in a file such as a computer aided drafting (CAD) file or a 3D printable file such as a stereolithography (STL) file. The virtual 3D model for the mold may be sent to a third party (e.g., clinician office, laboratory, manufacturing facility or other entity). The virtual 3D model may include instructions that will control a fabrication system or device in order to produce the mold with specified geometries.

A clinician office, laboratory, manufacturing facility or other entity may receive the virtual 3D model of the mold, the digital model having been created as set forth above. The entity may input the digital model into a rapid prototyping machine. The rapid prototyping machine then manufactures the mold using the digital model. One example of a rapid prototyping manufacturing machine is a 3D printer. 3D printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In some instances, stereolithography (SLA), also known as optical fabrication solid imaging, is used to fabricate an SLA mold. In SLA, the mold is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured.

Materials such as a polyester, a co-polyester, a polycarbonate, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Aligners may be formed from each mold and when applied to the teeth of the patient, may provide forces to move the patient's teeth as dictated by the treatment plan. The shape of each aligner is unique and customized for a particular patient and a particular treatment stage. In an example, the aligners can be pressure formed or thermoformed over the molds. Each mold may be used to fabricate an aligner that will apply forces to the patient's teeth at a particular stage of the orthodontic treatment. The aligners each have teeth-receiving cavities that receive and resiliently reposition the teeth in accordance with a particular treatment stage.

In one embodiment, a sheet of material is pressure formed or thermoformed over the mold. The sheet may be, for example, a sheet of plastic (e.g., an elastic thermoplastic, a sheet of polymeric material, etc.). To thermoform the shell over the mold, the sheet of material may be heated to a temperature at which the sheet becomes pliable. Pressure may concurrently be applied to the sheet to form the now pliable sheet around the mold. Once the sheet cools, it will have a shape that conforms to the mold. In one embodiment, a release agent (e.g., a non-stick material) is applied to the mold before forming the shell. This may facilitate later removal of the mold from the shell.

Additional information may be added to the aligner. The additional information may be any information that pertains to the aligner. Examples of such additional information includes a part number identifier, patient name, a patient identifier, a case number, a sequence identifier (e.g., indicating which aligner a particular liner is in a treatment sequence), a date of manufacture, a clinician name, a logo and so forth. For example, after an aligner is thermoformed, the aligner may be laser marked with a part number identifier (e.g., serial number, barcode, or the like). In some embodiments, the system may be configured to read (e.g., optically, magnetically, or the like) an identifier (barcode, serial number, electronic tag or the like) of the mold to determine the part number identifier associated with the aligner formed thereon. After determining the part number identifier, the system may then tag the aligner with the unique part number identifier. The part number identifier may be computer readable and may associate that aligner to a specific patient, to a specific stage in the treatment sequence, whether it's an upper or lower shell, a digital model representing the mold the aligner was manufactured from and/or a digital file including a virtually generated digital model or approximated properties thereof of that aligner (e.g., produced by approximating the outer surface of the aligner based on manipulating the digital model of the mold, inflating or scaling projections of the mold in different planes, etc.). In some embodiments, the virtually generated digital model of the aligner or approximated properties thereof may be compared to a property (e.g., shape of the aligner) of the manufactured aligner determined from an image of the manufactured aligner for image based quality control, as described in further detail below with reference to FIGS. 1 and 8A and 8B.

After an aligner is formed over a mold for a treatment stage, that aligner is subsequently trimmed along a cutline (also referred to as a trim line) and the aligner may be removed from the mold. The processing logic may determine a cutline for the aligner. The determination of the cutline(s) may be made based on the virtual 3D model of the dental arch at a particular treatment stage, based on a virtual 3D model of the aligner to be formed over the dental arch, or a combination of a virtual 3D model of the dental arch and a virtual 3D model of the aligner. The location and shape of the cutline can be important to the functionality of the aligner (e.g., an ability of the aligner to apply desired forces to a patient's teeth) as well as the fit and comfort of the aligner. For shells such as orthodontic aligners, orthodontic retainers and orthodontic splints, the trimming of the shell may play a role in the efficacy of the shell for its intended purpose (e.g., aligning, retaining or positioning one or more teeth of a patient) as well as the fit of the shell on a patient's dental arch. For example, if too much of the shell is trimmed, then the shell may lose rigidity and an ability of the shell to exert force on a patient's teeth may be compromised.

On the other hand, if too little of the shell is trimmed, then portions of the shell may impinge on a patient's gums and cause discomfort, swelling, and/or other dental issues. Additionally, if too little of the shell is trimmed at a location, then the shell may be too rigid at that location. In some embodiments, the cutline may be a straight line across the aligner at the gingival line, below the gingival line, or above the gingival line. In some embodiments, the cutline may be a gingival cutline that represents an interface between an aligner and a patient's gingiva. In such embodiments, the cutline controls a distance between an edge of the aligner and a gum line or gingival surface of a patient.

Each patient has a unique dental arch with unique gingiva. Accordingly, the shape and position of the cutline may be unique and customized for each patient and for each stage of treatment. For instance, the cutline is customized to follow along the gum line (also referred to as the gingival line). In some embodiments, the cutline may be away from the gum line in some regions and on the gum line in other regions. For example, it may be desirable in some instances for the cutline to be away from the gum line (e.g., not touching the gum) where the shell will touch a tooth and on the gum line (e.g., touching the gum) in the interproximal regions between teeth. Accordingly, it is important that the shell be trimmed along a predetermined cutline.

In some embodiments, a shell may have multiple cutlines. A first or primary cutline may control a distance between an edge of the shell and a gum line of a patient. Additional cutlines may be for cutting slots, holes, or other shapes in the shell. For example, an additional cutline may be for removal of an occlusal surface of the shell, an additional surface of the shell, or a portion of the shell that, when removed, causes a hook to be formed that is usable with an elastic.

In some embodiments, a gingival cutline is determined by first defining initial gingival curves along a line around a tooth (LAT) of a patient's dental arch from a virtual 3D model (also referred to as a digital model) of the patient's dental arch for a treatment stage. The gingival curves may include interproximal areas between adjacent teeth of a patient as well as areas of interface between the teeth and the gums. The initially defined gingival curves may be replaced with a modified dynamic curve that represents the cutline.

Defining the initial gingival curves along a line around a tooth (LAT) can be suitably conducted by various conventional processes. For example, such generation of gingival curves can include any conventional computational orthodontics methodology or process for identification of gingival curves. In one example, the initial gingival curves can be generated by use of the Hermite-Spline process. In general, the Hermite form of a cubic polynomial curve segment is determined by constraints on endpoints $P_1$ and $P_4$ and tangent vectors at endpoints $R_1$ and $R_4$. The Hermit curve can be written in the following form:

$$Q(s)=(2s^3-3s^2+1)P_1+(-2s^3+3s^2)P_4+(s^3-2s^2+s)R_1+(s^3-s^2)R_4; s[0,1] \quad (1)$$

Equation (1) can be rewritten as:

$$Q(s)=F_1(s)P_1+F_2(s)P_4+F_3(s)R_1+F_4(s)R_4; \quad (2)$$

Wherein equation (2) is the geometric form of the Hermite-Spline Curve, the vectors H, $P_4$, $R_1$, $R_4$ are the geometric coefficients, and the F terms are Hermite basis functions.

A gingival surface is defined by gingival curves on all teeth and a base line, with the base line being obtained from a digital model of the patient's dental arch. Thus, with a plurality of gingival curves and base line, a Hermite surface patch that represents the gingival surface can be generated.

Rather than having a cutline that causes a sharp point or other narrow region in the interproximal areas between teeth that can cause weakening of the aligner material during use, the initial gingival curves may be replaced with a cutline that has been modified from the initial gingival curves. The cutline can be generated to replace the initial gingival curves by initially obtaining a plurality of sample points from a pair of gingival curve portions residing on each side of an interproximal area. The sample points are then converted into point lists with associated geometric information (e.g., into the Amsterdam Dentistry Functional (ADF) format or other like data formats). Sample points may be suitably selected proximate the inner region between two teeth, but sufficiently distanced from where the two teeth meet or come to a point (or the separation between the two teeth narrows) within an interproximal area between the two teeth.

The collection of sample points provides a plurality of points in space (not in the same plane) that can be used to generate an average plane and a vector that is normal to the average plane. Sample points that are associated with gingival curve portions can then be projected onto the average plane to generate two new curves. To minimize weakening of a region of the aligner material within the interproximal area, the modified dynamic curve can be configured with an offset adjustment that comprises a minimum radius setting in the interproximal area to prevent breakage of the aligner material during use. The offset adjustment is further configured to ensure that a resulting cutline have a sufficient radius in the interproximal area to facilitate enough resistance force applied to the teeth to cause effective movement, but not too small radius as to facilitate breakage. For example, a sharp point or other narrow portion of material can create a stress region susceptible to break during use, and so should be avoided. Accordingly, rather than have the cutline comprise a sharp point or other narrow region, a plurality of intersection points and tangent points may be used to generate a cutline in the interproximal region between adjacent teeth that maintains structural strength of the aligner and prevents sharp points and/or narrow portions that could break. In one embodiment, the cutline is spaced apart from the gingival surface at regions where the aligner will contact a tooth and is designed to at least partially touch a patient's gingival surface in one or more interproximal regions between teeth.

After outline determination, the aligner may then be cut along the outline (or outlines) using markings and/or elements that were imprinted in the aligner. In some embodiments, the aligner may be manually cut by a technician using scissors, a bur, a cutting wheel, a scalpel, or any other cutting implement. In another embodiment, the aligner is cut along the outline by a computer controlled trimming machine such as a CNC machine or a laser trimming machine. The computer controlled trimming machine may include a camera that is capable of identifying the outline in the aligner. The computer controlled trimming machine may use images from a camera to determine a location of the outline from markings in the aligner, and may control an angle and position of a cutting tool of the trimming machine to trim the aligner along the outline using the identified markings.

Additionally, or alternatively, the aligner may include coordinate system reference marks usable to orient a coordinate system of the trimming machine with a predetermined coordinate system of the aligner. The trimming machine may receive a digital file with trimming instructions (e.g., that indicate positions and angles of a laser or cutting tool of the trimming machine to cause the trimming machine to trim the aligner along the outline). By aligning the coordinate system of the trimming machine to the aligner, an accuracy of computer controlled trimming of the aligner at the outline may be improved. The coordinate system reference marks may include marks sufficient to identify an origin and an x, y and z axis.

Prior to trimming the aligner a technician may apply a dye, a colored filler, or other material to the aligner to fill in slight indentations left by one or more elements imprinted in the aligner. The dye, colored filler, etc. may color the slight indentations without coloring a remainder of the aligner. This may increase a contrast between the outline and the remainder of the aligner. Additional polishing (e.g., of edges) and/or removal of undesired artifacts may be performed after the aligner is removed from the mold and trimmed. After trimming, the aligner may be removed from the mold.

In the embodiments disclosed herein, each aligner or other dental appliance (e.g., removable surgical fixation devices, removable mandibular repositioning appliances, removable palatal expanders) that is manufactured may be sent to an image based quality control (IBQC) station that detects one or more quality issues (e.g., deformation) with the aligners. Alternatively, aligners that are flagged for quality inspection may be sent to the IBQC station. For example, the digital files of aligners may be input into a machine learning model, numerical simulation, rules engine and/or other module to determine whether there is an increased chance that any of those aligners will have defects. The machine learning model, numerical simulation, rules engine and/or other module may identify a subset of the aligners that are to be inspected using the IBQC system. Optionally, the IBQC systems and methods may classify the inspected aligners as deformed, possibly deformed, or not deformed, and may also provide a recommendation (e.g., requiring further inspection, requires remanufacturing, approved, etc.) including the results of its analysis.

Turning now to the figures, FIG. 1A illustrates a flow diagram for a method 100 of performing image based quality control for a shell (e.g., an orthodontic aligner), in accordance with one embodiment. One or more operations of method 100 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 100 may be performed by a processing device executing an image based quality control module 2150 of FIG. 21. It should be noted that the method 100 may be performed for each unique aligner that is manufactured for each patient's treatment plan or for a subset of unique aligners.

At block 102, processing logic may receive a digital file associated with a plastic shell that is customized for a dental arch of a patient. The dental appliance identification information may be captured by a camera and interpreted by the inspection system. Optionally, a technician may also manually input this information so that the inspection system can retrieve the digital file. In still further embodiments, a dental appliance sorting system may sort a series of dental appliances in a known order. The inspection system may retrieve the dental appliance order from the dental appliance sorting system in order to know which of the dental appliances are currently being inspected and the order in which they arrive at the station. Optionally, the dental appliance may arrive at the inspection system in a tray carrying the dental appliance identifying information (e.g., RFID tag, barcode, serial numbers, etc.), which is read by the inspection system. Thereafter, the inspection system may retrieve the digital file associated with the dental appliance based on the dental appliance identification information received by the system.

In some embodiments, the digital file may include a digital model of the plastic shell. In some embodiments, the digital file associated with the plastic shell may include a digital model of a mold used to manufacture the plastic shell. A digital model of the plastic shell may be obtained by manipulating the digital model of the mold and approximating a first property of the plastic shell. For example, in some embodiments, a surface of the mold may be enlarged, inflated, or otherwise offset to approximate a surface (inner and/or outer surface) of the plastic shell. In some instances, the surface(s) of the mold associated with the teeth and/or attachments and/or virtual fillers of the patient are enlarged, inflated, or offset. Optionally, an inner or outer surface of the plastic shell is determined and the other surface is approximated based on a thickness of the material used to form the plastic shell. In some cases where the shell is to be formed by thermoforming a sheet of material over a physical mold, the approximated surfaces may take into account stretching and thinning of the material over certain parts of the mold.

At block 104, processing logic may generate a first image of the plastic shell using one or more imaging devices. The first image may be a top view image, a side view image, or a diagonal image and may include at least one of a photographic image or an X-ray image, or other digital image (e.g., an ultrasound image). The one or more imaging devices may include at least one of a camera, a blue laser scanner, a confocal microscope, a stereo image sensor, an X-ray device, and/or an ultrasonic device.

In some implementations, two cameras may be used with certain lighting, a backing screen, a mirror, and/or X-Y stages to capture the first image and/or additional images, as described further below with reference to FIG. 2. For example, the first image may be captured by a first top view camera and the first image may be used to determine an inspection recipe as described below. The top view image (shown in FIG. 3A) may be used to determine a motion control and/or a screen path for a backing screen between a front side and a backside of the plastic shell identified in the first image (shown in FIG. 3B). The motion control and screen path may be used to place the backing screen while additional images (e.g., side view images) specified in the inspection recipe are captured. In some embodiments, the digital file may be used to guide the one or more imaging devices (e.g., using robot guided image acquisition) to capture the first image by tracing an edge and/or cutline of the plastic shell based on a digital model of the plastic aligner included in the digital file. Further, in some implementations, processing logic may analyze the digital file associated with the plastic shell to determine one or more features included in the plastic shell and configure settings of the one or more imaging devices to capture the first image at a location associated with the one or more features.

At block 106, processing logic may determine an inspection recipe for the plastic shell based on at least one of first information associated with the first image of the plastic shell or second information associated with the digital file. The inspection recipe may specify one or more additional images of the plastic shell to be generated. For example, the first information associated with the first image of the plastic shell or the second information associated with the digital file may indicate a size and/or shape of the plastic shell, and processing logic may determine to capture one or more additional images using a particular zoom setting, focus setting, and/or orientation (e.g., angle, position, etc.) setting. If the first information indicates the plastic shell is small in size, then processing logic may determine to capture an additional image at a zoomed-in image device setting. Additionally, in some embodiments the first information associated with the first image of the plastic shell or the second information associated with the digital file may indicate the presence of certain features (e.g., a precision cutline of the plastic aligner, cavities of the plastic aligner associated with attachments, an angle of the cutline, a distance between cavities of the plastic aligner associated with teeth, or a distance between cavities of the plastic aligner associated with attachments). Processing logic may determine the inspection recipe to include one or more additional images of the plastic shell based on the identified features, as further discussed with reference to FIG. 5.

Processing logic may also determine the settings of the imaging devices to use to capture the one or more additional images. The settings may be based on the size, shape, and/or features identified in the plastic shell. For example, the settings may include at least one of one or more locations for the one or more imaging devices to generate the one or more additional images, one or more orientations for the one or more imaging devices to capture the one or more additional images, one or more depths of focus for the one or more imaging devices to capture the one or more additional images, and/or a number of the one or more additional images for the one or more imaging devices.

Further, in some embodiments, processing logic may determine the inspection recipe by applying the digital file associated with the plastic shell to a model (e.g., a trained machine learning model or a numerical simulation) as input, and the model may output one or more locations of the plastic shell that are identified as high risk areas for defects, as described below further with reference to FIG. 6. In addition, in some embodiments, processing logic may determine the inspection recipe by applying the digital file associated with the plastic shell to a rules engine that uses one or more rules that specify capturing one or more additional images at one or more locations of the plastic shell when one or more features are present at the one or more locations, as described below further with reference to FIG. 7.

Figure 21:
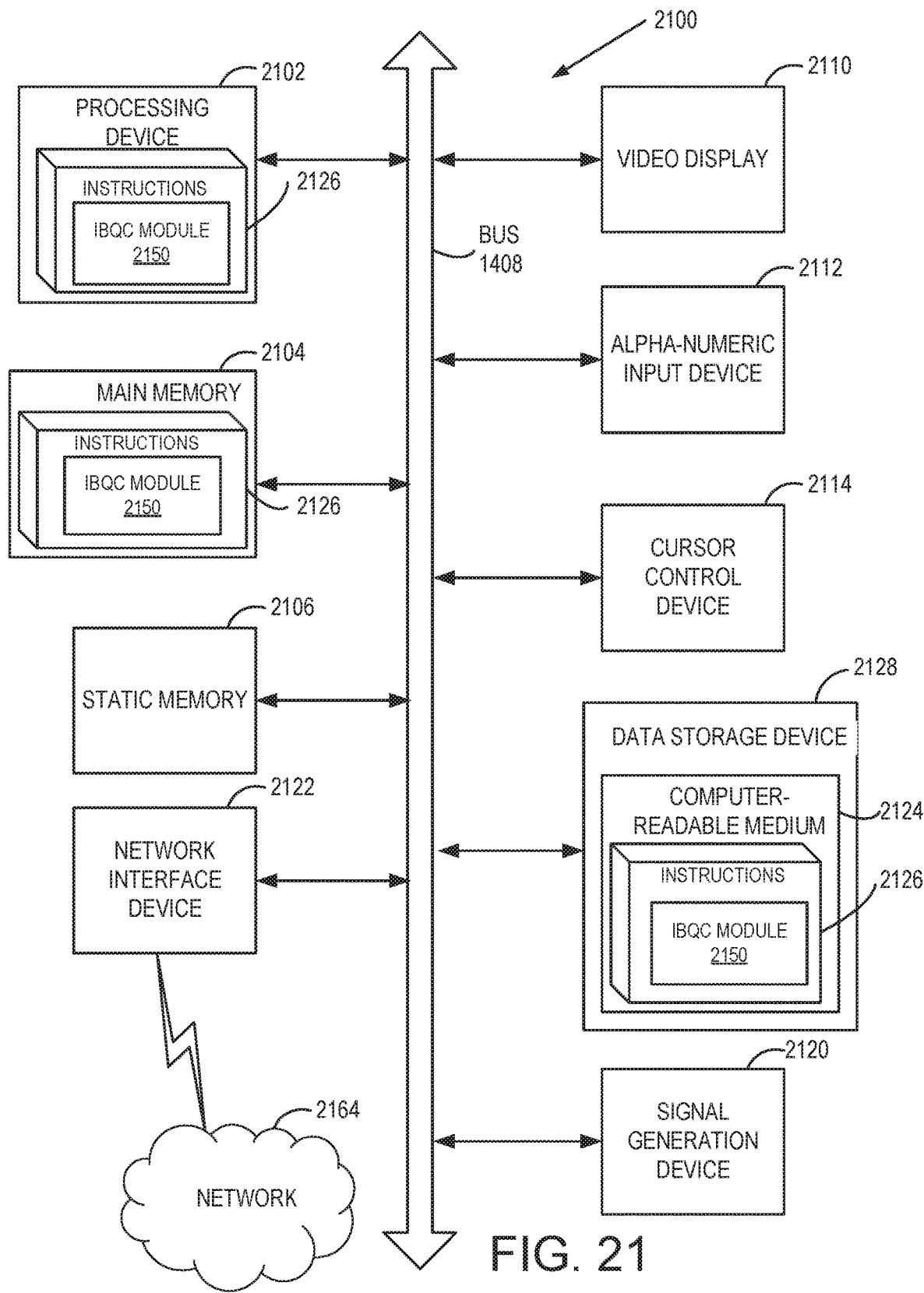
FIG. 21 illustrates a block diagram of an example computing device, in accordance with one embodiment.

In some embodiments, determining the inspection recipe may include retrieving the inspection recipe from a memory location of the computer system depicted in FIG. 21. Settings for the one or more imaging devices to generate the one or more additional images may be preset in the inspection recipe retrieved from the memory location. The settings may include at least one of one or more locations for the one or more imaging devices to generate the one or more additional images, one or more orientations for the one or more imaging devices to capture the one or more additional images, one or more depths of focus for the one or more imaging devices to capture the one or more additional images, and/or a number of the one or more additional images for the one or more imaging devices.

At block 108, processing logic may perform the inspection recipe to capture the one or more additional images of the plastic shell. In some embodiments, performing the inspection recipe to capture the one or more additional images of the plastic shell may include configuring settings of the one or more imaging devices to capture the one or more images based at least on the first information associated with the first image or the second information associated with the digital file. The settings may include at least one of an orientation of the one or more imaging devices, a location of the one or more imaging devices, a zoom of the one or more imaging devices, or a depth of focus of the one or more imaging devices. In some embodiments, performing the inspection recipe may include tracing, using an imaging device, an edge of the plastic shell using data from the design file of the plastic shell or from a motion control and screen path determined from the first image to capture a subset of images of the one or more additional images that represent a cutline of the plastic shell.

Figure 4A:
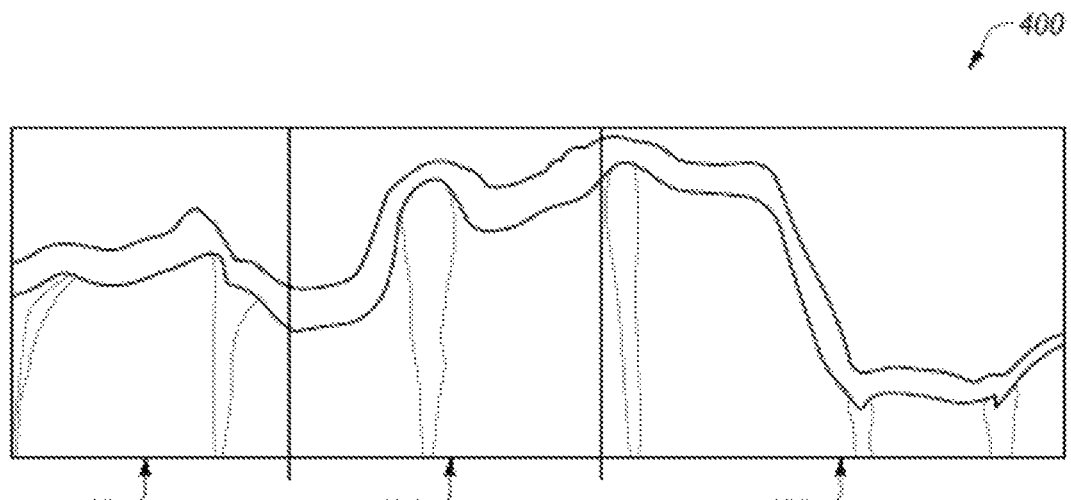
FIGS. 4A-4C illustrate an example side view composite image of a side of the shell, an edge detected using the side view composite image, and a comparison of the edge to a second edge obtained from a digital model of the shell, in accordance with one embodiment.
Figure 4B:
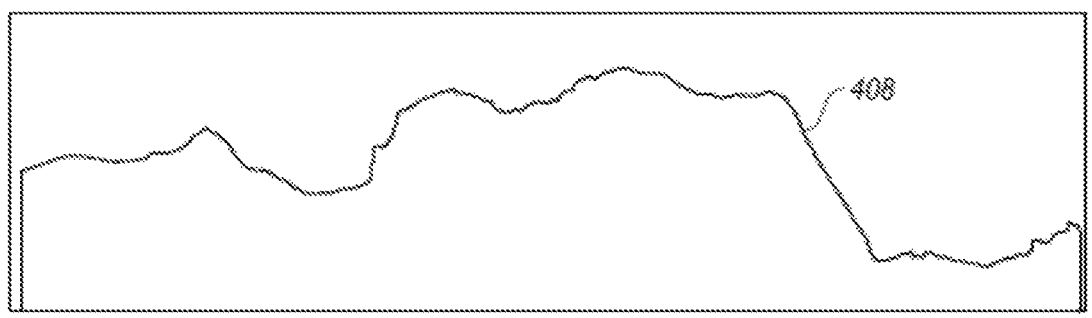
Figure 4C:
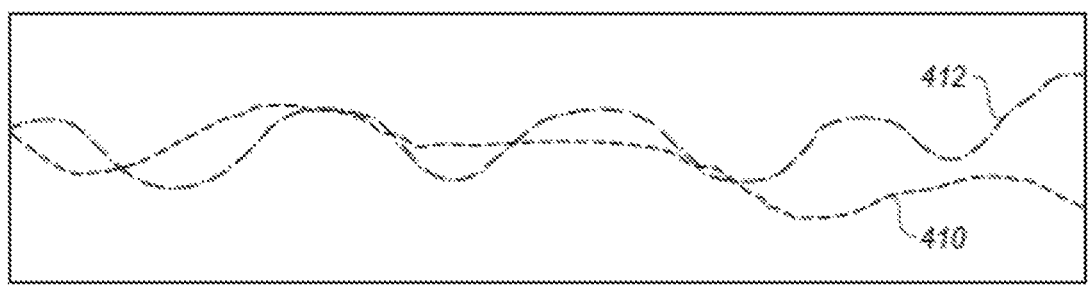

At block 110, processing logic may determine whether there are one or more defects included in the plastic shell based on the first image and/or the one or more additional images. If there are not any defects included, the method may conclude. In some embodiments, determining whether there are defects may include obtaining the digital file associated with the plastic shell, determining an approximated first property (or intended property) for the plastic shell from the digital file, determining a second property (or actual property) of the manufactured plastic shell from the first image and/or the one or more additional images, and comparing the approximated first/intended property to the second/actual property. If the approximated first property and the second property vary by a threshold amount, then a defect may be determined to be present in the plastic shell. In some applications, the digital file associated with the plastic shell comprises a digital model of the mold and/or a digital model of the shell. Optionally, determining intended properties for the plastic shell comprises manipulating the digital model of the mold, examples of which are provided throughout. For example, the intended property may be determined by manipulating a surface of the digital model of the mold to approximate an outer surface of the manufactured dental appliance. In some instances, an intended property for the dental appliance may be a projection or silhouette of the intended outer surface of the dental appliance into a plane. In some embodiments, the approximated first property may be a virtual cutline of the digital model of the aligner and the second property may be an actual cutline from the first image of the plastic shell. It should be noted that "cutline" and "edge" may be used interchangeably herein. An example of determining the second property from the additional images of the inspection recipe that are captured and comparing the second property to the approximated first property to determine whether any defects are present is shown in FIGS. 4A-4C.

If it is determined at block 110 that there are one or more defects included in the plastic shell, then at block 112 processing logic may perform quality control for the plastic shell. For example, processing logic may classify the plastic shell as defective and specify one or more remedies (e.g., add filler material, smooth cutline, modifications to one or more attachments on the mold or attachment cavities of the dental appliance, remanufacture, etc.) to attempt to remove the one or more defects. Examples of quality control operations are described in greater detail below.

Figure 1B:
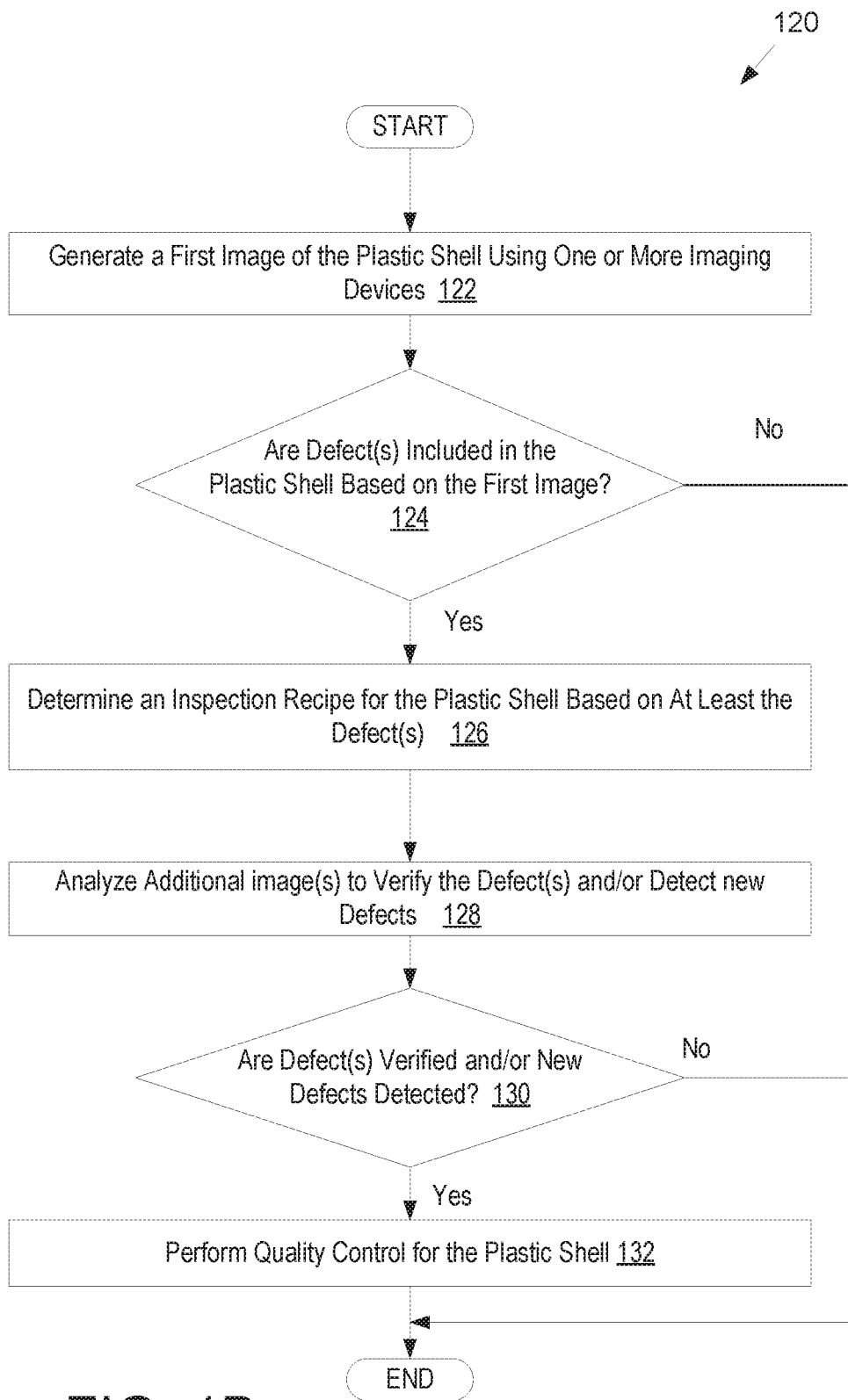

FIG. 1B illustrates a flow diagram for a method 120 of performing image based quality control for a shell (e.g., an orthodontic aligner), in accordance with one embodiment. One or more operations of method 120 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 120 may be performed by a processing device executing an image based quality control module 2150 of FIG. 21. It should be noted that the method 120 may be performed for each unique aligner that is manufactured for each patient's treatment plan or for a subset of unique aligners.

At block 122, processing logic may generate a first image of a plastic shell using one or more imaging devices. In some embodiments, the first image may be a top view image of the plastic shell. The one or more imaging devices may include a camera, an X-ray device, a blue laser scanner, or the like.

At block 124, processing logic may determine whether there are one or more defects detected in the plastic shell based on the first image. If there are no defects detected, the method 120 may conclude. The one or more defects may be detected by comparing the first image of the plastic shell to a digital file including a digital model of the plastic shell. For example, processing logic may compare the top view image of the first shell to a top view of the digital model of the plastic shell to determine whether a shape of the plastic shell is deformed. If one or more differences between a shape of plastic shell from the top view image and a shape of the plastic shell from the digital model of the shell exceeds a threshold, then a defect may be determined to be included in the plastic shell. The first image may be applied to a trained machine learning model that is trained to identify high risk areas for defects, or to a rules engine that includes rules specifying that certain features at locations indicate high risk areas for defects.

If there are one or more defects detected or possible defects detected (high risk areas for defects) in the plastic aligner, at block 126, processing logic may determine an inspection recipe for the plastic shell based on at least the one or more defects. Processing logic may determine one or more additional images to generate for the inspection recipe and settings for the one or more imaging devices to use to capture the one or more additional images. For example, if the plastic shell is determined to be deformed based on the top view image, processing logic may determine to capture one or more side view images of the plastic shell at the deformation location to further analyze (e.g., verify and/or detect other defects) the plastic shell. The settings determined may include zooming in on the detected defects at certain locations, adjusting focus depth to verify the defect and/or detect other defects, etc. Once the inspection recipe is determined, processing logic may perform the inspection recipe by capturing the one or more additional images using the determined settings.

At block 128, processing logic may analyze the one or more additional images to verify the defect detected and/or the possible defect in the first image and/or to detect one or more new defects and/or possible defects in the plastic shell. In some embodiments, processing logic may compare the additional images to similar representations (e.g., similar zoom settings, focus settings, etc.) of the plastic aligner in the digital model to determine any differences and/or verify the defect detected based on the first image. In some embodiments, processing logic may detect new defects (e.g., a crack) and/or possible defects based on the additional images. The additional images may be applied to the machine learning model and/or the rules engine, as described above.

At block 130, processing logic may determine whether the defects detected and/or the possible defects detected in the first image are verified based on the one or more additional images and/or whether any new defects and/or possible defects are detected. If the one or more defects detected and/or the possible defects detected in the first image are not verified and/or there are no new defects detected and/or possible defects detected in the one or more additional images, the method 120 may conclude. If the defects detected and/or possible defects detected in the first image are verified based on the one or more additional images and/or there are new defects detected and/or possible defects detected based on the one or more additional images, at block 132, processing logic may perform quality control for the plastic shell.

Figure 2:
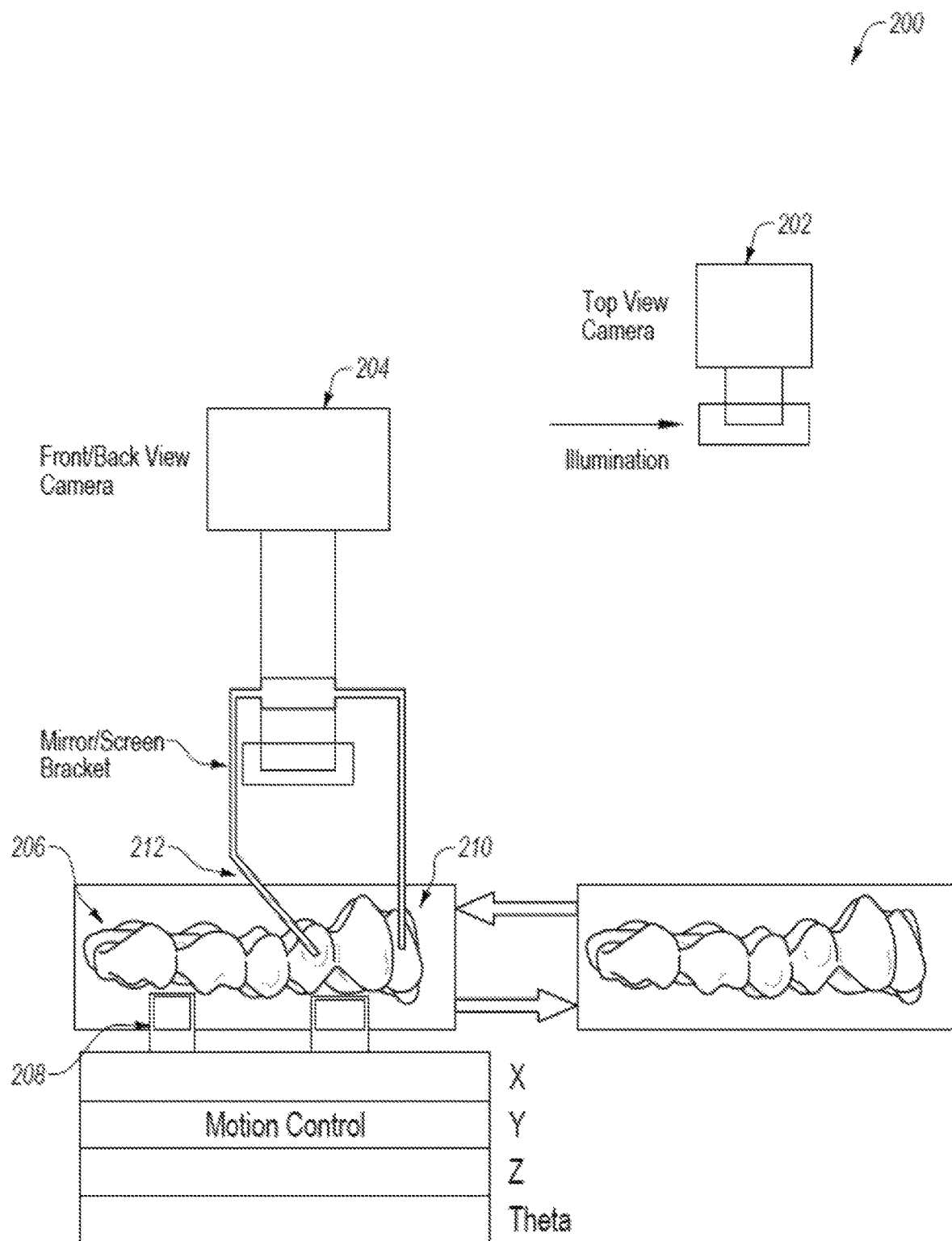
FIG. 2 illustrates an example imaging system including a top view camera and a side view camera, in accordance with one embodiment.
Figure 3A:
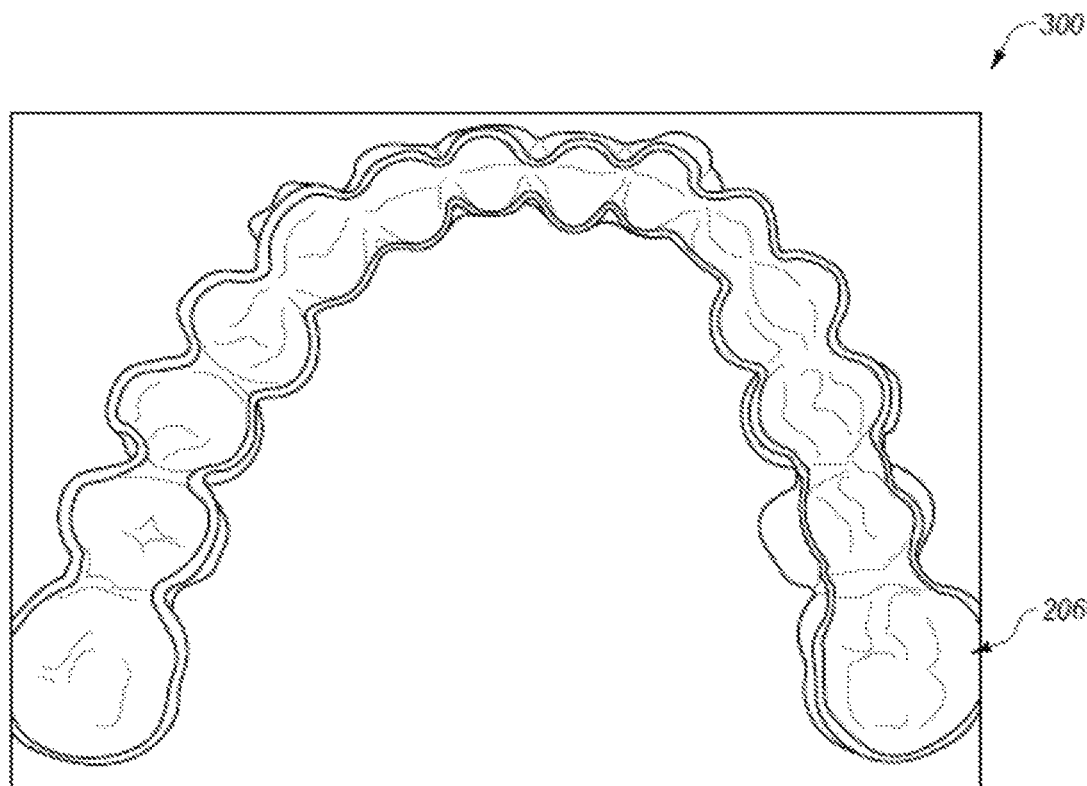
FIGS. 3A-3B illustrate an example top view image and an example motion control and screen path generated based on the top view image, in accordance with one embodiment.
Figure 3B:
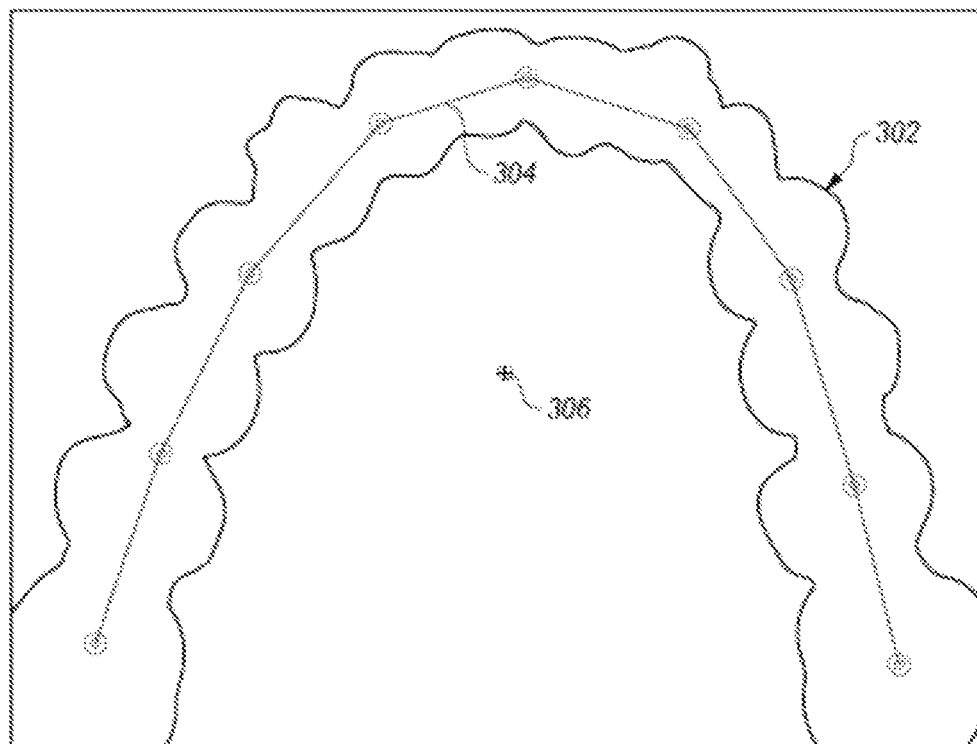

FIG. 2 illustrates an example imaging system 200 including a top view camera 202 and a side view camera 204, in accordance with one embodiment. The imaging system 200 may be used to extract the cutline of the plastic shell 206 being analyzed to determine whether there is a defect present by comparing the cutline of the plastic shell with a virtual cutline obtained from a digital model of the plastic shell 206. The plastic shell 206 may be secured in a stationary position by a platform part holder 208. The top view camera 202 may be configured to acquire a top view image 300 of the clear plastic shell 206 using certain illumination settings to enable the clear plastic aligner 206 to be visible in the top view image 300, as depicted in FIG. 3A, in accordance with an embodiment. Processing logic may obtain an outline 302 of a projection or silhouette of the plastic shell, as depicted in FIG. 3B, in accordance with an embodiment. The side view camera 204 may be used to acquire front and back side views of the plastic aligner by rotating around the plastic aligner 206 as it is held by the platform part holder 208 or by the plastic aligner 206 being rotated as the side view camera 204 remains stationary. In some embodiments, the plastic aligner 206 may not be secured by a platform part holder 208 and the plastic aligner 206 may be stationary on the platform while the side view camera 204 takes multiple images around the sides of the plastic aligner 206. The cameras 202 and 204 may be static and placed away from a conveyor path in some embodiments. The imaged plastic shell 206 may be placed on an x-y-z-θ (4 axes of motion control) platform or stage in some embodiments.

The imaging system 200 may acquire separate front and back side view images without stray light interference from the side not currently under inspection by using a backing screen 210 in embodiments. The backing screen 210 may be inserted into the gap between the front (buccal) and back (lingual) side of the plastic aligner. A motion control and screen path 304 is determined for the plastic shell 206 by identifying points between the front side and the back side of the plastic aligner that enable a screen path to be generated such that the backing screen 210 does not touch the plastic aligner throughout the screen path. Processing logic may detect a center 306 of the plastic aligner and adjust the motion control and screen path parameters accordingly. Further, the motion control speed may be high enough to achieve an inspection cycle within a target time period (e.g., 10-20 seconds) for both the front side and the back side of the plastic aligner. A mirror 212 may be used as a deflector to capture the images from the back side or the front side of the plastic aligner as it is held in the platform part holder 208 in embodiments. The mirror 212 may be angled at a certain degree (e.g., 45°, 50°, 55°, etc.) and may be used in combination with a light source to enable images to be captured that profile the cutline of the front (buccal) side and the cutline of the back (lingual) side of the plastic aligner.

In some embodiments, the imaging system 200 may not use a backing plate to prevent light from the front row teeth from interfering with imaging the back row teeth. In some embodiments, the imaging system 200 can use a focused light to acquire the cutline of the plastic shell 206. For example, the focused light may be used to illuminate just the cutline (e.g., buccal or lingual) that is currently being inspected without stray light interference from other outlines that are simultaneously in the camera's field of view (e.g., prevent the buccal cutline and the lingual cutline interfering with each other). In such an embodiment, the top view camera 202 may capture a top view image of the plastic shell 206 and extract a top view contour. In some embodiments, the plastic shell 206 may be placed within the field of view of the top view camera 202 and the imaging system 200 may align the plastic shell 206 to capture the top view image.

The top view image may be used to determine an inspection recipe including one or more side view images. Using the top view contour, contour x-y points may be transmitted to the side view camera 204. In some embodiments, properties of the camera, such as zoom and/or focus depth may be determined for the inspection recipe depending on which side of the plastic shell 206 is being captured. For example, the focus area of the side view camera 204 may be adjusted when the buccal side is farther away to accurately capture the lingual side of the plastic shell 206 without interference. Further, the top view image may be used to rotate the plastic shell 206 to proper orientation so the cutline under inspection is facing the side view camera 204. In some embodiments, the rotary motion required to rotate the plastic shell 206 may occur simultaneously with the x-y motion of the side view camera 204 and may not affect inspection time.

Once the inspection recipe is determined, imaging of the cutline may begin. A small cylindrical beam of light may be moved along the contour (local structured illumination or SLI) using the contour x-y points so that just the cutline above the light path is illuminated. An x-y-rotary stage motion control system or a multi-axis robot arm may be used to acquire the images. In some embodiments, the plastic shell 206 may rest on a glass platform and the cylinder of light may illuminate from below the glass platform to avoid total internal reflection from channeling light to the other row in the field of view.

Figure 22B:
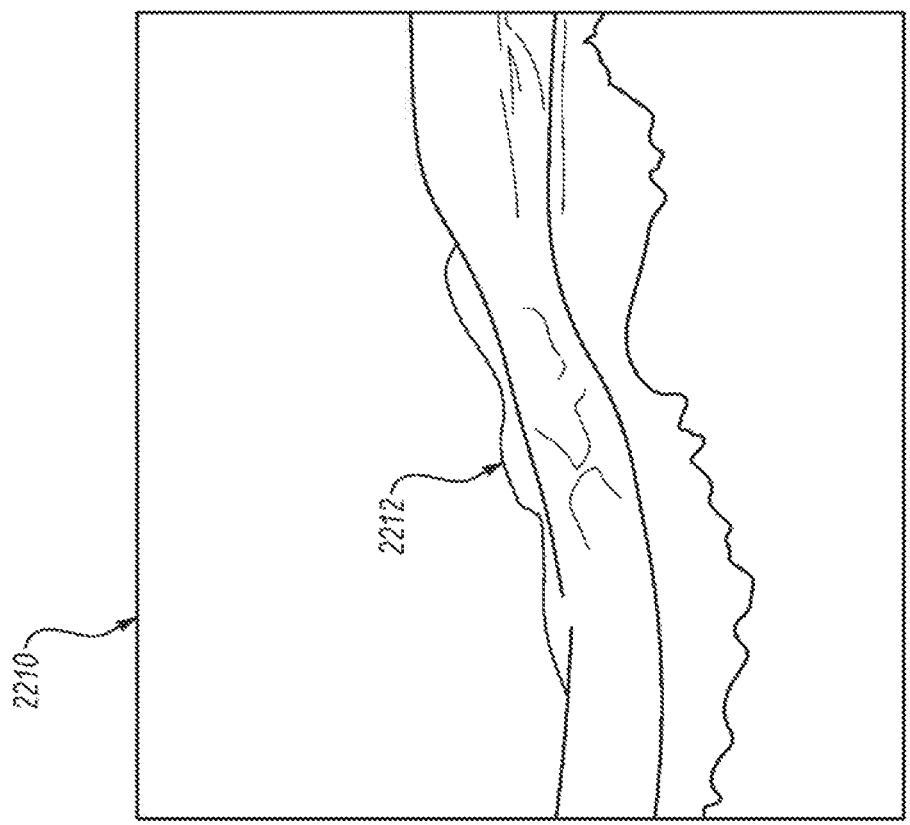
FIG. 22B illustrates an example side view image captured without a backing screen using structured light illumination (e.g., a focused light), in accordance with one embodiment.
Figure 22A:
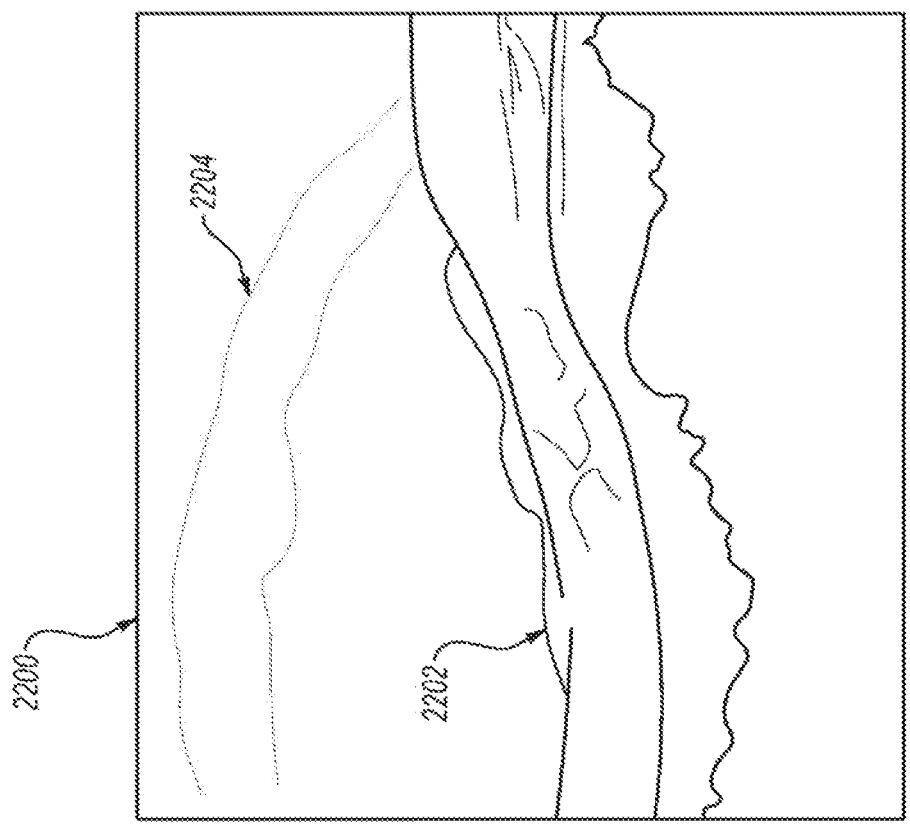
FIG. 22A illustrates an example side view image captured without a backing screen and without structured light illumination.

FIG. 22A illustrates an example side view image 2200 captured without a backing screen and without structured light illumination. As depicted, the side view camera captured cutline 2202 of a first side (e.g., buccal) of an aligner without structure light, which causes a cutline 2204 of the opposing side (e.g., lingual) of the aligner to be light up and interfere with proper cutline detection.

FIG. 22B illustrates an example side view image 2210 captured without a backing screen using structured light illumination (e.g., a focused light), in accordance with one embodiment. As depicted, the side view camera captured cutline 2212 of a first side (e.g., buccal) of an aligner using directional structure light illumination (LSI), which may suppress the cutline of the opposing side (e.g., lingual) and may allow reliable cutline detection. LSI may enable reliable cutline detection in instances where a channel between sides of an aligner are too narrow and/or titled to allow insertion of a backing screen.

Figure 23:
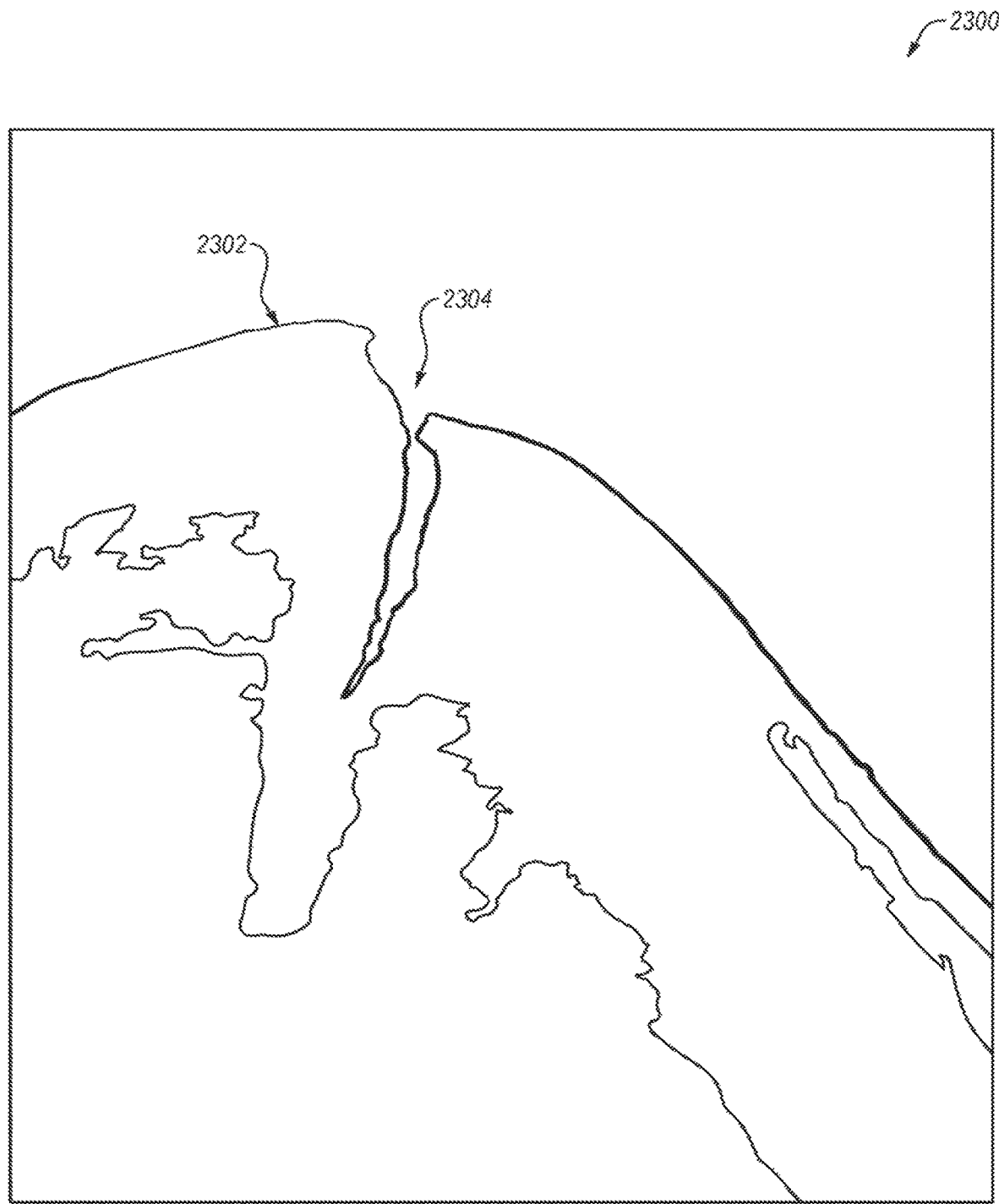
FIG. 23 illustrates an example of crack detection in the contour of an image of an aligner captured using a focused light, in accordance with one embodiment.

FIG. 23 illustrates an example of crack detection in the contour of an image 2300 of an aligner captured using a focused light, in accordance with one embodiment. As depicted, the focused light used directional structured light illumination to capture the side view image 2300, which produces a high contrast cutline definition of the cutline 2302. The high contrast may be produced by the light hitting the cutline surface in a perpendicular or near-perpendicular angle. The cutline 2302 captured can be analyzed and a crack 2304 can be identified using the disclosed techniques. In some embodiments, depth of focus (e.g., 20 microns-80 microns) may be configured to provide desired images.

In embodiments using the backing screen 210 or the focused light without a backing screen, numerous images of cutline may be captured and "stitched" or registered together to form a composite image 400. The composite image 400 may be a panoramic view of each of the front and back of the plastic shell in some embodiments. The side view images for the front and back may be stitched together to illustrate the cutline in a single plane, which may resemble unfolding or unwrapping of the cutline of the plastic aligner. For example, FIG. 4A depicts a side view composite image 400 of a back side of a shell in accordance with an embodiment. The side view composite image 400 includes three images 402, 404, and 406 that are stitched together in a linear fashion. Each of the images 402, 404, and 406 are captured at a 20 micron pixel resolution in the illustrated example. Any suitable number of images (e.g., 20) may be taken to produce the front side composite image and the back side composite image.

FIG. 4B illustrates an example edge 408 (e.g., second property) detected using the side view composite image 400 of the back side of the shell in FIG. 4A, in accordance with one embodiment. The edge 408 may be detected by tracing the cutline in the side view composite image 400 to obtain a line representing the edge 408. FIG. 4C illustrates an example comparison of an edge 410 detected from a side view composite image with a virtual or intended edge (e.g., approximated first property) 412 of the plastic shell from a digital model of the plastic shell, in accordance with one embodiment. In some embodiments, the intended edge 412 is determined by unwrapping a virtual cutline for the dental appliance into the plane in order to make the comparison to edge 410. The edge 410 and the virtual edge 412 may be overlaid and differences between the two edges may be determined. If the differences exceed a threshold, then a defect may be determined to be included in the plastic aligner and quality control may be performed.

Figure 5:
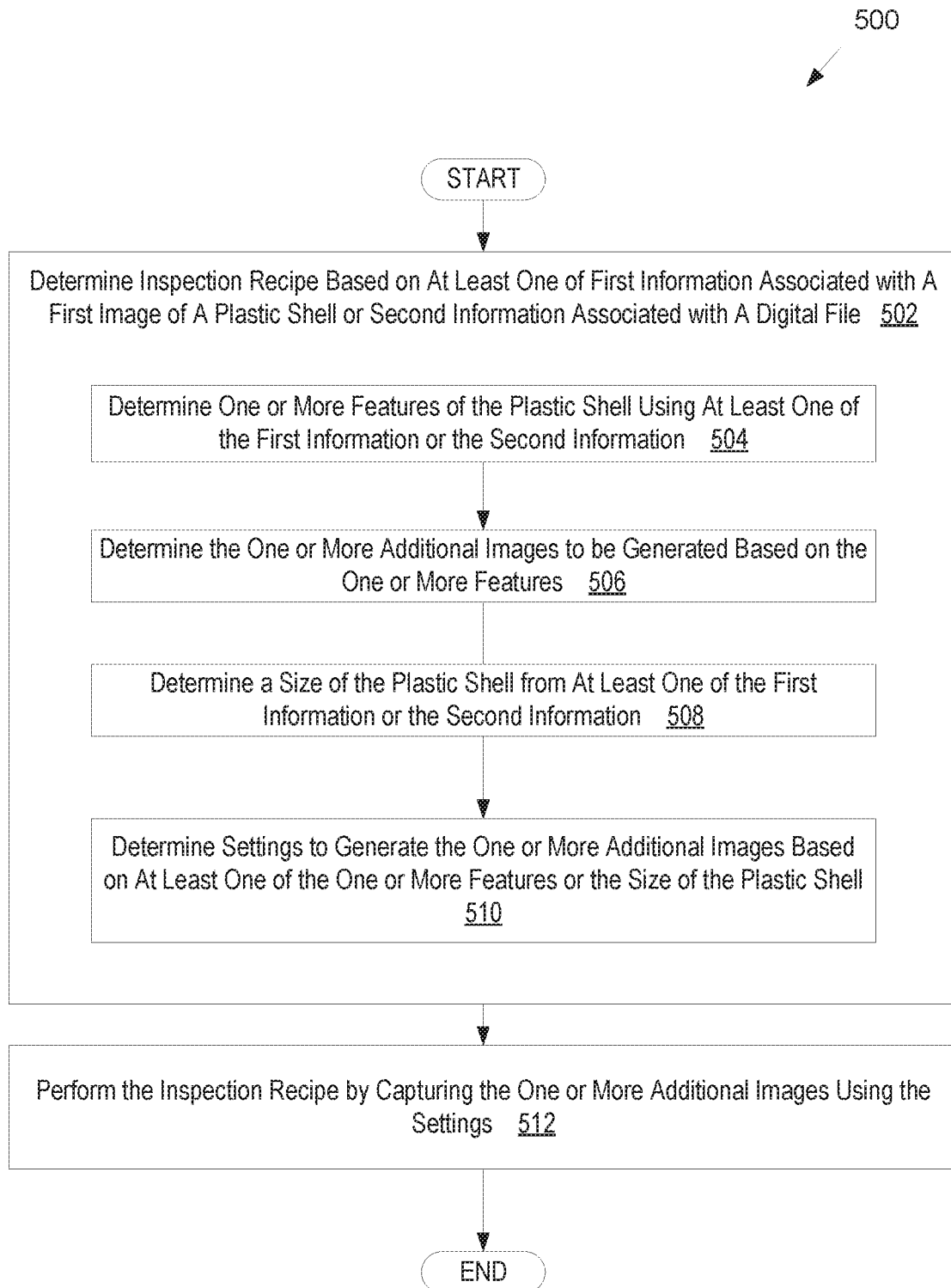
FIG. 5 illustrates a flow diagram for a method of determining an inspection recipe based on features of the plastic shell, in accordance with one embodiment.

FIG. 5 illustrates a flow diagram for a method 500 of determining an inspection recipe based on features of a plastic shell, in accordance with one embodiment. One or more operations of method 500 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 500 may be performed by a processing device executing an image based quality control module 2150 of FIG. 21. It should be noted that the method 500 may be performed for each unique aligner that is manufactured for each patient's treatment plan.

At block 502, processing logic may determine the inspection recipe based on at least one of first information associated with a first image of the plastic shell or second information associated with a digital file associated with the plastic shell. In some embodiments, the first image may be a top view image, a side view image, or a diagonal image of the plastic shell. The first information associated with the first image and/or the second information associated with the digital file may include a size of the plastic shell, a shape of the plastic shell, and/or one or more features of the plastic shell. The one or more features may include at least one of a precision cutline of the plastic aligner, a cavity of the plastic aligner associated with an attachment, an angle of a cutline of the plastic aligner, a distance between cavities of the plastic aligner associated with teeth (e.g., teeth crowding), a distance between cavities of the plastic aligner associated with attachments (e.g., attachment crowding), a distance between a front side and a back side of the plastic shell, or a thickness of the plastic shell. Block 502 may include performing operations of blocks 504, 506, 508, and 510.

At block 504, processing logic may determine one or more features of the plastic shell using at least one of the first information or the second information. At block 506, processing logic may determine the one or more additional images to be generated for the inspection recipe based on the one or more features. As described further below, the determination to generate the additional images for the inspection recipe may be predetermined for a plastic shell or dynamically made using a model and/or a rules engine. In an example, if the plastic aligner includes a precision cutline as a feature, processing logic may determine to generate an additional image at a location associated with the precision cutline. If an angle of the cutline is above a certain threshold angle, processing logic may determine to generate an additional image at a location associated with the cutline having the excessive angle. If a distance between teeth is more than a threshold, processing logic may determine to generate an additional image at a location of the plastic shell associated with those teeth because the plastic may be thinner and more susceptible to cracking at that location.

At block 508, processing logic may determine a size of the plastic shell from at least one of the first information or the second information. In some embodiments, processing logic may also determine a shape of the plastic shell from at least one of the first information or the second information. At block 510, processing logic may determine settings to generate the one or more additional images based on at least one of the one or more features, the size of the plastic shell, or the shape of the plastic shell. The settings may include at least one of an orientation of the one or more imaging devices, a zoom of the one or more imaging devices, or a focus of the one or more imaging devices. For example, plastic shells that are small in size may cause the zoom setting to be greater and a depth of focus to be greater. If there is a cavity associated with an attachment identified by the first information or the second information, then the orientation (e.g., positioning and angle) of the camera may be configured to capture a suitable image of the cavity.

In some embodiments, the settings may be predetermined for a first set of additional images that are generated by default for each aligner and/or the settings may be dynamically configured for a second set of additional images that are determined dynamically for the inspection recipe. For example, some defects, such as bubbles on the surface of the plastic shell may be detected at a certain depth of focus (e.g., 20 microns), and thus, a predetermined set of images may be configured to be captured on the front side and back side of the plastic shell to determine whether bubbles are present.

At block 512, processing logic may perform the inspection recipe by capturing the one or more additional images using the settings. The one or more additional images may be analyzed to determine whether one or more defects are included in the plastic shell. If so, then quality control may be performed for the plastic shell.

Figure 6:
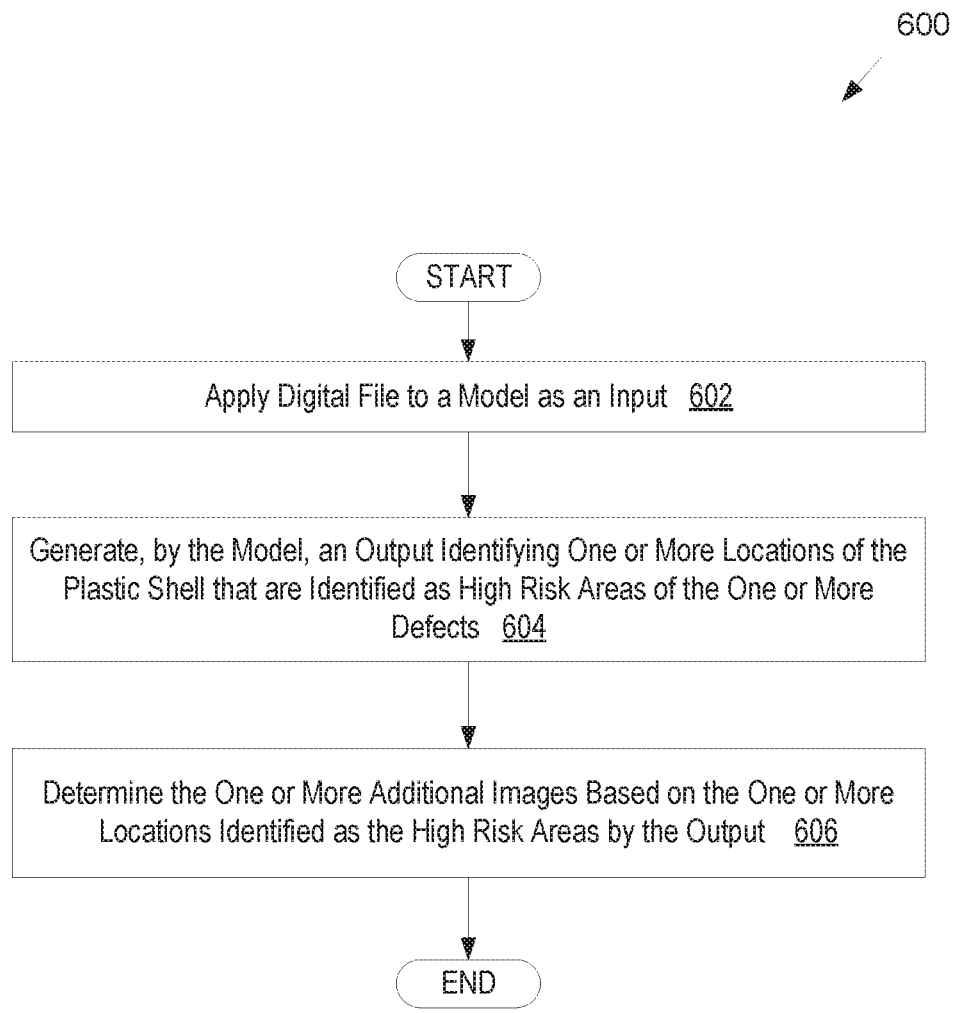
FIG. 6 illustrates a flow diagram for a method of determining one or more additional images to generate based on output from a model, in accordance with one embodiment.

FIG. 6 illustrates a flow diagram for a method 600 of determining one or more additional images to generate based on output from a model, in accordance with one embodiment. One or more operations of method 600 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 600 may be performed by a processing device executing an image based quality control module 2150 of FIG. 21. It should be noted that the method 600 may be performed for each unique aligner that is manufactured for each patient's treatment plan.

At block 602, processing logic may apply the digital file to a model as an input. The model may allow targeted inspection by identifying high risk areas for defects in the plastic shell. For example, at block 604, processing logic may generate, by the model, an output identifying one or more locations of the plastic shell that are identified as high risk areas of the one or more defects. At block 606, processing logic may determine the one or more additional images to generate for the inspection recipe based on the one or more locations identified as the high risk areas by the output.

In some implementations, the model may be a machine learning model that is trained to identify one or more high risk areas for one or more defects at one or more locations of the plastic shell. Processing logic may train a machine learning model to generate the trained machine learning model. A machine learning model may refer to a model artifact that is created by a training engine using training data (e.g., training input and corresponding target outputs). Training may be performed using a set of training data including at least one of a) digital files of a first set of plastic aligners with labels indicating whether or not each of the first set of plastic aligners experienced one or more defects or b) digital files of a second set of plastic aligners with labels indicating whether or not each of the second set of plastic aligners include one or more probable defects. Actual defects for aligners may be reported by manufacturing technicians, by an automated manufacturing system and/or by patients. Such historical data on actual defects on physical aligners may then be added as labels or metadata to the associated digital files of the aligners and/or images of the aligners. Probable defects for a digital file of an aligner may be determined by processing the digital design of the model using a numerical simulation, as described further below. For example, digital files of aligners may be processed using a numerical simulation to determine probable defects. Digital files of aligners with associated defects (as provided by real world data) and digital files of aligners with associated probable defects (as provided by an output of a numerical simulation) may be used together to generate a robust machine learning model that can predict probable defects of new aligners from digital files of those aligners.

The machine learning model may be composed of a single level of linear or non-linear operations (e.g., a support vector machine (SVM) or a single level neural network) or may be a deep neural network that is composed of multiple levels of non-linear operations. Examples of deep networks and neural networks include convolutional neural networks and/or recurrent neural networks with one or more hidden layers. Some neural networks may be composed of interconnected nodes, where each node receives input from a previous node, performs one or more operations, and sends the resultant output to one or more other connected nodes for further processing.

As mentioned, the information pertaining to whether the plastic aligners experienced defects may be obtained from historical patient feedback. For example, patients may provide a report that specifies the plastic aligner defect and the location of the defect may be determined (e.g., from the report, from scanning the aligner, etc.). Also, the patient may specify which aligner (e.g., top or bottom) at a particular stage of the treatment plan failed. In some instances, the patient may return the defective aligner to a site and the defective aligner may be scanned at the site to obtain an image of the digital model of the plastic aligner including the location of defect. As such, images of the defective aligners may be collected for image corpora (a set of image corpus, which may include a large set of images) and used as part of the training data. Information provided by the patient about the defective aligner or determined via scanned images may be correlated to determine the ID of the aligner, which can then be used to obtain the digital file of that particular aligner. The location of the defect may be placed in the digital file of the plastic aligner with a label indicating there is a defect at that location.

The digital file may be applied to a predictive model that uses numerical simulation as an input. Numerical simulation may be performed on the digital file of the plastic aligner to simulate one or more forces on the plastic aligner. In some embodiments, the forces simulate removing the aligner from teeth or the mold. The numerical simulation can determine when an amount of force required to remove the aligner from a mold or dental arch reaches a stress or strain level at any point on the plastic aligner that exceeds a threshold value, which may indicate that the particular point will crack. In some embodiments, a strain or stress threshold may be used during the numerical simulation to determine when a point on the digital design of the aligner will likely fail. In this way, the numerical simulation may operate as a predictive model that predicts probable defects on the digital file of the aligner by identifying one or more high risk areas for the defects. This simulation may be run dynamically on the digital file of the plastic aligner to identify high risk areas for defects to allow targeted inspection at those locations. Further, these simulations may be run numerous times on multiple digital files of plastic aligners and labels may be included with the digital files indicating whether or not the digital files include one or more probable points of failure. The digital files including the labels indicating whether the digital file includes the one or more probable defect may be used as input to train the machine learning model.

The numerical simulation may include finite element method, finite difference method, finite volume method, meshfree methods, smooth particle galerkin method, combinations of these methods, or the like. Finite element method (also referred to as finite element analysis) may refer to a numerical method for solving a structural problem related to an aligner by yielding approximate values of the unknowns at a discrete number of points over a domain using a series of partial differential equations. Finite difference method may refer to a numerical method for solving differential equations by approximating them with difference equations and calculating approximate values at discrete points. Finite volume method may refer to a method for representing and evaluating partial differential equations in the form of algebraic equations. Finite volume method may also calculate values (e.g., strain, force) at discrete places on a meshed geometry of the digital design of the aligner. "Finite volume" may refer to the small volume surrounding each point on a mesh. Meshfree methods may refer to methods that are based on interaction of nodes or points with all of the neighboring nodes or points. In other words, meshfree methods do not require connection between nodes of the simulation domain. The smooth particle galerkin method may be a form of a meshfree method.

Figure 7:
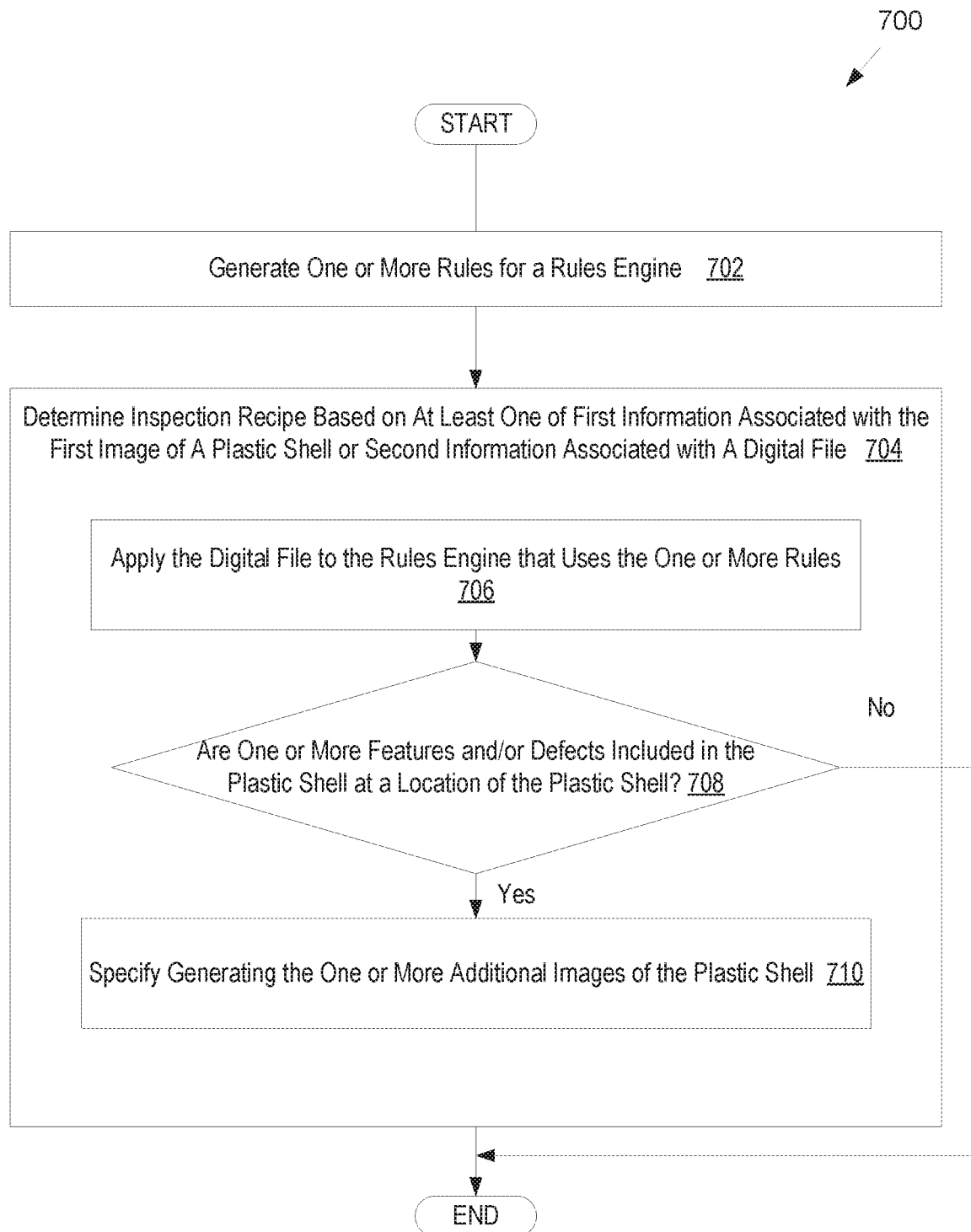
FIG. 7 illustrates a flow diagram for a method of determining the inspection recipe using a rules engine, in accordance with one embodiment.

FIG. 7 illustrates a flow diagram for a method 700 of determining the inspection recipe using a rules engine, in accordance with one embodiment. One or more operations of method 700 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 700 may be performed by a processing device executing an image based quality control module 2150 of FIG. 21. It should be noted that the method 700 may be performed for each unique aligner that is manufactured for each patient's treatment plan.

At block 702, processing logic may generate one or more rules for a rules engine. The rules may be generated based on at least one of a) historical data (e.g., images of defective aligners, reports, etc.) including reported defects of a set of plastic shells and locations of the reported defects on the set of plastic shells, b) digital files of a set of plastic shells with labels indicating whether or not each of the set of plastic shells experienced a defect, or c) digital files of a set of plastic shells with labels indicating whether or not each of the set of plastic shells include a probability that a defect is present in the plastic shell. The rules may be determined based on observations, output of the numerical simulation, or the like. For example, customers may provide reports that describe an aligner that broke during removal or includes another defect, manufacturing technician may observe aligner breakage during removal of the aligners from molds, and so forth. Hundreds or thousands of observations of aligners that include defects may be used to determine patterns or combinations of features included in the defective aligners that may have caused the defect. The rules may be determined that specify there is a probable defect when the patterns or combinations of features are present in subsequent designs. Further, the numerical simulation may be executed and identify probable defects as output. The output from hundreds or thousands of numerical simulations may be aggregated and patterns or combinations of features may be identified that are associated with the probable defects. The rules may be determined that specify there is a probable defect when the patterns or combinations of features are present in subsequent designs.

At block 704, processing logic may determine the inspection recipe based on at least one of first information associated with the first image of the plastic shell or second information associated with the digital file. Block 706 may include performing operations of blocks 706, 708, and 710. At block 706, processing logic may apply the digital file to the rules engine that uses the one or more rules. At block 708, processing logic may determine whether there are one or more features, one or more defects, and/or one or more possible defects included at one or more locations in the plastic shell. For examples, processing logic may determine whether there are one or more defects detected or one or more possible defects (e.g., high risk areas for defects) detected based on the first information associated with the first image of the plastic shell and/or on the second information associated with the digital file. The rules may specify that there are defects or possible defects associated with the features at certain locations. Further, the rules may specify capturing certain images if a defect is detected in the plastic shell. If there are no defects or possible defects included at the one or more locations, the method 700 may conclude. If it is determined that there are one or more defects or possible defects at the one or more locations, then at block 710, processing logic may specify generating the one or more additional images of the plastic shell according to the one or more rules.

The rules may include rules associated with sets of features (e.g., multiple features within a threshold proximity with one another) and/or with individual parameters. Processing logic may determine the features of the plastic aligner based on the first information associated with the first image or the second information associated with the digital file of the plastic aligner. The features may include at least one of an angle of a cutline at locations of the plastic aligner associated with an interproximal region of the dental arch of the patient, a curvature of the plastic aligner, a thickness of the plastic aligner, an undercut height associated with an attachment of a tooth of the tooth of the dental arch of the patient, a precision cutline, a distance between cavities of the plastic aligner associated with attachments of teeth of the dental arch of the patient, and/or a number of the cavities of the plastic aligner. Any one or more of these features in combination may be indicative of a high risk area for a probable defect in the plastic aligner. Accordingly, processing logic may determine to generate one or more additional images in the inspection recipe at the high risk areas for the probable defects in the plastic aligner.

Figure 8A:
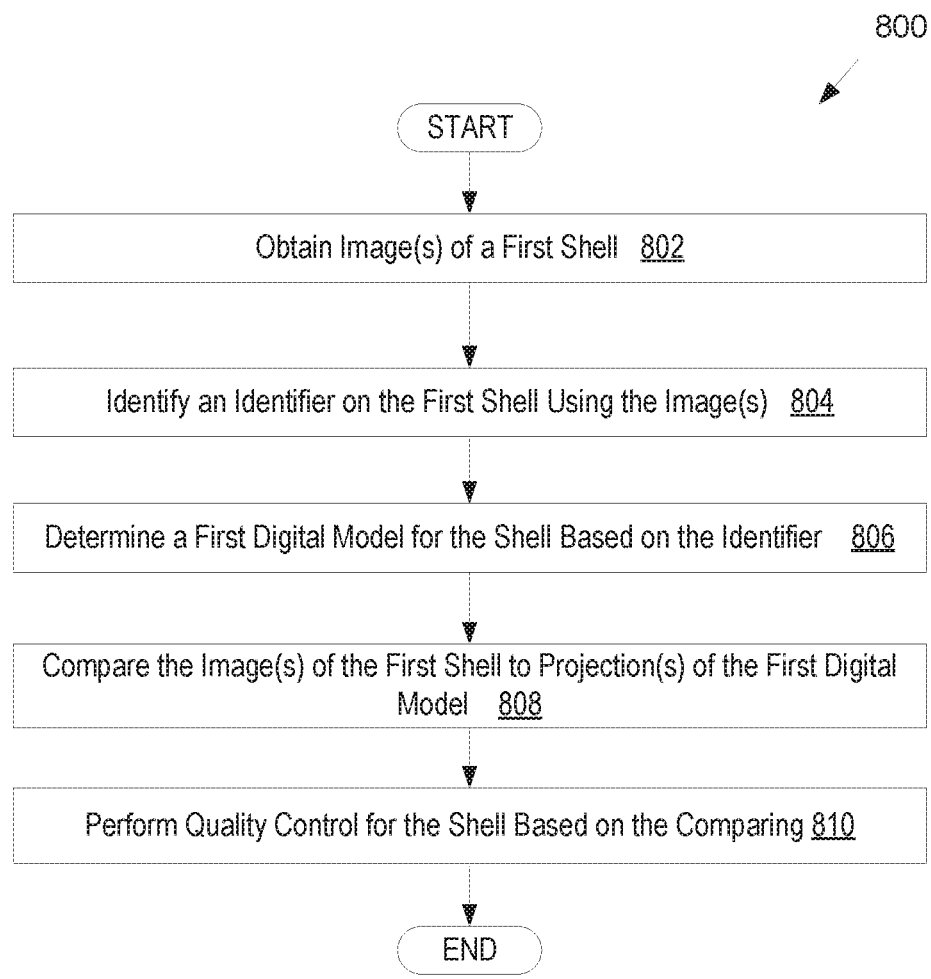
FIGS. 8A-8B illustrate flow diagrams for methods of performing image based quality control for a shell, in accordance with embodiments.

FIG. 8A illustrates a flow diagram for a method 800 of performing image based quality control for a shell, in accordance with one embodiment. One or more operations of method 800 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 800 may be performed by a processing device executing an image based quality control module 2150 of FIG. 21. It should be noted that the method 800 may be performed for each unique aligner that is manufactured for each patient's treatment plan.

At block 802, processing logic may obtain one or more images of a first shell (e.g., aligner). The first shell may have been manufactured for a dental arch of a patient, as described above. The first shell may be received via an automated feed mechanism at an image based quality control (IBQC) station or may be placed in the IBQC station by a user. The IBQC station may include one or more cameras and a fixed or rotating table on which to position received shells. The IBQC station may also include a lighting system that is configured to provide uniform exposure and image capture with uniform ambient parameters. The processing logic may configure the position of the cameras so one camera obtains top view images and another camera obtains side view images and/or diagonal view images of the shells in one embodiment. A rotating table may enable turning the shell being inspected in the IBQC station so images from different sides of the shell may be obtained.

The images that are obtained may include a first image that includes a part number identifier of the first shell. In some embodiments, an image of the part number identifier with a light (e.g., white) background may help with reading the laser markings that identify the part number identifier (e.g., barcode, serial number, or the like). Images of the aligner for quality control analysis may have a dark (e.g., black) background with the aligner evenly illuminated. The illumination of the aligner with a dark background may help distinguish the edges and shape of the aligner for quality control analysis.

At block 804, a technician or processing logic may identify an identifier (laser marking) on the first shell using the images. For example, in some embodiments, the processing logic may use optical character recognition for reading serial numbers or other text to identifier the part number identifier of the imaged aligner. Optionally, a technician may identify and input a part number identifier by visually inspecting the aligner. The identifier may represent the part number and may be laser marked on the aligner, as discussed above. The processing logic may use the first image that has the light background to identify the identifier. The identifier may be associated with a digital model of the aligner that is generated by the processing logic. In particular, prior to receiving images of the shell, the processing logic may receive a file including the digital model of the mold used to create the particular aligner that is being inspected.

At block 806, processing logic may determine, from a set of digital models of shells, a first digital model for the first shell based on the identifier. Each digital model of the set of digital models is for a specific shell customized for a specific patient at a particular stage in the patient's treatment plan. The digital models of the shells may be generated based on digital models of the molds at each respective stage of the patient's treatment plan, as discussed in detail with reference to method 1600 of FIG. 16.

At block 808, processing logic may compare the images of the first shell to projections of the first digital model. In one embodiment, processing logic may compare a top view image of the first shell to a top view of the first digital model to determine whether a shape of the first shell is deformed. If one or more differences between a first shape of a first projection of the digital model of the shell and a second shape of the first shell exceeds a first threshold, then processing logic may determine that the shape of the first shell is deformed, as described further below with reference to methods 900 and 1100 in FIG. 9A and FIG. 11 and as illustrated by examples in FIGS. 10, 12, and 13A-13B.

However, if the one or more differences do not exceed the first threshold, then processing logic may perform additional comparisons. For example, processing logic may generate a modified projection of the digital model by deforming the first shape of the first projection of the digital model of the first shell toward the second shape of the first shell to approximately match the second shape of the first shell. Processing logic may determine whether one or more remaining differences between a third shape of the modified projection and the second shape of the first shell exceed a second threshold. If so, processing logic may determine that the outline (or other property) of the first shell is deformed, as described further below with reference to method 1400 in FIG. 14A and as illustrated by examples in FIGS. 15A-15C.

At block 810, processing logic may perform quality control for the first shell based on the comparing. The results of the IBQC analysis may be compiled and a classification may be assigned to the aligner being inspected. If any of the comparisons indicate that there is a manufacturing flaw present, then the processing logic may classify the aligner as defective. If every comparison does not indicate that a flaw is present, then the processing logic may classify the aligner as not defective. Optionally, the system may indicate that the aligner requires further inspection by a technician when the analysis is inconclusive. The results may be presented to the user in a user interface.

Figure 8B:
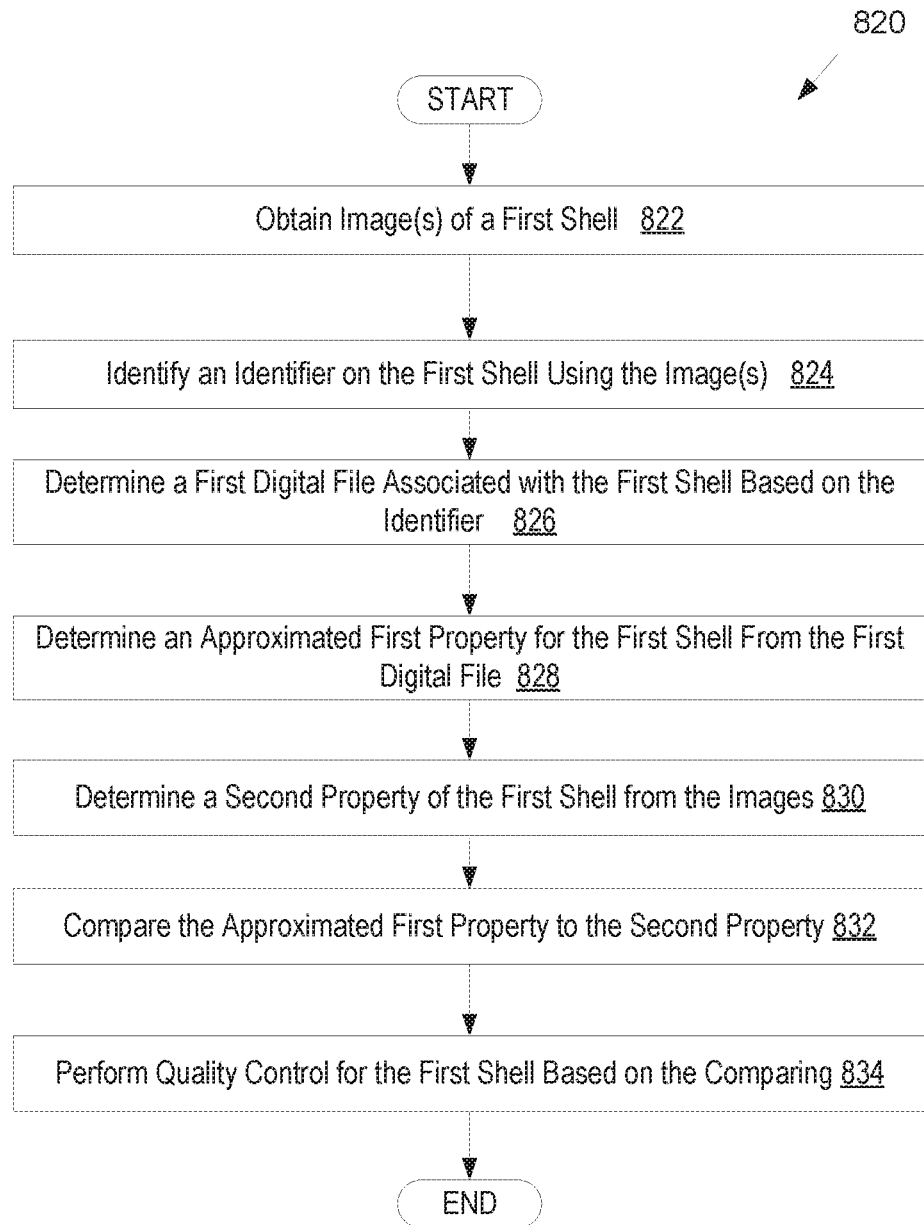

FIG. 8B illustrates a flow diagram for another method 820 of performing image based quality control for a shell, in accordance with one embodiment. One or more operations of method 820 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 820 may be performed by a processing device executing an image based quality control module 2150 of FIG. 21. It should be noted that the method 820 may be performed for each unique aligner that is manufactured for each patient's treatment plan.

At block 822, processing logic may obtain one or more images of a first shell (e.g., aligner). The first shell may have been manufactured for a dental arch of a patient, as described above. The first shell may be received via an automated feed mechanism at an image based quality control (IBQC) station or may be placed in the IBQC station by a user. The IBQC station may include one or more cameras and a fixed or rotating table on which to position received shells. The IBQC station may also include a lighting system that is configured to provide uniform exposure and image capture with uniform ambient parameters. The processing logic may configure the position of the cameras so one camera obtains top view images and another camera obtains side view images and/or diagonal view images of the shells in one embodiment. A rotating table may enable turning the shell being inspected in the IBQC station so images from different sides of the shell may be obtained.

The images that are obtained may include a first image that includes a part number identifier of the first shell. In some embodiments, an image of the part number identifier with a light (e.g., white) background may help with reading the laser markings that identify the part number identifier (e.g., barcode, serial number, or the like). Images of the aligner for quality control analysis may have a dark (e.g., black) background with the aligner evenly illuminated. The illumination of the aligner with a dark background may help distinguish the edges and shape of the aligner for quality control analysis.

At block 824, a technician or processing logic may identify an identifier (laser marking) on the first shell using the images. For example, in some embodiments, the processing logic may use optical character recognition for reading serial numbers or other text to identify the part number identifier of the imaged aligner. Optionally, a technician may identify and input a part number identifier by visually inspecting the aligner. The identifier may represent the part number and may be laser marked on the aligner, as discussed above. The processing logic may use the first image that has the light background to identify the identifier. The identifier may be associated with a digital file.

At block 826, processing logic may determine, from a set of digital files, a first digital file associated with the first shell based on the identifier. Each digital file of the set of digital files includes a digital model of at least one of a shell (e.g., an aligner) or a digital model of a mold used to manufacture the aligner. Each digital file is for a specific shell customized for a specific patient at a particular stage in the patient's treatment plan.

In one embodiment, the digital file associated with the identifier includes a digital model of the first shell (e.g., an aligner) that is dynamically generated by the processing logic or that is received from another source. The digital model of the first shell may be dynamically generated by manipulating a digital model of a mold used to manufacture the first shell. The digital model of the first shell may be generated by simulating a process of thermoforming a film over a digital model of the mold by enlarging the digital model of the mold into an enlarged digital model (e.g., by scaling or inflating a surface of the digital model). Further, generation of the digital model of the first shell may include computing a projection of a cutline onto the enlarged digital model, virtually cutting the enlarged digital model along the cutline to create a cut enlarged digital model, and selecting the outer surface of the cut enlarged digital model. In one embodiment, the digital model of the first shell comprises an outer surface of the first shell, but does not necessarily have a thickness and/or does not comprise an inner surface of the first shell, though it may include a thickness or inner surface in other embodiments.

In one embodiment, the digital file includes a mold that is used to manufacture the first shell. In one embodiment, the digital file may include multiple files associated with the first shell, where the multiple files include a first digital file that comprises a digital model of the mold and a second digital file comprises a digital model of the first shell. Alternatively, a single digital file may include both a digital model of the mold and a digital model of the first shell.

At block 828, processing logic determines an approximated first property for the first shell from the first digital file. In one embodiment, the approximated first property is based on a projection of the digital model of the first shell onto a plane defined by an image of the first shell. In one embodiment, the approximated first property is based on a manipulation of a digital model of a mold used to create the first shell. For example, in some embodiments, the approximated first property may be based on a projection of the digital model of the mold onto the plane defined by the image of the first shell. In such instances, the projection of the mold may be scaled or otherwise inflated to approximate a projection of an aligner thermoformed on the mold. In a further embodiment, the approximated first property is based on a manipulation of the digital model, wherein the manipulation causes an outer surface of the digital model to have an approximate shape of the first shell, and is further based on a projection of the outer surface of the digital model onto the surface defined by the image of the first shell. In some embodiments, the approximated first property may include an approximated outer surface of the first shell. The approximated outer surface of the first shell may be referred to as a digital model of the first shell. In some embodiments, the approximated first property may include a first shape of a projection of the approximated outer surface of the first shell onto a plane defined by an image of the first shell.

At block 830, processing logic determines a second property of the first shell from the one or more images. An image of the first shell may define a plane. The second property may include a second shape of the first shell or projection thereof. The second property may be determined directly from the one or more images (e.g., top view, side view, etc.). In one embodiment, a contour of the second shape is drawn from the image.

At block 832, processing logic may compare the approximated first property to the second property. If one or more differences between the approximated first property and the second property exceeds a first threshold, then processing logic may determine that the first shell is deformed, as described further below with reference to methods 920 in FIG. 9B and as illustrated by the example in FIG. 10. For example, if the first shape fails to approximately match the second shape, then it may be determined that the first shell is deformed.

However, if the one or more differences do not exceed the first threshold, then processing logic may perform additional comparisons. For example, processing logic may generate a modified projection of the approximated outer surface of the first shell by deforming a curvature of the first shape of the projection toward the second curvature of the second shape of the first shell to cause the curvature of a deformed first shape of the projection to approximately match the second curvature of the second shape of the first shell. Processing logic may determine whether one or more additional differences between the deformed first shape and the second shape exceed a second threshold. If so, processing logic may determine that a outline (or other property) of the first shell is inaccurate, as described further below with reference to method 1420 and method 1440 in FIGS. 14B and 14C, respectively.

At block 834, processing logic may perform quality control for the first shell based on the comparing. The results of the IBQC analysis may be compiled and a classification may be assigned to the shell being inspected. If any of the comparisons indicate that there is a manufacturing flaw present, then the processing logic may classify the shell as defective. If every comparison does not indicate that a flaw is present, then the processing logic may classify the shell as not defective. Optionally, the system may indicate that the shell warrants further inspection by a technician when the analysis is inconclusive. The results may be presented to the user in a user interface.

Figure 9A:
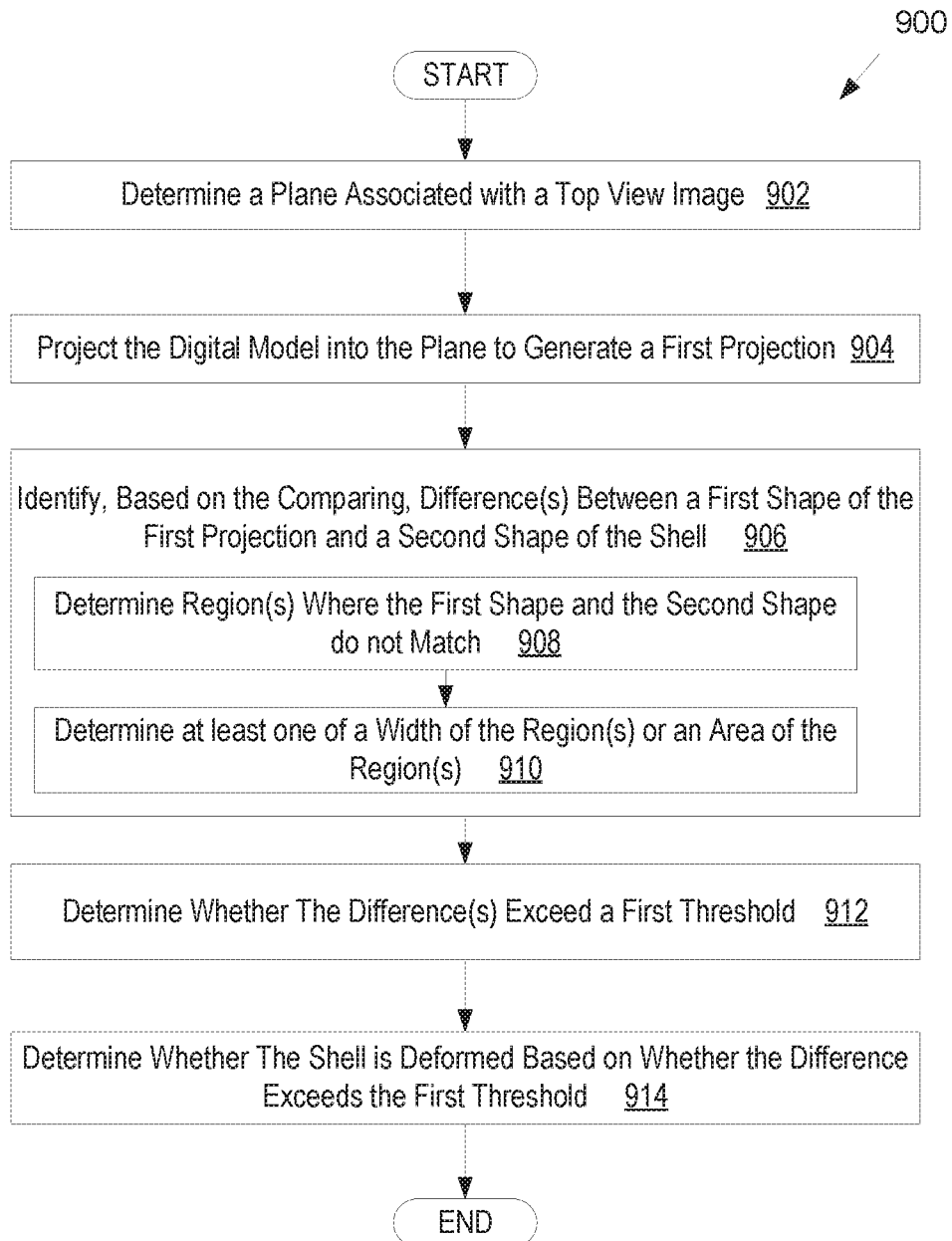
FIGS. 9A-9B illustrate flow diagrams for methods of determining whether a shape of the shell is deformed, in accordance with embodiments.

FIG. 9A illustrates a flow diagram for a method 900 of determining whether a shape of the shell is deformed, in accordance with one embodiment. One or more operations of method 900 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 900 may be performed by a processing device executing an image based quality control module 2150 of FIG. 21. Method 900 may be performed to determine whether shapes of the shells are deformed. It should be noted that, in some embodiments, processing logic may have performed block 802, 804, and 806 of method 800 (e.g., obtained a top view image of the first shell and determined a first digital model for the first shell based on an identifier) prior to method 900 executing.

Figure 10:
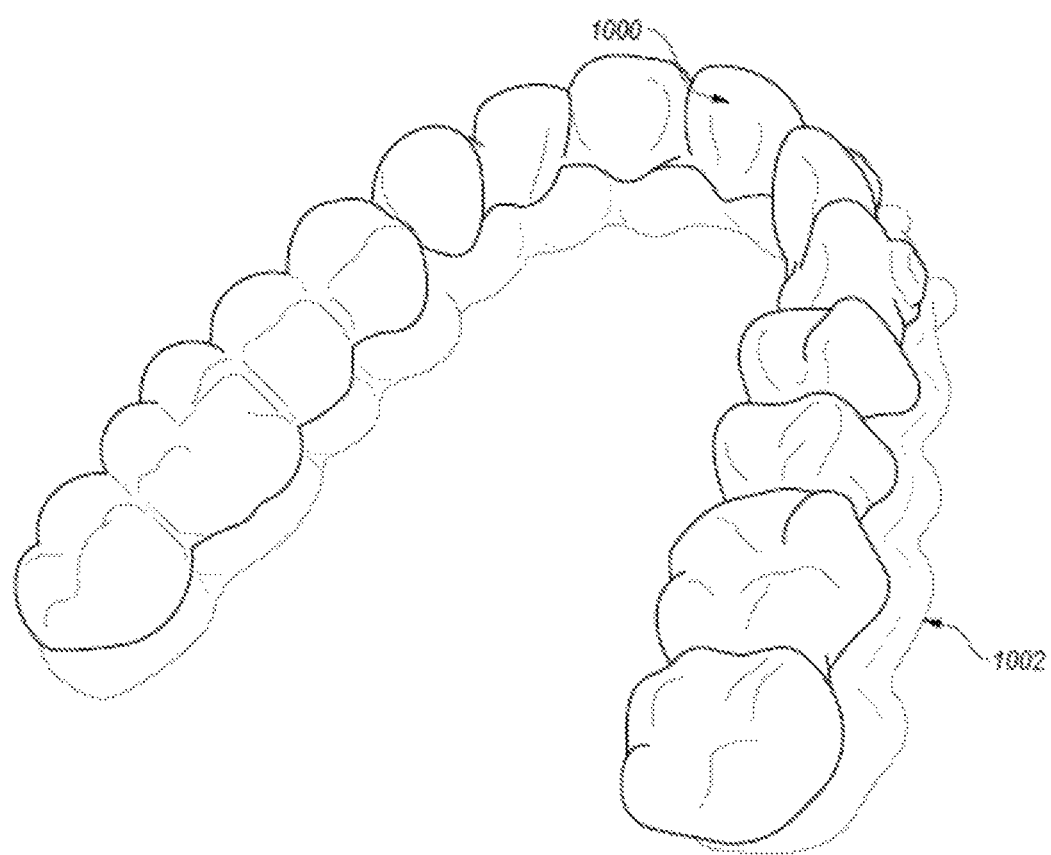
FIG. 10 illustrates a digital model of an aligner projected onto an image of the aligner, in accordance with one embodiment.

At block 902, processing logic may determine a plane associated with the top view image of the first shell. The top view image of the first shell may include a two-dimensional object or a three-dimensional object including pixels representing the image of the first shell lying in an image plane. At block 904, processing logic may project the first digital model of the first mold (or a manipulated digital model of a mold used to manufacture the first shell) into the determined plane to generate a first projection. For example, as depicted in FIG. 10, a first projection 1000 of the digital model is projected onto an image 1002 of the aligner. In some embodiments, the first projection 1000 is projected into the same plane as the image 1002 of the first shell such that the first projection 1000 overlays the image 1002. Method 900 will be discussed with reference to the first digital model of the first aligner. However, it should be understood that the operations described work equally well using a manipulated digital model of a mold for the first shell.

At block 906, processing logic may identify, based on the comparing performed at block 808 of method 800, one or more differences between the first shape of the first projection 1000 and the second shape of the first shell. In some embodiments, processing logic may identify the one or more differences by determining (block 908) one or more regions where the first shape of the first projection 1000 and the second shape of the first shell do not match. Processing logic may further determine (block 910) the differences of the regions (e.g., at least one of a thickness of the one or more regions or an area of the one or more regions).

At block 912, processing logic may determine whether the one or more differences (e.g., thickness, area, etc.) between the first shape of the first projection 1000 and the second shape of the first shell exceed the first threshold. The first threshold may be any suitable configurable amount (e.g., thickness greater than three millimeters (mm), 5 mm, 10 mm, a region having an area greater than one hundred mm squared, etc.). At block 914, processing logic may determine whether the first shell is deformed based on whether the one or more differences exceeds the first threshold. When a difference exceeds the first threshold, processing logic may classify the aligner as deformed. When the one or more differences do not exceed the first threshold, processing logic may determine that the shape of the first shell is not deformed and may proceed to perform additional quality control (e.g. outline deformation detection).

Figure 9B:
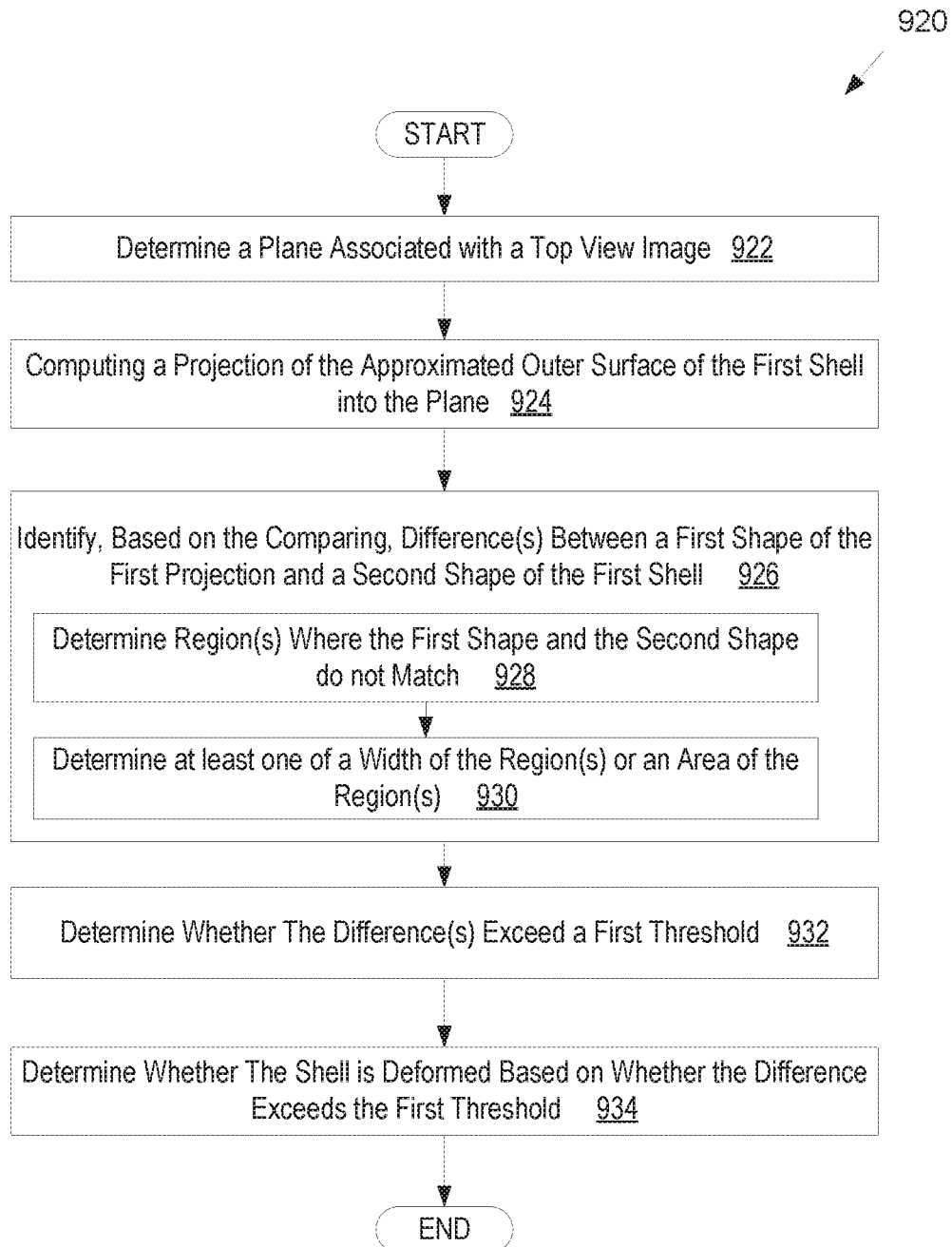

FIG. 9B illustrates a flow diagram for another method 920 of determining whether a shape of the shell is deformed, in accordance with one embodiment. One or more operations of method 920 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 920 may be performed by a processing device executing an image based quality control module 2150 of FIG. 21. Method 920 may be performed to determine whether shapes of the shells are deformed. It should be noted that, in some embodiments, processing logic may have performed block 822, 824, 826, and 828 of method 820 (e.g., obtained a top view image of the first shell, identify an identifier of the first shell, determined a first digital file for the first shell based on an identifier, and determined an approximated first property for the first shell from the first digital file) prior to method 920 executing.

At block 922, processing logic may determine a plane associated with the top view image of the first shell. The top view image of the first shell may include pixels representing the image of the first shell lying in an image plane. At block 924, processing logic may compute a projection of the approximated outer surface of the first shell into the first plane. For example, as depicted in FIG. 10, a first projection 1000 of the approximated outer surface of the first shell is projected onto an image 1002 of the aligner. In some embodiments, the first projection 1000 is projected into the same plane as the image 1002 of the first shell such that the first projection 1000 overlays the image 1002. In some embodiments, a digital model of a mold for the first shell is manipulated by inflating or expanding a size of the digital model, where the amount of inflation or expansion is based on a thickness of the first shell. The inflated or expanded digital model of the mold may then be cut along a cut line to compute an approximated outer surface of the first shell. This approximated outer surface of the first shell may then be projected onto the plane at block 924.

At block 926, processing logic may identify, based on the comparing performed at block 832 of method 820, one or more differences between a first shape of the first projection 1000 and the second shape of the first shell. In some embodiments, processing logic may identify the one or more differences by determining (block 928) one or more regions where the first shape of the first projection 1000 and the second shape of the first shell do not match. Processing logic may further determine (block 930) the differences of the regions (e.g., at least one of a thickness of the one or more regions or an area of the one or more regions).

At block 932, processing logic may determine whether the one or more differences (e.g., thickness, area, etc.) between the second shape of the first shell and the first shape of the first projection 1000 exceed the first threshold. The first threshold may be any suitable configurable amount (e.g., thickness greater than three millimeters (mm), 5 mm, 10 mm, a region having an area greater than one hundred mm squared, etc.). At block 934, processing logic may determine whether the first shell is deformed based on whether the one or more differences exceeds the first threshold. When a difference exceeds the first threshold, processing logic may classify the aligner as deformed. When the one or more differences do not exceed the first threshold, processing logic may determine that the shape of the first shell is not deformed and may proceed to perform additional quality control (e.g. outline deformation detection).

Figure 11:
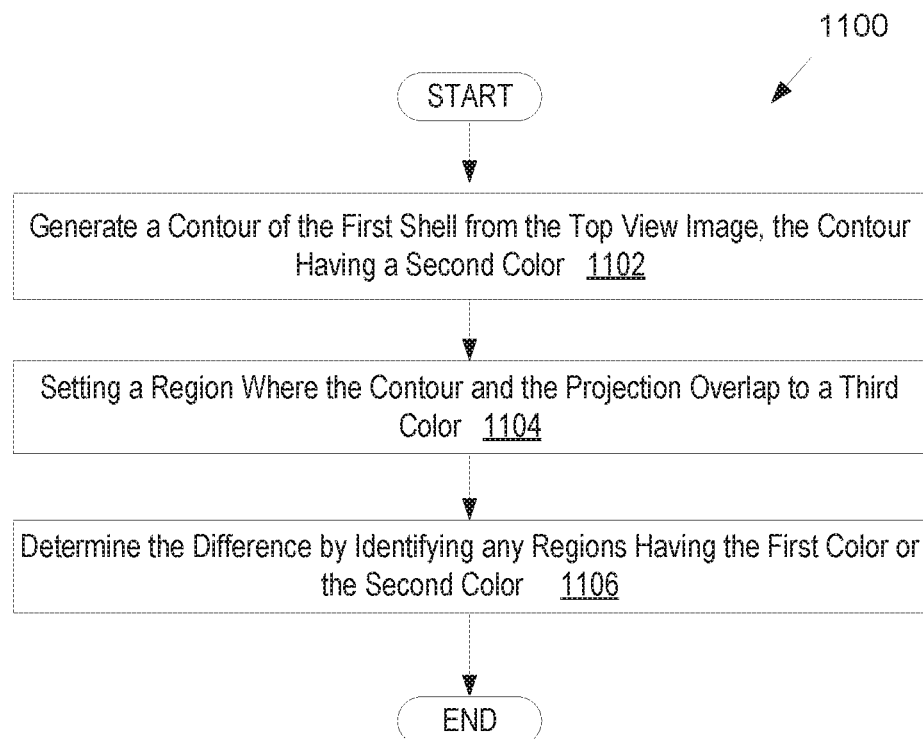
FIG. 11 illustrates a flow diagram for a method of determining a difference in shape between the digital model of the shell and the image of the shell, in accordance with one embodiment.

FIG. 11 illustrates a flow diagram for a method 1100 of determining a difference in shape between the digital model of the shell (e.g., approximated outer surface of the shell without a thickness) and the image of the shell, in accordance with one embodiment. One or more operations of method 1100 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 1100 may be performed by a processing device executing an image based quality control module 2150 of FIG. 21.

Figure 12:
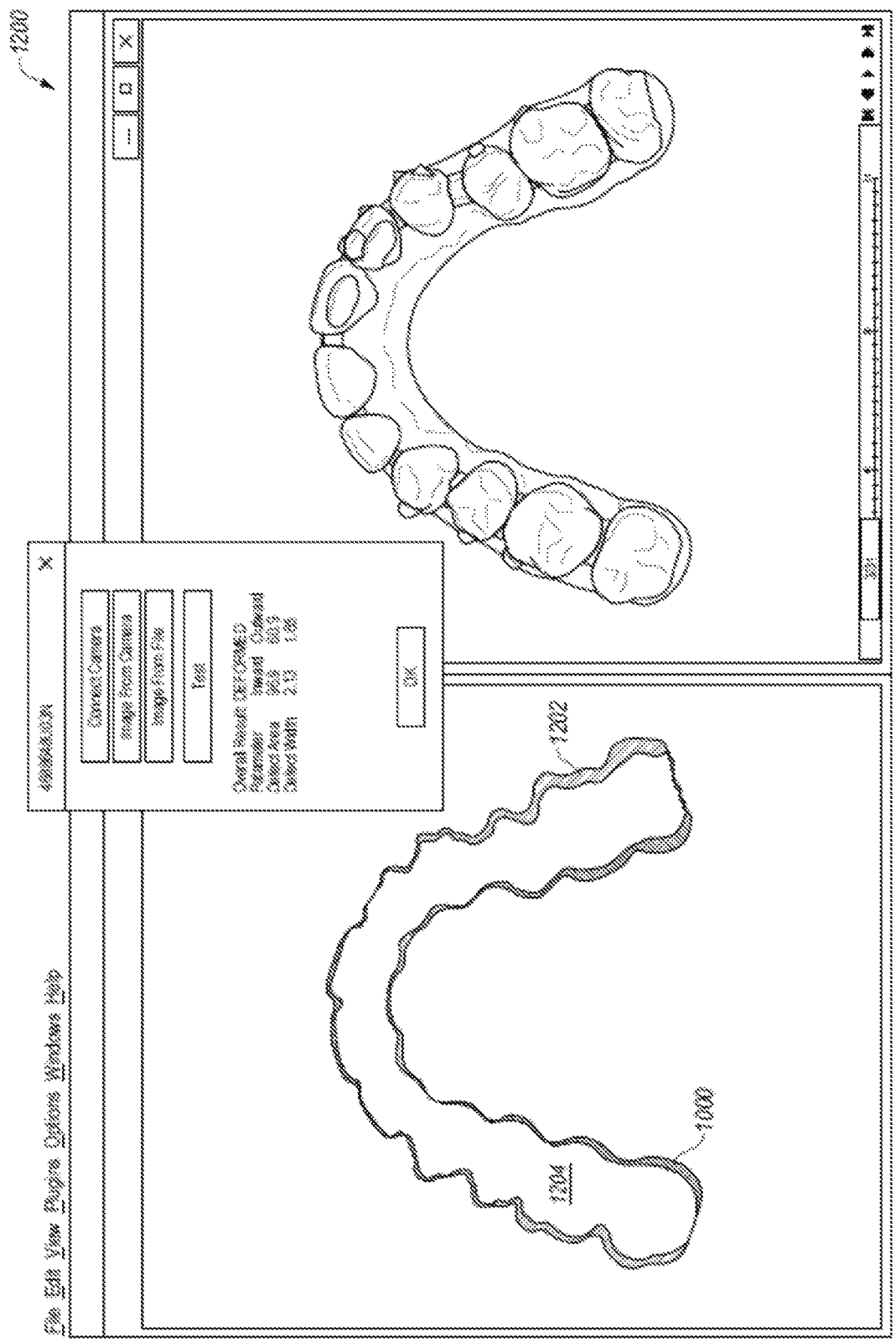
FIG. 12 illustrates a user interface used for image based quality control for a shell, in accordance with one embodiment.

In some embodiments, method 1100 may be performed to identify (block 906 of method 900, block 926 of method 920) the one or more differences between the shape of the first projection 1000 and the shape of the first shell. FIG. 12 illustrates an example user interface 1200 depicting the first projection 1000 overlaid on a top view image 1202 of the first shell. Image based quality control may include pigmenting the obtained image of the aligner having the dark/black background such that the region occupied by the aligner is highlighted in a plane on the image. The user interface 1200 may be implemented in computer instructions stored on one or more memory devices and executable by one or more processing devices of a computing device, such as the computing device 2100 in FIG. 21. The user interface 1200 may be displayed on a display of the computing device.

At block 1102, processing logic may generate a contour of the first shell from the top view image 1202. As depicted, the first projection 1000 has a first color (e.g., red) and the contour of the first shell has a second color (e.g., blue). Processing logic may set (block 1104) a region 1204 where the contour and the projection 1000 overlap to a third color (e.g., white). The first color, second color, and third color may differ from one another. Further, processing logic may determine the one or more differences by identifying any region having the first color or the second color. The portions of the projections that do not overlap may be easily identified using the user interface 1200 based on the first and second colors bordering the third color of the region 1204. For example, the visible regions in FIG. 12 that are the first color (e.g., red) and the second color (e.g., blue) may be identified and certain measurements may be taken, such as the thickness, area, and/or perimeter of the regions. If the measurements exceed the first threshold, then the processing logic may determine that the aligner is deformed.

The user interface 1200 displays a popup message that provides various options and results. The options may include connecting a camera, loading an image from the camera, loading an image from a file, and performing the IBQC process. The results may include a classification (e.g., in this case, Deformed), and the actual results for an inward parameter and outward parameter. The defect area for the inward parameter is 96.9 and the defect thickness for the inward parameter is 2.13. The defect area for the outward parameter is 60.9 and the defect thickness of the outward parameter is 1.85. Since one or more of these measurements exceeds a desired threshold, the processing logic may determine that the aligner being inspected is deformed. A technician may read this result and may have another aligner created, fix the deformation, or the like.

Figure 13B:
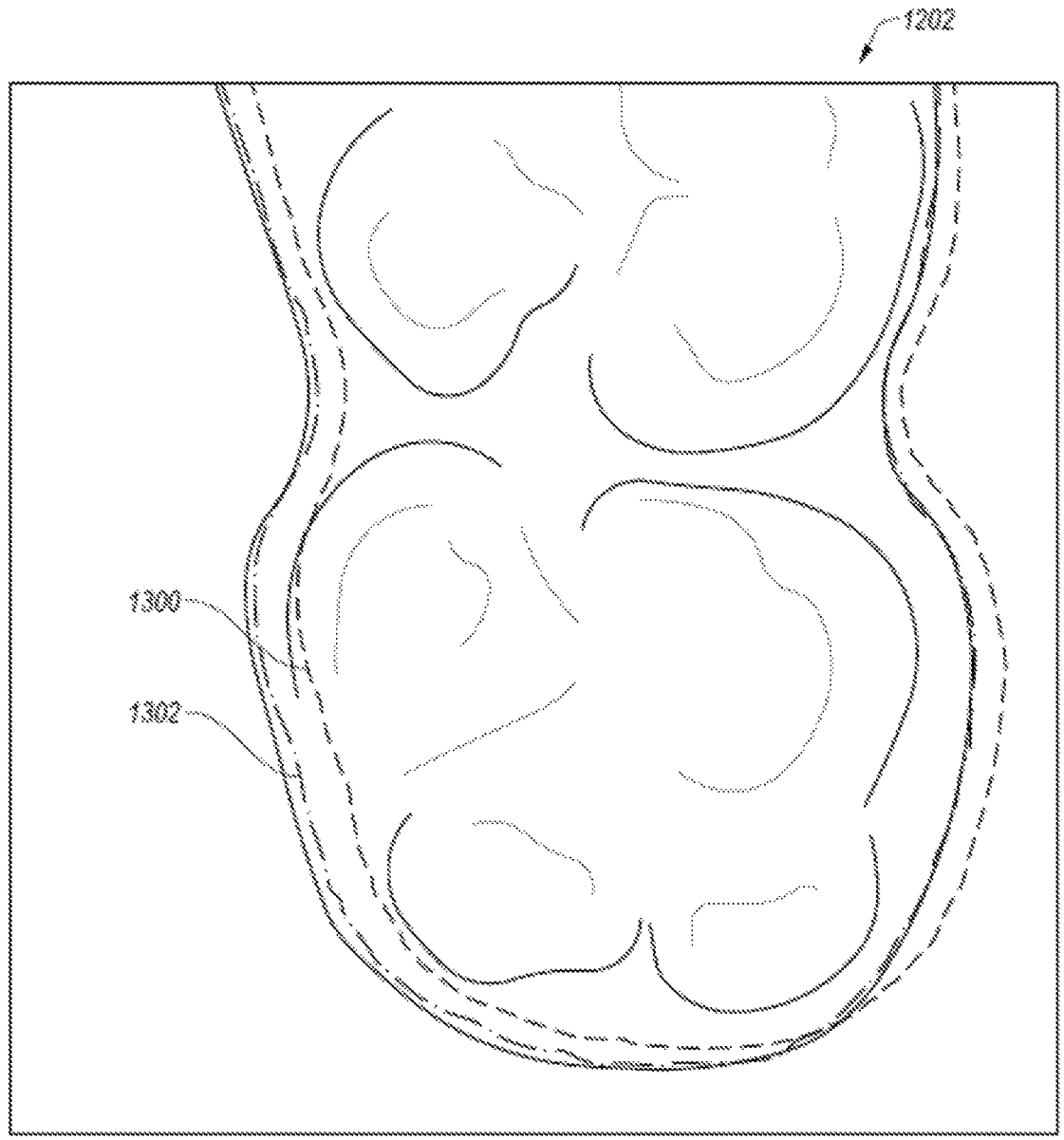

FIGS. 13A-13B illustrate additional example comparisons of a contour of a digital model of an aligner (e.g., approximated outer surface of the aligner without a thickness) with a contour of an image of the aligner to detect deformation, in accordance with one embodiment. FIG. 13A depicts the top view image 1202 of the aligner with a first line 1300 representing the contoured edge of the first projection 1000 of the digital model of the aligner and a second line 1302 representing the contoured edge of the image 1202 of the aligner. In some instances, the first line 1300 may be set to first color (e.g., red) and the second line 1302 may be set to a second color (e.g., blue) different than the first color. A defect region for the aligner may be determined to be between the first line 1300 and the second line 1302. One or more measurements may be obtained from the defect region, as described above. For example, a thickness of the defect region, an area of the defect region, etc. If the measurements exceed a threshold, then the aligner may be determined to be deformed.

FIG. 13B depicts a close-up visualization of a portion of the image 1202. As depicted, the first line 1300 representing the contoured edge of the projected digital model of the aligner does not match the second line 1302 representing the contoured edge of the image 1202 of the aligner. As such, the aligner appears to be wider than expected according to the first projection of the digital model of the aligner. In such a case, the processing logic may measure the thickness, area, or perimeter, of the region between the lines 1300 and 1302 and determine that the aligner is deformed.

Figure 14A:
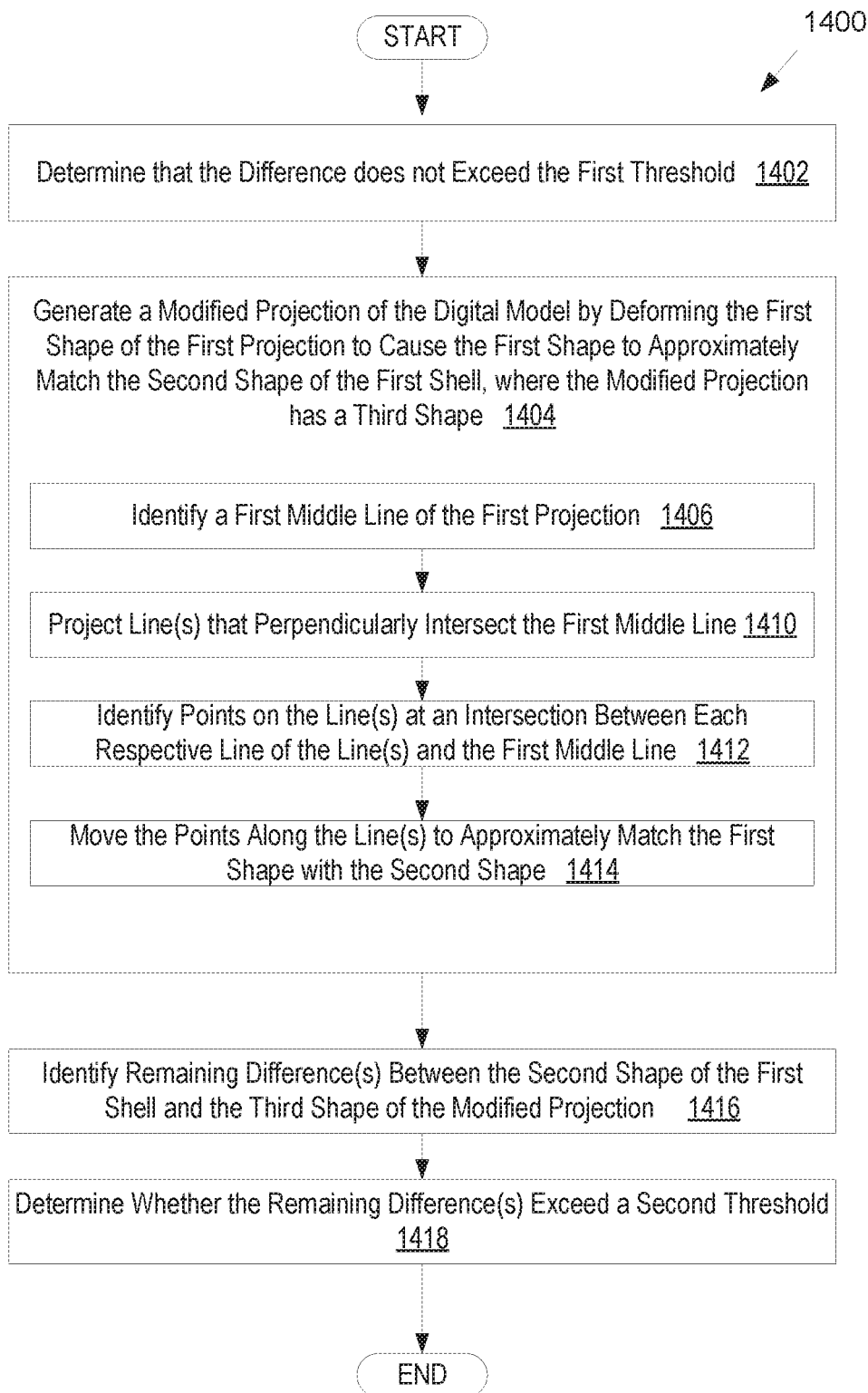
FIGS. 14A-14C illustrate flow diagrams for methods of deforming a digital model contour to more closely match the contour of the image of the aligner to detect cutline variations, in accordance with one embodiment.

FIG. 14A illustrates a flow diagram for a method 1400 of deforming a digital model contour to more closely match the contour of the image of the aligner to detect other manufacturing defects (e.g., cutline variations, debris, webbing, trimmed attachments, and missing attachments, etc.), in accordance with one embodiment. One or more operations of method 1400 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 1400 may be performed by a processing device executing an image based quality control module 2150 of FIG. 21. Method 1400 may include operations performed to detect other manufacturing defects of the shells upon processing logic determining that differences of the shapes of the first projection and the image of the first shell are within the first threshold. While method 1400 may be described below as specifically detecting cutline deviations, it should be understood that method 1400 is equally applicable to detecting other manufacturing defects in the aligner.

For example, at block 1402, processing logic may determine that the one or more differences (e.g., thickness, area, perimeter, etc.) do not exceed the first threshold. As a result, additional comparisons may be performed by the processing logic to identify other deformations. In some embodiments, at block 1404, processing logic may generate a modified projection of the first digital model of the aligner by deforming a curvature of the first shape of the first projection 1000 to cause the curvature of the first shape to approximately match a curvature of the second shape of the first shell. The modified projection may have a new third shape after deformation of the curvature. To generate the modified projection, processing logic may perform operations at blocks 1406-1414.

Figure 15A:
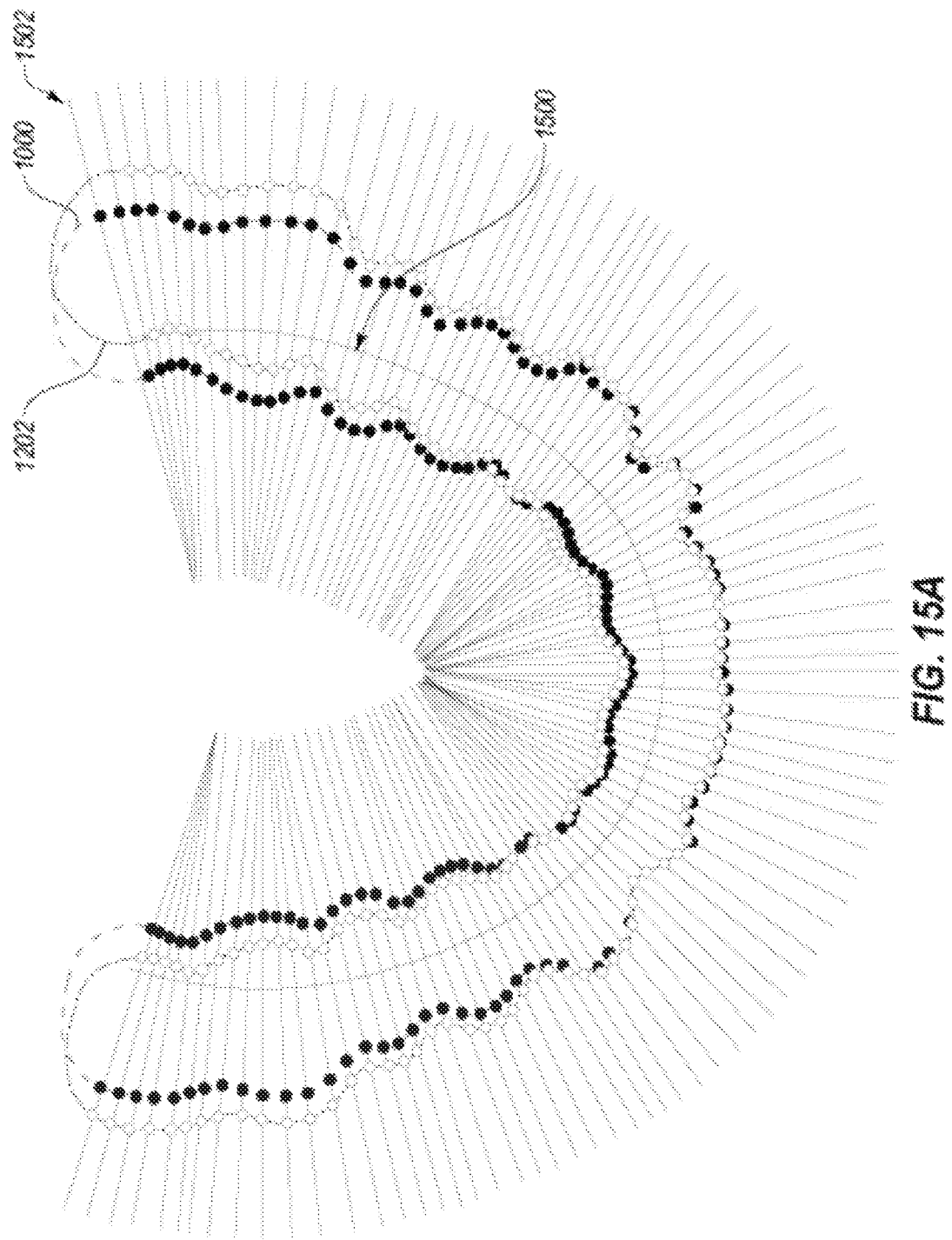
FIGS. 15A-15C illustrate examples of deforming a digital model contour to more closely match the contour of the image of the aligner to detect cutline variations, in accordance with one embodiment.
Figure 15B:
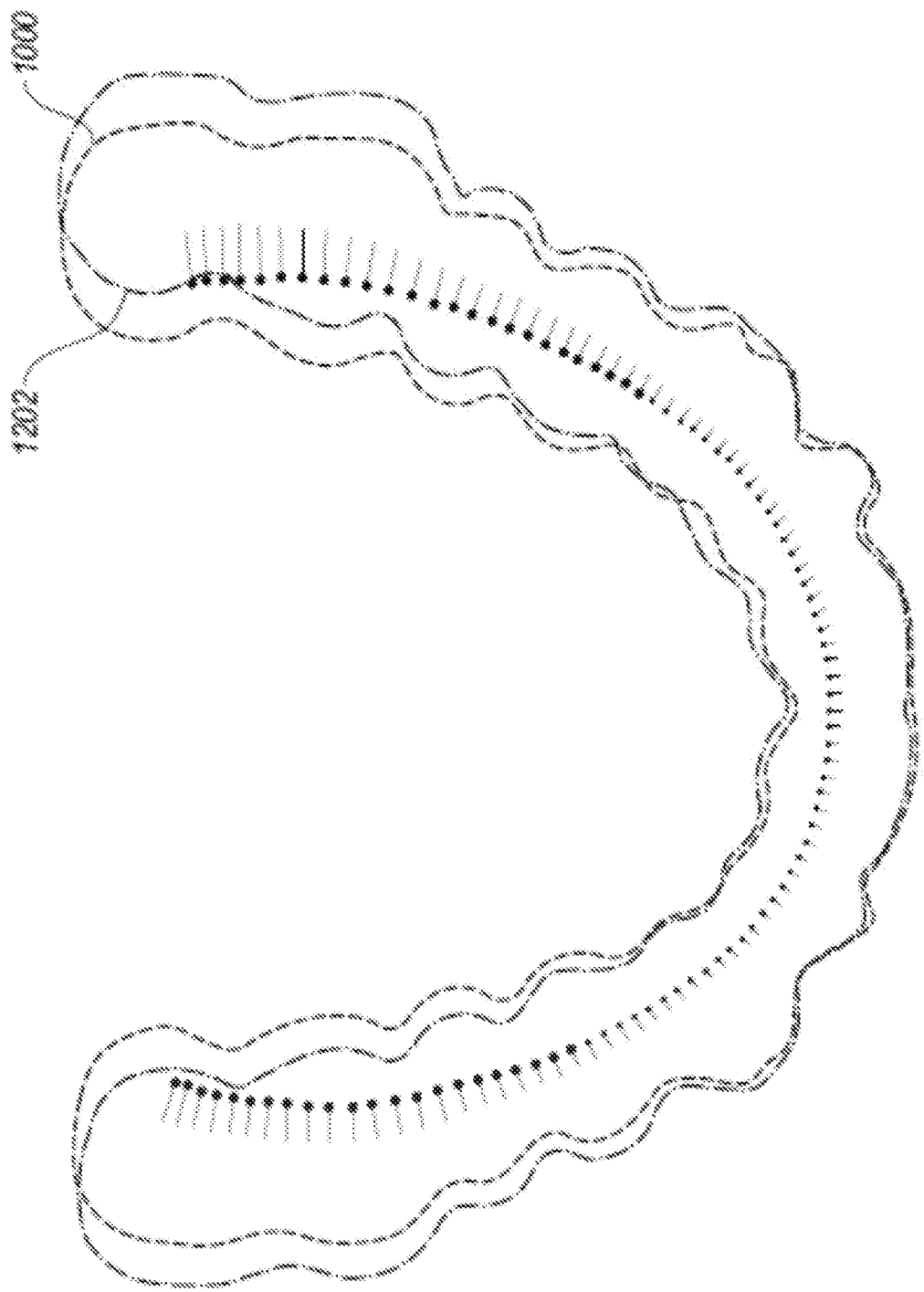
Figure 15C:
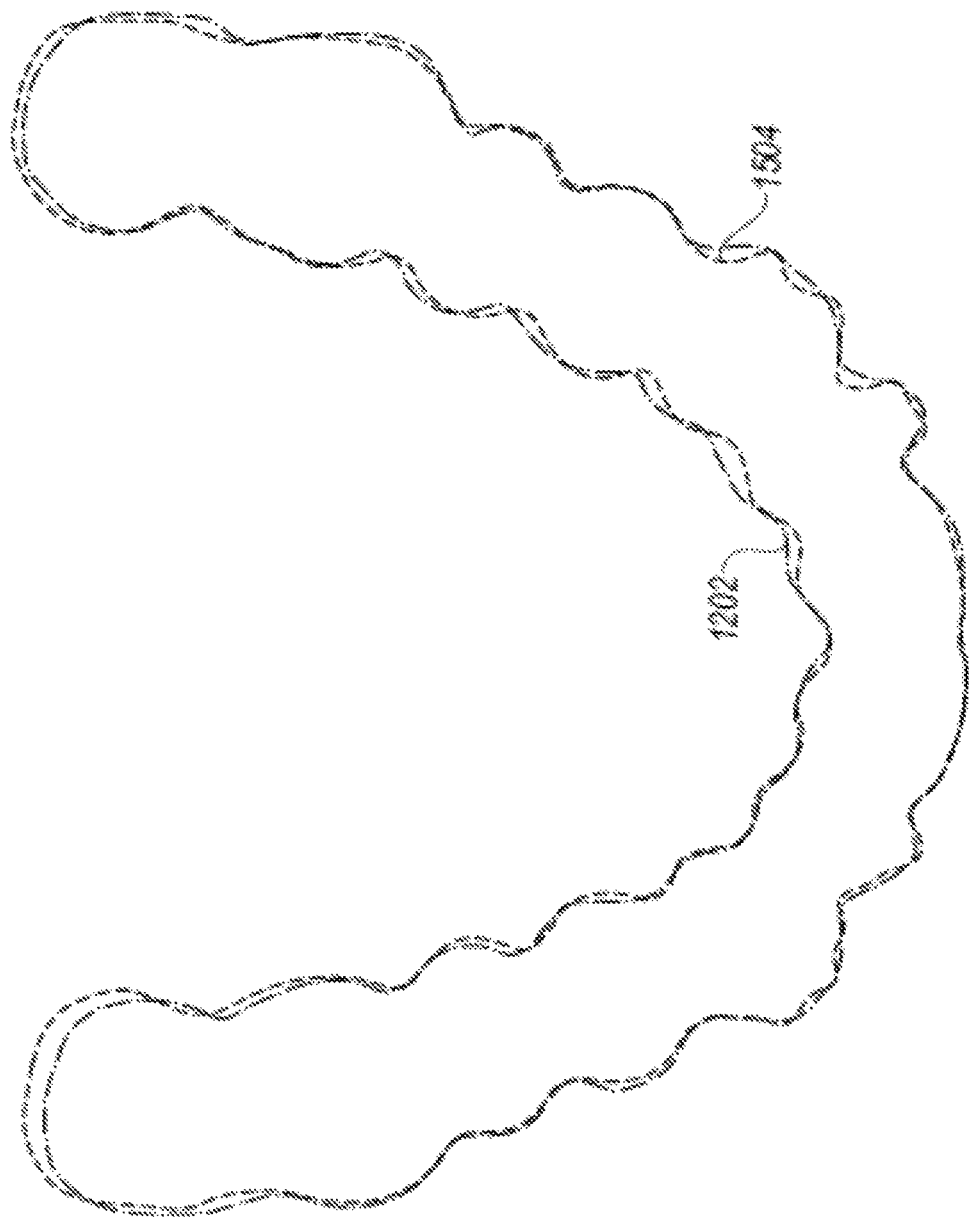

For purposes of clarity, FIGS. 15A-15C are discussed together with method 1400 because FIGS. 15A-15C illustrate examples of generating a modified projection by deforming a digital model contour to more closely match the contour of the image of the aligner to detect cutline variations, in accordance with one embodiment. FIG. 15A illustrates a top view of the contoured edges of an outline of the image of the aligner and the contoured edges of an outline of the first projection 1000 of the digital model of the aligner. FIG. 15B illustrates the points on the middle line being pulled or shifted on the crossing lines such that the entire outline of the digital model of the aligner is shifted outwards to more closely match the outline of the image of the aligner. FIG. 15C depicts the modified projection that has been deformed such that its curvature approximately matches the curvature of the contour of the second shape of the shell.

At block 1406 of method 1400, processing logic may identify a middle line 1500 of the first projection 1000 of the digital model of the aligner, as depicted in FIG. 15A. In one instance, the middle line may be approximated based on the thickness between the contoured edges of the digital model. Numerous pairs of points may be added to the contoured edges of the outlines for both the image and the digital model of the aligner. At block 1410, processing logic may project multiple crossing lines 1502 that perpendicularly intersect the middle line 1500, also depicted in FIG. 15A. Pairs of points on the first projection 1000 of the digital model and pairs of points on the image of the aligner may be matched and the crossing lines 1502 that are perpendicular to the middle line 1500 may intersect the matching pairs and the middle line 1500. The middle line 1500 may be projected on the first projection 1000. The crossing lines 1502 may also intersect at least two points on the contour of the first shape of the first projection 1000 and at least two points on the contour of the second shape of the shell. At block 1412, processing logic may identify points on the crossing lines 1502 at an intersection between each respective line and the middle line 1500.

At block 1414, processing logic may move the points along the crossing lines 1502 to approximately match the contour of the first shape of the first projection 1000 with the contour of the second shape of the shell, as depicted in FIG. 15B. The processing logic may shift the points on the middle line 1500 of the first projection 1000 of the digital model to move the middle line 1500 of the digital model to a position where it lies in the middle of the image of the aligner. Once the processing logic determines that the middle line 1500 of the first projection 1000 of the digital model is as close to the middle of the image of the aligner, the processing logic may stop shifting the points. Moving the points may generate a modified projection 1504 that has the third shape. The third shape (e.g., outline of the modified projection 1504) may be more closely matched to the outline of the image 1202 of the aligner, as depicted in FIG. 15C.

When the outlines of the first projection 1000 of the digital model and the image 1202 of the aligner are more closely matched, the processing logic may then compare images of the cutline of the aligner with the cutline of the modified projection 1504 of the digital model of the aligner to identify (block 1416) remaining differences between the second shape of the first shell and the third shape of the modified projection 1504. For example, processing logic may identify one or more additional regions where the second shape of the first shell and the third shape of the modified projection 1504 do not match. The one or more additional regions may correspond to a cutline of the first shell. At block 1418, processing logic may determine whether the remaining differences exceed a second threshold. For example, up to a 1 millimeter variation between the contours of the modified digital model and the image may be tolerated. Any variation greater than or equal to 1 millimeter may be determined to be a outline defect. It should be noted that any suitable measurement threshold may be used. If the measured regions exceed the second threshold, then the processing logic may determine that there is a outline deformation. That is, the processing logic may determine that the outline of the first shell may interfere with a fit of the first shell on the dental arch of the patient. In some embodiments, side view images of the aligner may be used to compare to side views of the digital model when determining outline deformation.

Figure 14B:
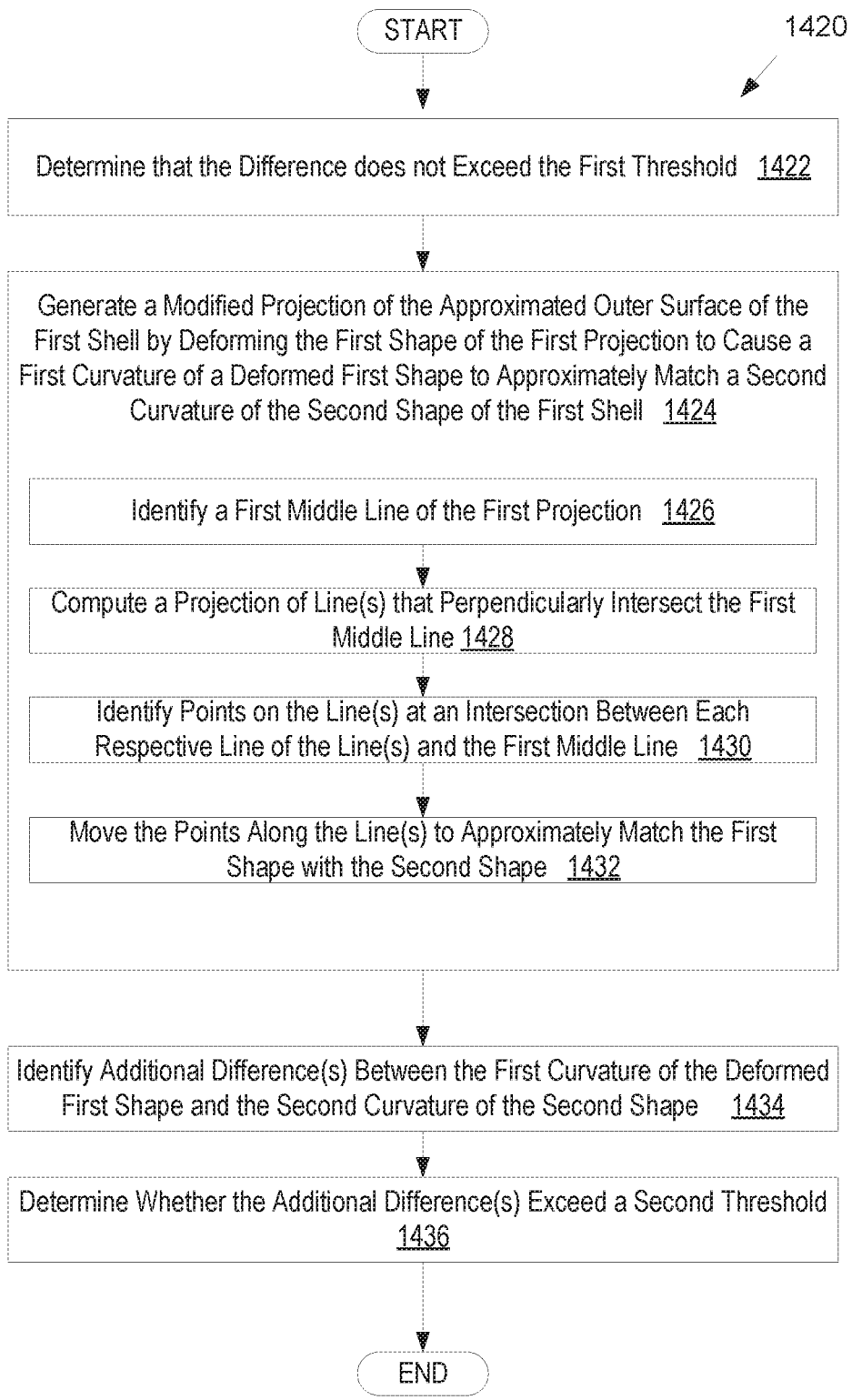

FIG. 14B illustrates a flow diagram for another method 1420 of deforming an approximated outer surface (e.g., digital model of the aligner without a thickness) contour of the aligner to more closely match the contour of the image of the aligner to detect outline variations, in accordance with one embodiment. One or more operations of method 1420 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 1420 may be performed by a processing device executing an image based quality control module 2150 of FIG. 21. Method 1420 may include operations performed to determine outline deformation of the shells upon processing logic determining that differences of the shapes of the first projection and the image of the first shell are within the first threshold.

For example, at block 1422, processing logic may determine that the one or more differences (e.g., thickness, area, perimeter, etc.) between an approximated property of the first shell and a measured property of the first shell do not exceed the first threshold. As a result, additional comparisons may be performed by the processing logic to identify other deformations. In some embodiments, at block 1424, processing logic may generate a modified projection of the approximated outer surface of the first shell by deforming the first shape of the first projection 1000 to cause a first curvature of a deformed first shape to approximately match a second curvature of the second shape of the first shell. The modified projection may have a new third shape after deformation. To generate the modified projection, processing logic may perform operations at blocks 1426-1424.

For purposes of clarity, FIGS. 15A-15C are discussed together with method 1420 because FIGS. 15A-15C illustrate examples of generating a modified projection by deforming an approximated outer surface contour to more closely match the contour of the image of the aligner to detect outline variations, in accordance with one embodiment. FIG. 15A illustrates a top view of the contoured edges of an outline of the image of the aligner and the contoured edges of an outline of the first projection 300 of the approximated outer surface of the aligner. FIG. 15B illustrates the points on the middle line being pulled or shifted on the crossing lines such that the entire outline of the approximated outer surface of the aligner is shifted outwards to more closely match the outline of the image of the aligner. FIG. 15C depicts the modified projection that has been deformed such that its shape approximately matches the contour of the shape of the shell.

At block 1426 of method 1420, processing logic may identify a middle line 1500 of the first projection 1000 of the approximated outer surface of the aligner, as depicted in FIG. 15A. In one instance, the middle line may be approximated based on the width between the contoured edges of the approximated outer surface. Numerous pairs of points may be added to the contoured edges of the outlines for both the image and the approximated outer surface of the aligner. At block 1428, processing logic may compute a projection of multiple crossing lines 1502 that perpendicularly intersect the middle line 1500, also depicted in FIG. 15A. Pairs of points on the first projection 1000 of the approximated outer surface and pairs of points on the image of the aligner may be matched and the crossing lines 1502 that are perpendicular to the middle line 1500 may intersect the matching pairs and the middle line 1500. The middle line 1500 may be projected on the first projection 1000. The crossing lines 1502 may also intersect at least two points on the contour of the first shape of the first projection 1000 and at least two points on the contour of the shape of the shell. At block 1430, processing logic may identify points on the crossing lines 1502 at an intersection between each respective line and the middle line 1500.

At block 1432, processing logic may move the points along the crossing lines 1502 to approximately match the contour of the first shape of the first projection 1000 with the contour of the second shape of the shell, as depicted in FIG. 15B. The processing logic may shift the points on the middle line 1500 of the first projection 1000 of the approximated outer surface of the first shell to move the middle line 1500 of the approximated outer surface to a position where it lies in the middle of the image of the aligner. Once the processing logic determines that the middle line 1500 of the first projection 1000 of the approximated outer surface is as close to the middle of the image of the aligner, the processing logic may stop shifting the points. Moving the points may generate a modified projection 1504 that has a deformed first shape including a curvature that approximately matches the curvature of the second shape.

When the outlines of the first projection 1000 of the approximated outer surface and the image 1202 of the aligner are more closely matched, the processing logic may then compare images of the cutline of the aligner with the cutline of the modified projection 1504 of the approximated outer surface of the aligner to identify (block 1434) additional differences between the first curvature of the deformed second shape and the second curvature of the first shape of the first shell. For example, processing logic may identify one or more additional regions where the second curvature and the first curvature do not match. Such a comparison may be performed based on the remaining differences between the third shape of the modified projection and the second shape of the first shell as measured from the top view image. Alternatively, or additionally, a new projection may be computed onto a second plane defined by a side view image based on the modified projection in the first plane defined by the top view image. The one or more additional regions may correspond to a cutline of the first shell. At block 1436, processing logic may determine whether the additional differences exceed a second threshold. For example, up to a 1 millimeter variation between the contours of the modified approximated outer surface and the image may be tolerated. Any variation greater than or equal to 1 millimeter may be determined to be a cutline defect. It should be noted that any suitable measurement threshold may be used. If the measured regions exceed the second threshold, then the processing logic may determine that there is a cutline deformation. That is, the processing logic may determine that the cutline of the first shell may interfere with a fit of the first shell on the dental arch of the patient.

Figure 14C:
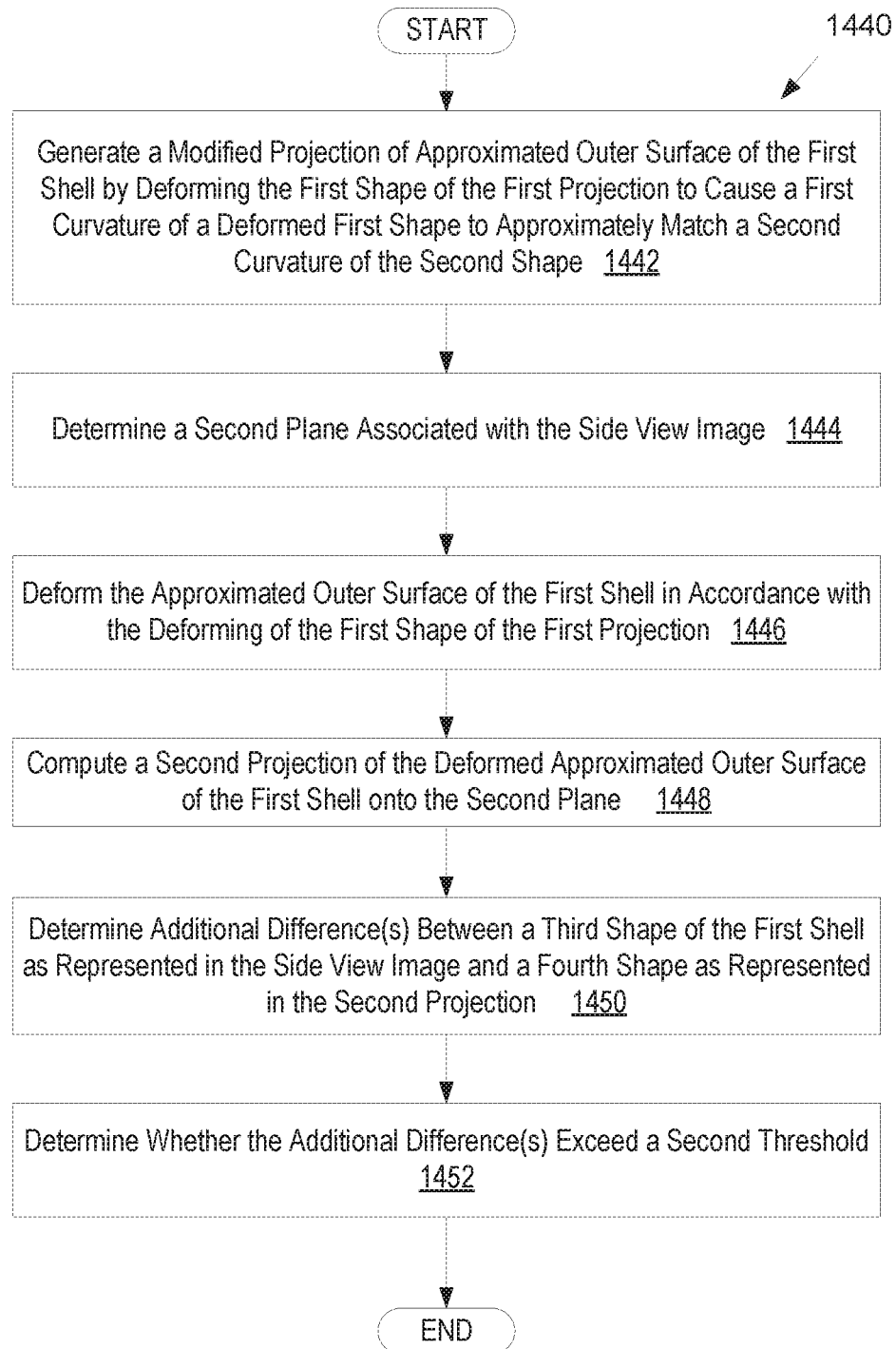

FIG. 14C illustrates a flow diagram for another method 1440 of deforming an approximated outer surface (e.g., digital model of the aligner without a thickness) contour of the aligner to more closely match the contour of the image of the aligner to detect cutline variations, in accordance with one embodiment. One or more operations of method 1440 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 1440 may be performed by a processing device executing an image based quality control module 21 of FIG. 21. Method 1440 may include operations performed to determine cutline deformation of the shells upon processing logic determining that differences of the shapes of the first projection and the image of the first shell are within the first threshold. The method 1440 may use a side view image of the first shell.

At block 1442, processing logic may generate a modified projection of the approximated outer surface of the first shell by deforming the first shape of the first projection to cause a first curvature of a deformed first shape to approximately match a second curvature of the second shape of the first shell. The deforming of the shape of the first projection may be performed as described above.

At block 1444, processing logic may determine a second plane associated with the side view image. At block 1446, processing logic may deform the approximated outer surface of the first shell in accordance with the deforming of the second shape of the first projection. At block 1448, processing logic may compute a second projection of the deformed approximated outer surface of the first shell onto the second plane. At block 1450, processing logic may determine additional differences between a third shape of the first shell as represented in the side view image and an approximated fourth shape of the first shell as represented in the second projection.

At block 1452, processing logic may determine whether the one or more additional differences exceed a second threshold. For example, up to a 1 millimeter variation between the contours of the second projection of the deformed approximated outer surface and the second image may be tolerated. Any variation greater than or equal to 1 millimeter may be determined to be a outline defect. It should be noted that any suitable measurement threshold may be used. If the measured regions exceed the second threshold, then the processing logic may determine that there is a outline deformation. That is, the processing logic may determine that the outline of the first shell may interfere with a fit of the first shell on the dental arch of the patient.

Figure 16:
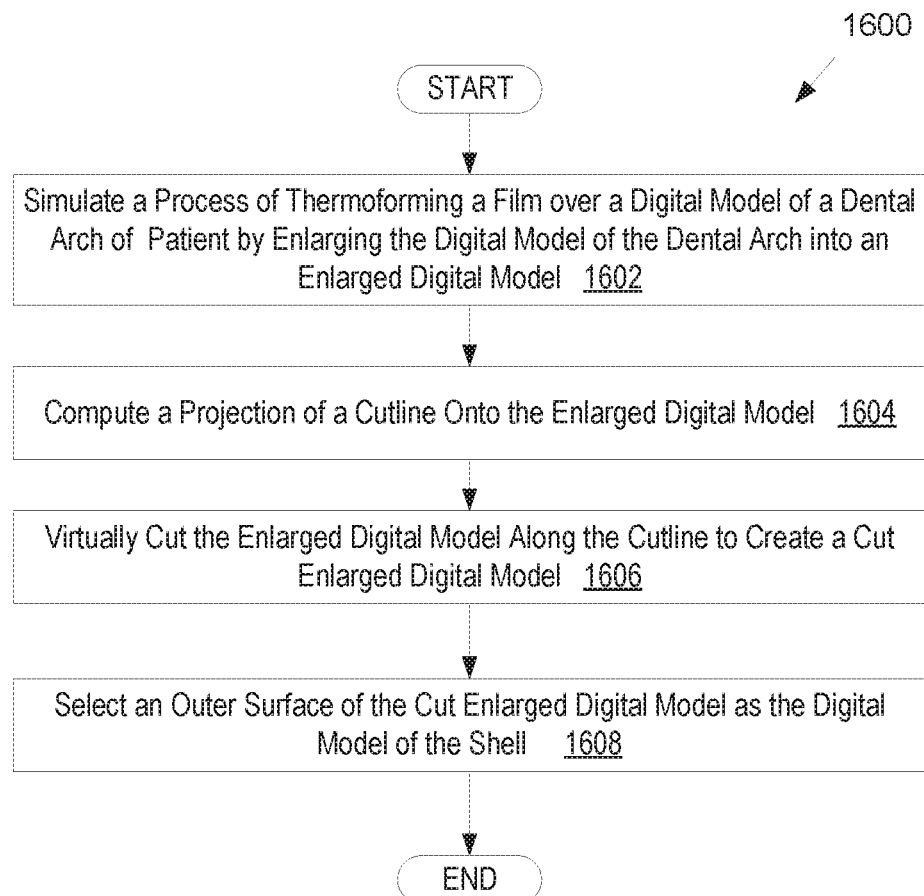
FIG. 16 illustrates a flow diagram for a method of generating a digital model of the shell, in accordance with one embodiment.

FIG. 16 illustrates a flow diagram for a method 1600 of generating a digital model of the shell (e.g., approximated outer surface of the aligner) that may be included in a digital file, in accordance with one embodiment. Alternatively, or additionally, method 1600 may be performed using a digital model of a mold for a shell to approximate a property of the shell that can be compared to a measured property of the shell that is determined from an image of the shell. Accordingly, method 1600 may be performed without generating a digital model of the shell. One or more operations of method 1600 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 1600 may be performed by a processing device executing an image based quality control module 2150 of FIG. 21. Each digital model of a particular shell at a particular stage in a patient's treatment plan may be generated based on manipulating a digital model of the patient's dental arch at that particular stage in the patient's treatment plan. The mold is manufactured using the digital model of the mold (e.g., via 3D printing) and the shells are manufactured using a thermoforming process with the mold. The digital models of the shells may not be used to manufacture the shells.

At block 1602, processing logic may simulate a process of thermoforming a film over the digital model of the mold by enlarging the digital model of the mold into an enlarged digital model. The enlarging performed may account for the thickness of the shell. The inflation or enlarging may scale the surface of the digital model of the mold by a predetermined factor. Processing logic may determine a outline for the enlarged digital model of the shell. In one instance, the processing logic may determine the outline for a surface of the enlarged digital model of the shell by finding an intersecting line between gingival and teeth and modifying the intersecting line by raising it so as not to touch the gingiva. At block 1604, processing logic may project a outline onto the enlarged digital model. In some embodiments, the outline may be displayed to a user as a line having a certain color (e.g., yellow) superimposed on the enlarged digital model of the surface of the aligner.

At block 1606, processing logic may virtually cut the enlarged digital model along the outline to create a cut enlarged digital model. That is, the determined outline may be used during the simulated process to remove the excess enlarged surface to generate the virtual surface of the aligner by cutting along the determined virtual outline. At block 1608, processing logic may select an outer surface of the cut enlarged digital model as the digital model of the shell. The digital model of the shell may result from the simulated trimming and the digital model may represent an outer surface of the aligner. The digital model of the aligner may be three-dimensional and various two-dimensional views (e.g., top view, side view) or three-dimensional views may be obtained using the digital model of the aligner. Further, the digital model of the aligner may be associated with the part number identifier for the respective aligner such that the digital model of the aligner may be retrieved when the processing logic identifies the part number identifier using an image of the manufactured aligner. In alternative embodiments, a technician may read the part number identifier and input it into the IBQC system. Alternatively, other computer readable tags associated with the aligner may be read by the IBQC system for part number identification. The system may receive the part number identifier information, then retrieve from a database a previously generated digital model of the aligner or the digital model of the mold associated with the aligner for generation of a digital model of the aligner. Accordingly, a separate digital model of an aligner may be generated for each aligner at each stage in a patient's treatment plan prior to or during the quality control process. The processing logic may use the identified part number identifier to perform the IBQC for each uniquely manufactured aligner.

Figure 17:
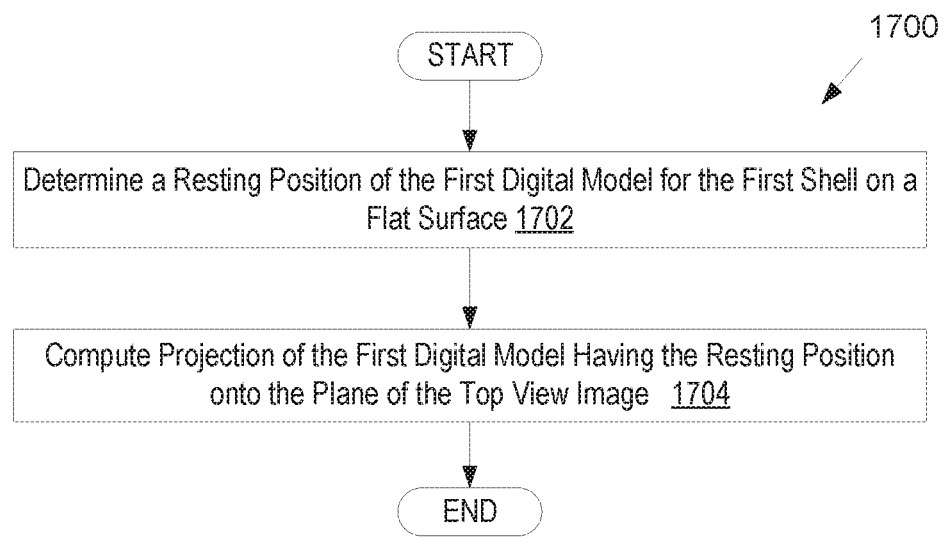
FIG. 17 illustrates a flow diagram for a general method of determining a resting position of the digital model of the shell on a flat surface, in accordance with one embodiment.

FIG. 17 illustrates a flow diagram for a general method 1700 of determining a resting position of the digital model of the shell on a flat surface, in accordance with one embodiment. The digital model may be included in the digital file and the digital model may include the approximated first property (e.g., outer surface of the shell). The digital model of the shell may be generated based on the manipulation of the digital model of the mold. One or more operations of method 1700 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 1700 may be performed by a processing device executing an image based quality control module 2150 of FIG. 21. Method 1700 may be performed to project the first projection of the digital model of the shell into the same plane associated with the top view image of the shell. It may also be used when projecting the digital model of the shell into other planes associated with images of the shell taken from other angles. Method 1700 may be performed for example, to correctly compute a projection of the digital model into the plane associated with a top view image of an aligner in block 904 and/or 924 of method 900 and/or 920, respectively.

At block 1702, processing logic may determine a resting position of the first digital model for the first shell on a flat surface. Method 1800 of FIG. 18 describes determining the resting position of the digital model of the shell on the flat surface using a two-dimensional digital model, and FIGS. 19A-19C depict examples for determining the resting position using the two-dimensional digital model. Method 2000 of FIG. 20 describes determining the resting position of the digital model of the shell on the flat surface using a three-dimensional digital model. Once the resting position is determined, processing logic may compute a projection (block 1704) of the first digital model having the resting position onto the plane of the top view image.

Figure 18:
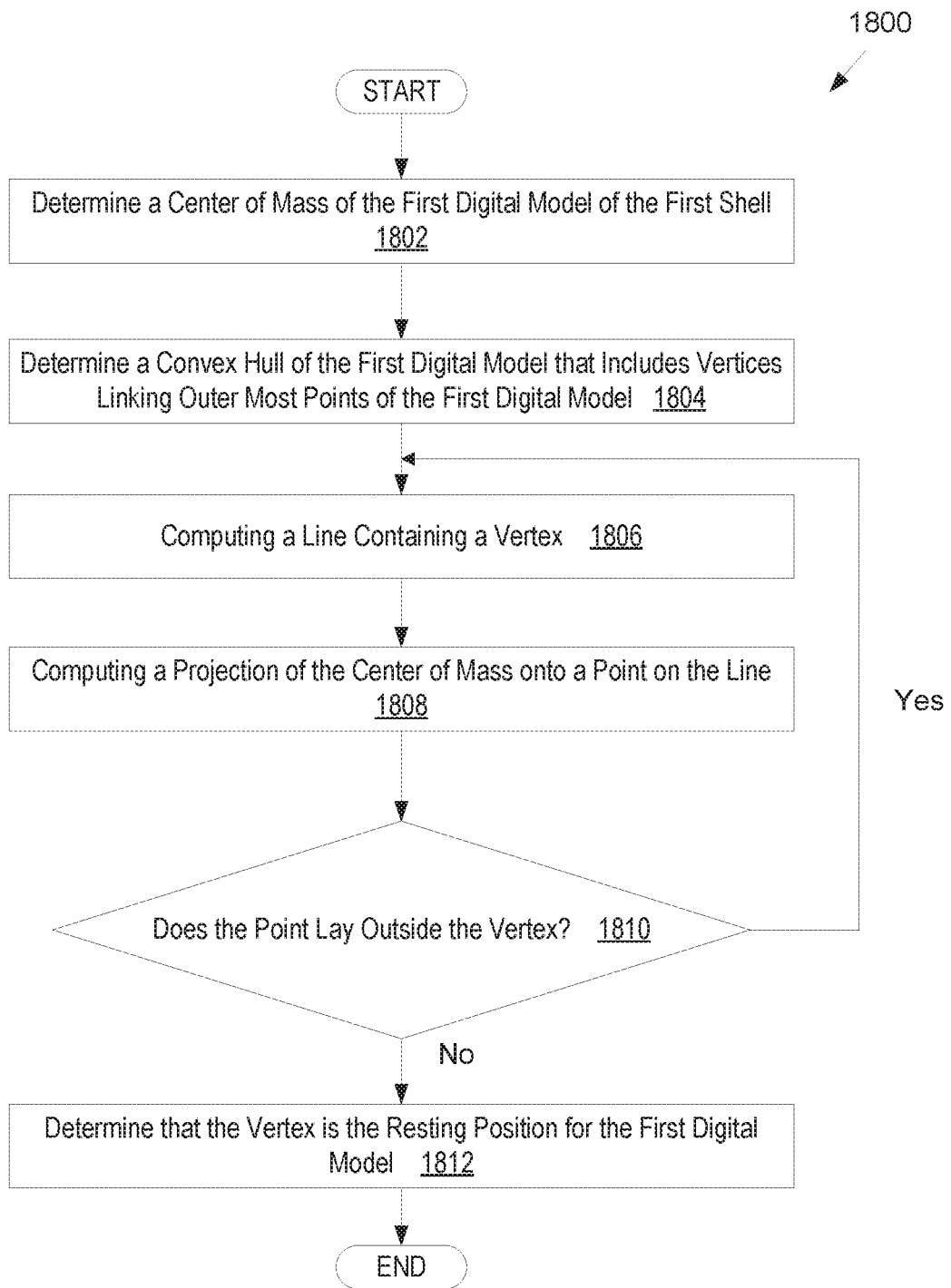
FIG. 18 illustrates a flow diagram for a method of determining a resting position of the digital model of the shell on a flat surface using a two-dimensional digital model, in accordance with one embodiment.
Figure 19A:
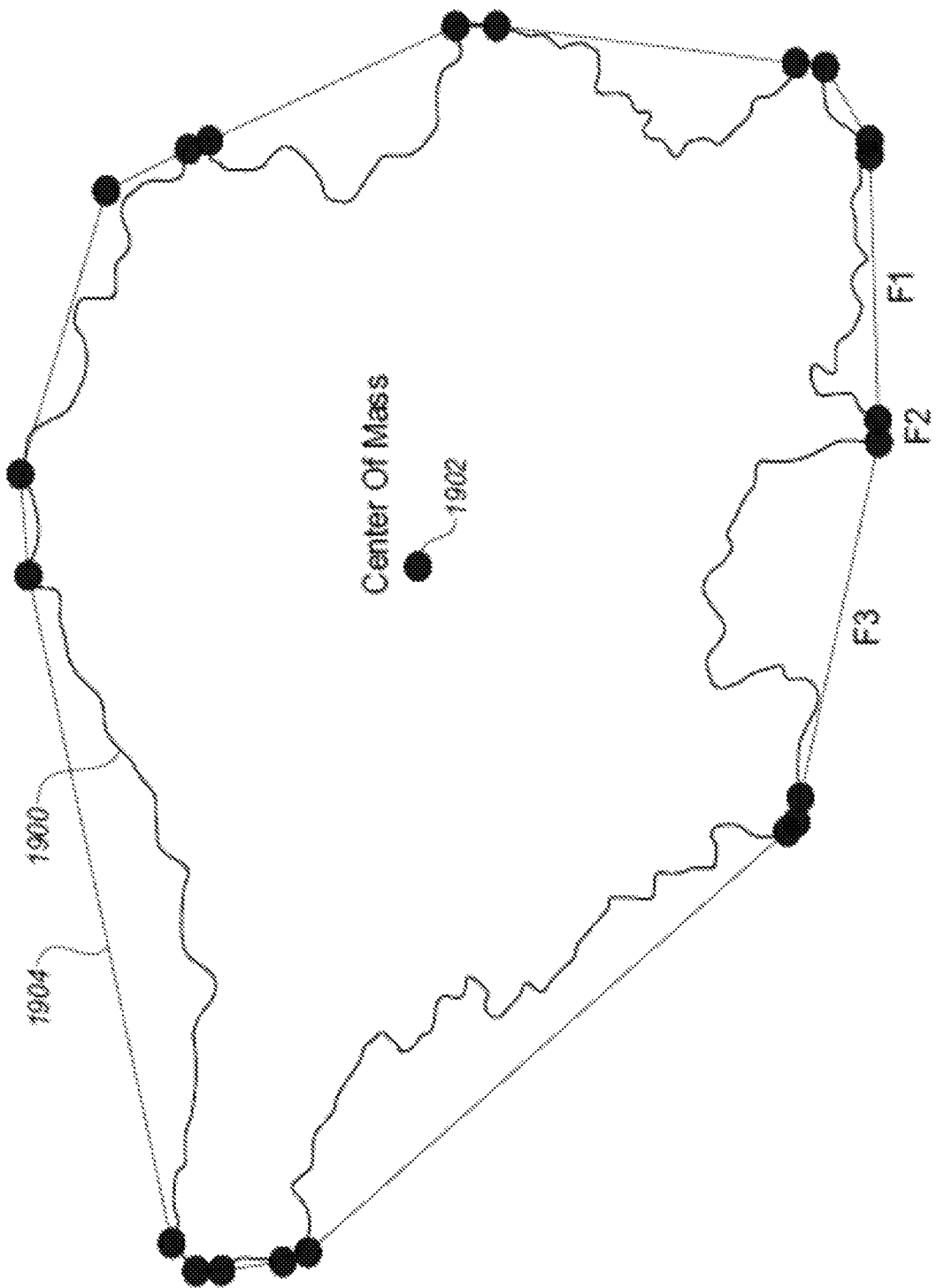
FIGS. 19A-19C illustrate example images for determining a resting position of aligner on a flat surface, in accordance with one embodiment.
Figure 19B:
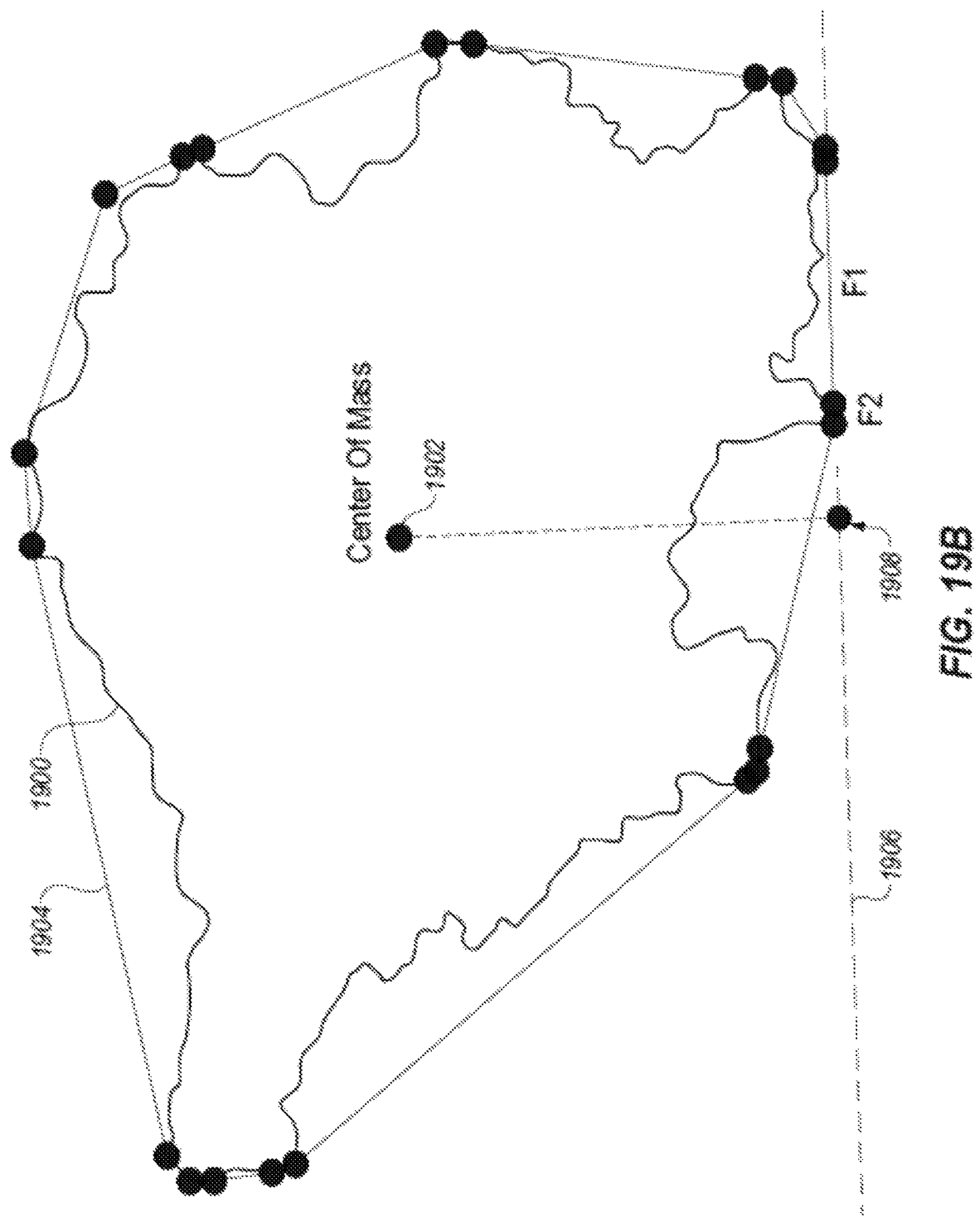
Figure 19C:
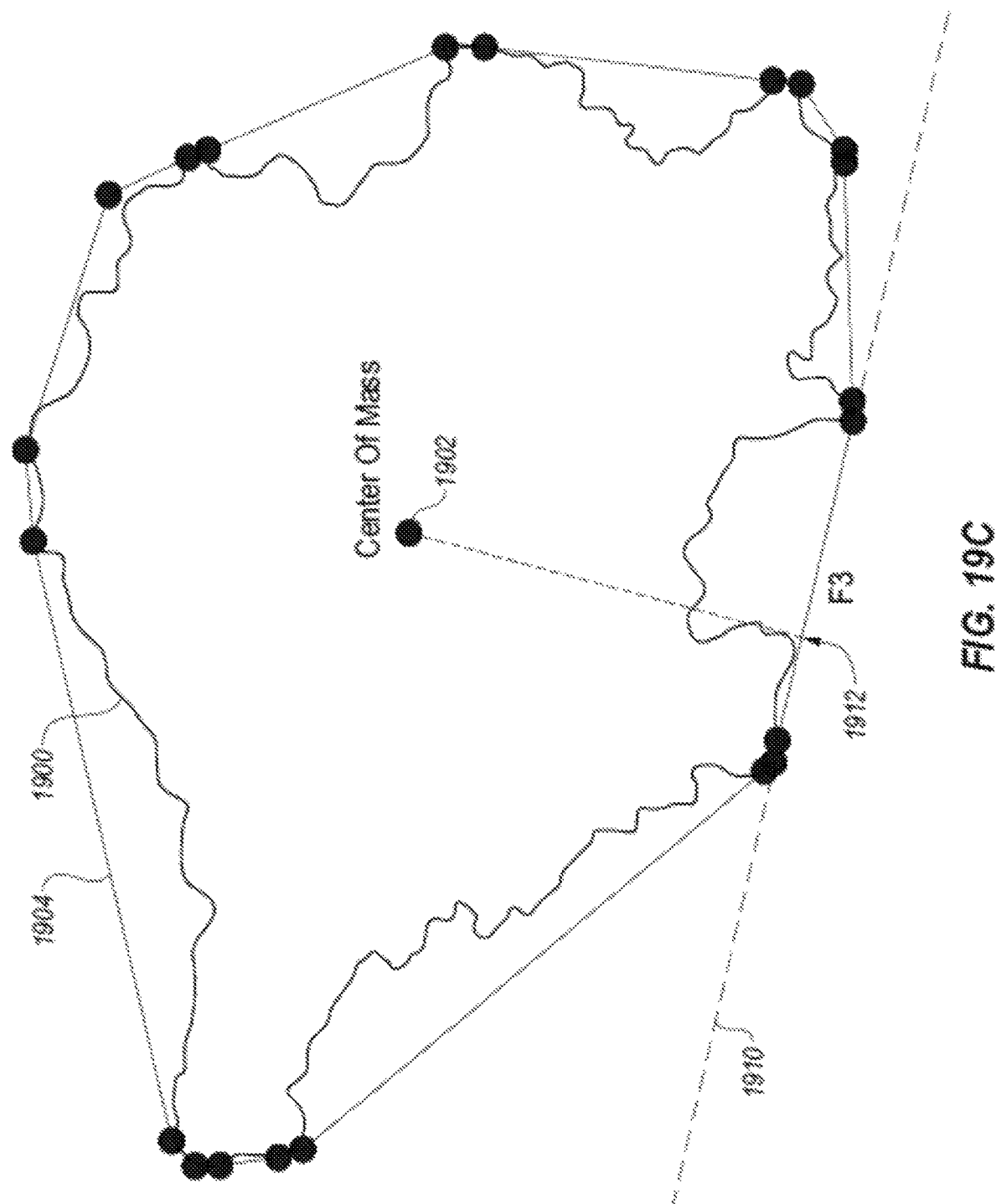

FIG. 18 illustrates a flow diagram for a method 1800 of determining a resting position of the digital model of the shell (e.g., approximated outer surface of the shell) on a flat surface using a two-dimensional digital model, in accordance with one embodiment. One or more operations of method 1800 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 1800 may be performed by a processing device executing an image based quality control module 2150 of FIG. 21. For purposes of clarity, method 1800 and FIGS. 19A-19C are discussed together below.

FIG. 19A illustrates a two-dimensional contour of an arbitrary object 1900. Although the arbitrary object 1900 is depicted, it should be understood that the method 1800 may be applied to an outline of a digital model of a shell. At block 1802, processing logic may determine a center of mass 1902 of the object 1900. At block 1804, processing logic may determine a convex hull 1904 (e.g., polygon) of the object 1900. The convex hull may include numerous vertices that link the outer most points of the object 1900. In particular, three vertices F1, F2, and F3 are identified on the convex hull 1904.

For each vertex of the convex hull 1904, processing logic may compute (block 1806) a line 1906 containing that vertex. At block 1808, processing logic may compute a projection of the center of mass 1902 onto this line 1906, as shown by projected point 1908 in FIG. 19B. At block 1810, processing logic may determine whether the projected point 1908 lies outside the vertex. For vertex F1, the projected point 1908 is outside of the vertex F1, so the object 1900 may not rest on side F1 because the object 1900 will roll to the left. The same is true for vertex F2. If the projected point 1908 lies outside the vertex, then the processing logic may return to repeat blocks 1806, 1808, and 1810 until the resting position is found.

If the projected point 1908 lies within the vertex, then processing logic may determine that the particular vertex is the resting position for the first digital model of the first shell. FIG. 19C illustrates drawing a line 1910 containing vertex F3. The center of mass 1902 is projected on this line 1910, and as depicted, the projected point 1912 lies within vertex F3 that defines the line 1910. As such, the object 1900 can rest on this side without rolling. Using such a method, the process logic may determine a resting position and identify the appropriate projection of the digital model of the aligner for quality control analysis depending on the image view (e.g., top view, side view, etc.).

Figure 20:
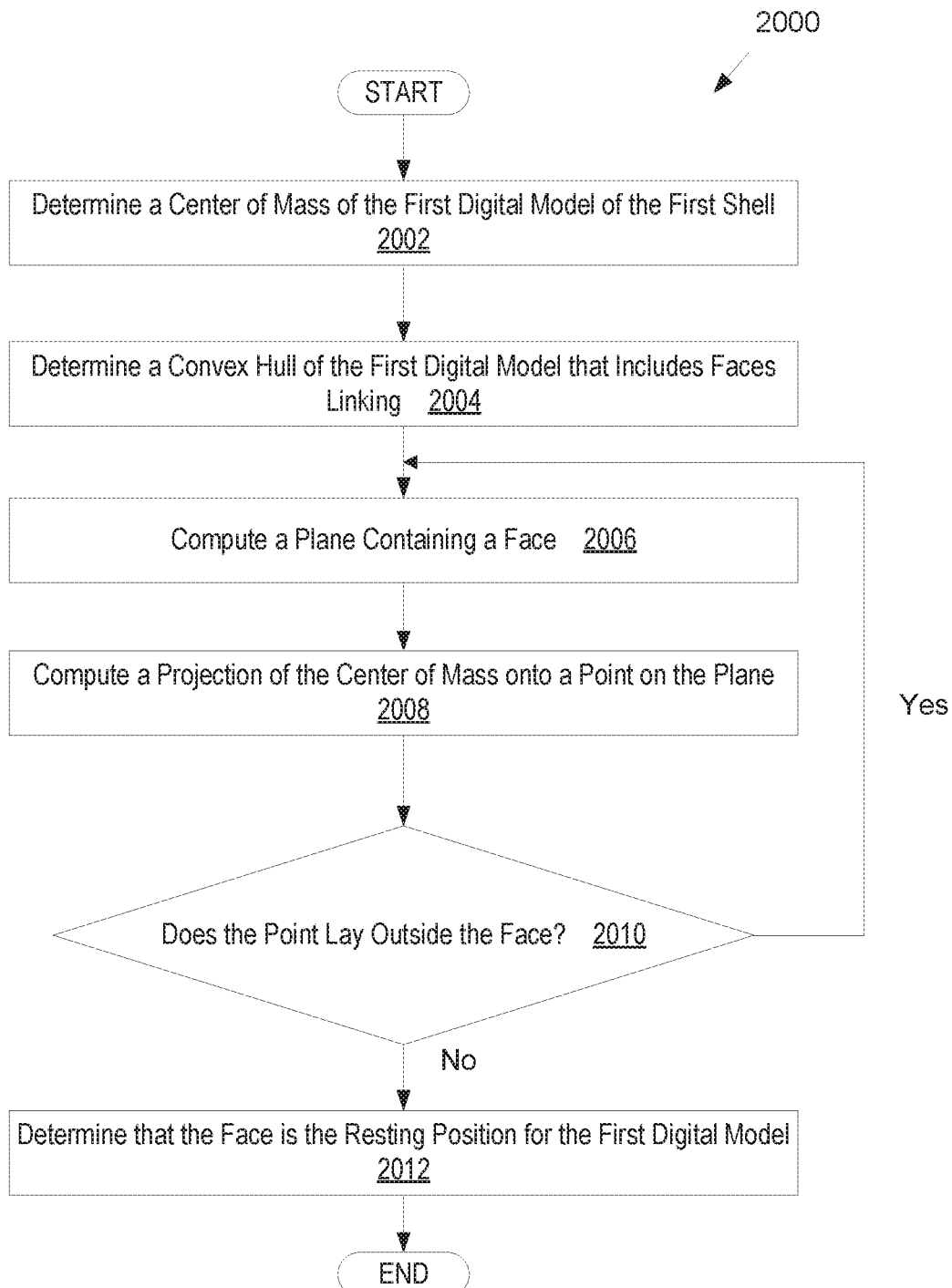
FIG. 20 illustrates a flow diagram for a method of determining a resting position of the digital model of the shell on a flat surface using a three-dimensional digital model, in accordance with one embodiment.

FIG. 20 illustrates a flow diagram for a method 2000 of determining a resting position of the digital model of the shell on a flat surface using a three-dimensional digital model, in accordance with one embodiment. One or more operations of method 2000 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 2000 may be performed by a processing device executing an image based quality control module 2150 of FIG. 21.

At block 2002, processing logic may determine a center of mass of the first digital model of the first shell. At block 2004, processing logic may determine a convex hull (e.g., polyhedron for the three-dimensional digital model) of the digital model. The convex hull may include numerous faces that link the outer most points of the first digital model. For each face of the convex hull, processing logic may compute (block 2006) a plane containing that face. At block 2008, processing logic may compute a projection of the center of mass onto this plane. At block 2010, processing logic may determine whether the projected point on the plane lies outside the face. If the projected point lays outside the face, then the processing logic may return to repeat blocks 2006, 2008, and 2010 until the resting position is found. If the projected point does not lie outside the face, processing logic may determine (block 2012) that the face is the resting position for the first digital model.

FIG. 21 illustrates a diagrammatic representation of a machine in the example form of a computing device 2100 within which a set of instructions, for causing the machine to perform any one or more of the methodologies discussed herein. In some embodiments, the machine may be part of an IBQC station or communicatively coupled to the IBQC station. In alternative embodiments, the machine may be connected (e.g., networked) to other machines in a Local Area Network (LAN), an intranet, an extranet, or the Internet. For example, the machine may be networked to the IBQC station and/or a rapid prototyping apparatus such as a 3D printer or SLA apparatus. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 2100 includes a processing device 2102, a main memory 2104 (e.g., read-only memory (ROM), flash memory, dynamic random access memory (DRAM) such as synchronous DRAM (SDRAM), etc.), a static memory 2106 (e.g., flash memory, static random access memory (SRAM), etc.), and a secondary memory (e.g., a data storage device 2128), which communicate with each other via a bus 2108.

Processing device 2102 represents one or more general-purpose processors such as a microprocessor, central processing unit, or the like. More particularly, the processing device 2102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 2102 may also be one or more special-purpose processing devices such as an application specific integrated circuit (ASIC), a field programmable gate array (FPGA), a digital signal processor (DSP), network processor, or the like. Processing device 2102 is configured to execute the processing logic (instructions 2126) for performing operations and steps discussed herein.

The computing device 2100 may further include a network interface device 2122 for communicating with a network 2164. The computing device 2100 also may include a video display unit 2110 (e.g., a liquid crystal display (LCD) or a cathode ray tube (CRT)), an alphanumeric input device 2112 (e.g., a keyboard), a cursor control device 2114 (e.g., a mouse), and a signal generation device 2120 (e.g., a speaker).

The data storage device 2128 may include a machine-readable storage medium (or more specifically a non-transitory computer-readable storage medium) 2124 on which is stored one or more sets of instructions 2126 embodying any one or more of the methodologies or functions described herein. A non-transitory storage medium refers to a storage medium other than a carrier wave. The instructions 2126 may also reside, completely or at least partially, within the main memory 2104 and/or within the processing device 2102 during execution thereof by the computer device 2100, the main memory 2104 and the processing device 2102 also constituting computer-readable storage media.

The computer-readable storage medium 2124 may also be used to store one or more virtual 3D models (also referred to as electronic models) and/or an IBQC module 2150, which may perform one or more of the operations of the methods described herein. The computer readable storage medium 2124 may also store a software library containing methods that call an IBQC module 2150. While the computer-readable storage medium 2124 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method for inspecting a dental appliance for manufacturing defects, the method comprising:
   obtaining one or more images of the dental appliance, wherein the dental appliance comprises a customized orthodontic aligner customized for a specific arch of a specific patient and a specific stage of orthodontic treatment;
   identifying an identifier of the dental appliance;
   determining, from a plurality of digital files, a digital file associated with the dental appliance based on the identified identifier, the digital file associated with the dental appliance including a digital model of an intermediate component used during manufacture of the dental appliance, wherein the intermediate component comprises a positive mold associated with the specific arch of the specific patient and the specific stage of orthodontic treatment;
   determining an intended property for the dental appliance by digitally manipulating the digital model of the intermediate component used during manufacture of the dental appliance, wherein the intended property for the customized orthodontic aligner comprises an intended silhouette which approximates an outer surface of the customized orthodontic aligner in a plane;
   determining an actual property of the dental appliance from the one or more images of the dental appliance, wherein the actual property of the customized orthodontic aligner comprises an actual silhouette of the outer surface of the customized orthodontic aligner in the plane as captured by one or more images of the customized orthodontic aligner;
   determining whether there is a manufacturing defect in the dental appliance by comparing the intended property for the dental appliance with the actual property of the dental appliance, wherein comparing the intended property with the actual property of the customized orthodontic aligner comprises comparing the intended silhouette with the actual silhouette and determining whether differences exceed a threshold value; and
   outputting an output associated with the determination of whether there is a manufacturing defect.

2. The method of claim 1, wherein the intended property for the customized orthodontic aligner comprises an intended cutline for the customized orthodontic aligner, wherein the actual property of the customized orthodontic aligner comprises an actual cutline of the customized orthodontic aligner as determined from the one or more images.

3. The method of claim 1, wherein the identifier of the customized orthodontic aligner is printed on the customized orthodontic aligner and wherein the identifier of the customized orthodontic aligner is identified by analyzing the one or more images of the customized orthodontic aligner.

4. The method of claim 1, wherein identifying the identifier of the customized orthodontic aligner comprises receiving user input of the identifier.

5. The method of claim 1, wherein the intended property for the customized orthodontic aligner is determined by digitally manipulating a portion of a surface of the digital model of the positive mold to approximate a surface of the customized orthodontic aligner.

6. The method of claim 5, wherein the surface of the customized orthodontic aligner is approximated by offsetting the portion of the surface of the digital model of the positive mold by a distance.

7. The method of claim 6, wherein the intended property for the customized orthodontic aligner is determined by virtually projecting a cut line associated with the customized orthodontic aligner to the approximated surface of the customized orthodontic aligner.

8. The method of claim 6, wherein the intended silhouette of the customized orthodontic aligner is determined by computing a silhouette of an approximated surface of the customized orthodontic aligner in the plane.

9. The method of claim 1, wherein the intended property for the customized orthodontic aligner is determined by computing a silhouette of the digital model of the positive mold in the plane.

10. The method of claim 9, wherein the intended silhouette of the customized orthodontic aligner is computed by offsetting a perimeter of the computed silhouette of the digital model of the positive mold in the plane.

11. A method for inspecting a dental appliance for manufacturing defects, the dental appliance configured for application to a dental arch of a patient, the method comprising:
    obtaining one or more images of the dental appliance, wherein the dental appliance comprises a customized orthodontic aligner customized for a specific arch of a specific patient and a specific stage of orthodontic treatment;
    identifying an identifier of the dental appliance;
    determining, from a plurality of digital files, a digital file associated with the dental appliance based on the identified identifier, the digital file associated with the dental appliance including a digital model of the dental appliance, the digital model of the dental appliance produced by digitally manipulating a digital model of a staged dental arch of the patient that is associated with the specific stage of orthodontic treatment;
    determining an intended property for the dental appliance from the digital model of the dental appliance, wherein the intended property for the customized orthodontic aligner comprises an intended silhouette which approximates an outer surface of the customized orthodontic aligner in a plane;
    determining an actual property of the dental appliance from the one or more images, wherein the actual property of the customized orthodontic aligner comprises an actual silhouette of the outer surface of the customized orthodontic aligner in the plane as captured by one or more images of the customized orthodontic aligner;
    determining whether there is a manufacturing defect in the dental appliance by comparing the intended property for the dental appliance with the actual property of the dental appliance;
    outputting an output associated with the determination of whether there is a manufacturing defect.

12. The method of claim 11, wherein the intended property for the customized orthodontic aligner comprises an intended cutline for the customized orthodontic aligner, and wherein the actual property of the customized orthodontic aligner comprises an actual cutline of the customized orthodontic aligner as determined from the one or more images.

13. The method of claim 11, wherein the identifier of the customized orthodontic aligner is printed on the customized orthodontic aligner and wherein the identifier of the customized orthodontic aligner is identified by analyzing the one or more images of the customized orthodontic aligner or by receiving user input of the identifier.

14. A method for inspecting a customized orthodontic aligner for manufacturing defects, the customized orthodontic aligner customized for a specific arch of a specific patient and a specific stage of orthodontic treatment, the method comprising:

obtaining one or more images of the customized orthodontic aligner;

identifying an identifier of the customized orthodontic aligner;

determining, based on the identifier of the customized orthodontic aligner, at least one intended property for the customized orthodontic aligner, wherein the at least one intended property comprises an intended silhouette which approximates an outer surface of the customized orthodontic aligner, the at least one intended property for the customized orthodontic aligner determined by digitally manipulating a digital model of a mold used during manufacture of the customized orthodontic aligner;

determining at least one actual property of the customized orthodontic aligner from the one or more images, wherein the at least one actual property comprises an actual silhouette of the outer surface of the customized orthodontic aligner;

determining whether there is a manufacturing defect in the customized orthodontic aligner by comparing the at least one intended property for the customized orthodontic aligner with the at least one actual property of the customized orthodontic aligner, wherein comparing the at least one intended property with the at least one actual property of the customized orthodontic aligner comprises comparing the intended silhouette with the actual silhouette; and outputting an output associated with the determination of whether there is a manufacturing defect.

15. The method of claim 14, wherein the intended silhouette of the customized orthodontic aligner is in a plane and wherein the actual silhouette of the customized orthodontic aligner is in the plane as captured by the one or more images of the customized orthodontic aligner.

16. The method of claim 14, wherein the at least one intended property for the customized orthodontic aligner comprises an intended cutline for the customized orthodontic aligner, and wherein the at least one actual property of the customized orthodontic aligner comprises an actual cutline of the customized orthodontic aligner as determined from the one or more images.

17. The method of claim 14, wherein the identifier of the customized orthodontic aligner is printed on the customized orthodontic aligner and wherein the identifier of the customized orthodontic aligner is identified by analyzing the one or more images of the customized orthodontic aligner or by receiving user input of the identifier.

* * * * *